(12) United States Patent
Kawazawa et al.

(10) Patent No.: US 6,377,373 B1
(45) Date of Patent: Apr. 23, 2002

(54) OPTICAL TRANSMISSION SYSTEM

(75) Inventors: Toshio Kawazawa; Koji Goto, both of Tokyo (JP)

(73) Assignee: Kokusai Denshin Denwa Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/118,732

(22) Filed: Jul. 17, 1998

(30) Foreign Application Priority Data

Jul. 18, 1997 (JP) .............................................. 9-193836

(51) Int. Cl.[7] .......................... H04J 14/02; H04J 14/00; H04J 14/08; H04B 10/16
(52) U.S. Cl. ........................ 359/127; 359/117; 359/124; 359/128; 359/139; 359/179
(58) Field of Search ................................. 359/127, 118, 359/123, 124, 128, 152, 179, 119, 115

(56) References Cited

U.S. PATENT DOCUMENTS 5,909,298 A * 6/1999 Shimada et al. ............ 359/163

* cited by examiner

Primary Examiner—Jason Chan
Assistant Examiner—M. R. Sedighian
(74) Attorney, Agent, or Firm—Christie, Parker & Hale, LLP

(57) ABSTRACT

In an optical transmission, system, a trunk cable having two pairs of optical fibers is provided between first and second trunk stations to use one of the two pairs of the optical fibers for communication between the first and second trunk stations and the other for communication with first and second branch stations. Two branching units of first and second, and third and forth, are respectively provided for the first and second branch stations, and connected to each of the associated first and second branch stations, by first and second or third and forth branching cables. The first branch station connects to the first branching unit via the first branching cable having two pairs of optical fibers, and connects to the second branching unit via the second branching cable having two pairs of optical fibers. One of the two pairs of the optical fibers of the first branching cable and one of the two pairs of the optical fibers of the second branching cable are normally used, and the others are reserved as spare fibers. Alternatively, the first branching cable is normally used, and the second branching cable is reserved as a spare cable.

28 Claims, 31 Drawing Sheets

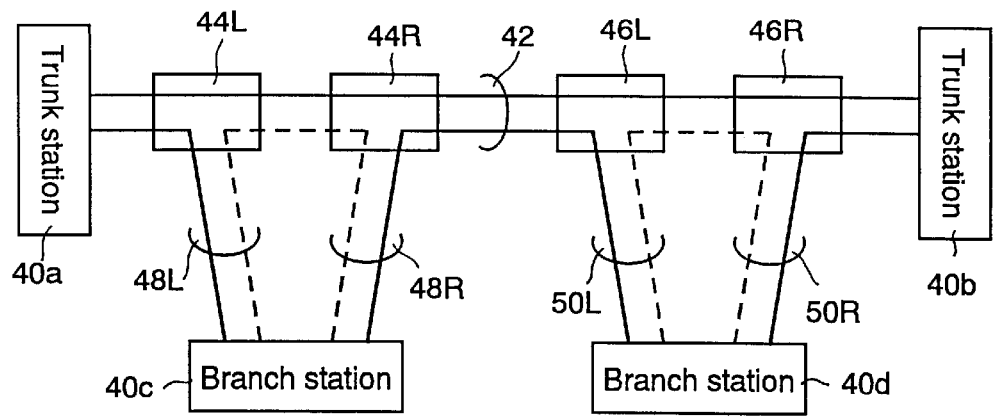
Fig. 2 (a) Normal state
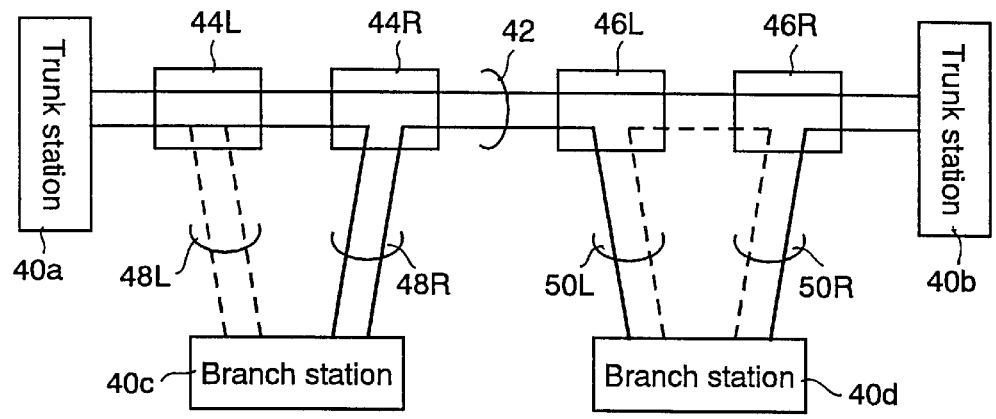
Fig. 2 (b) Failure state in left branching cable 48L
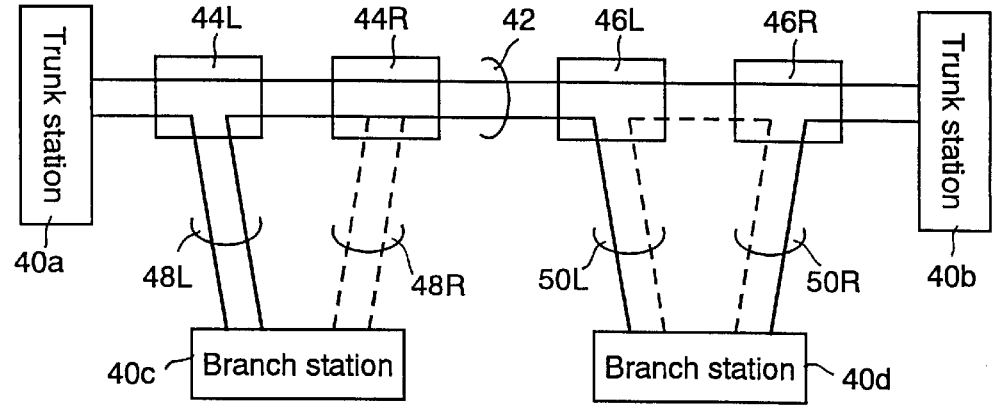
Fig. 2 (c) Failure state in right branch cable 48R Fig. 3 (a) Normal state
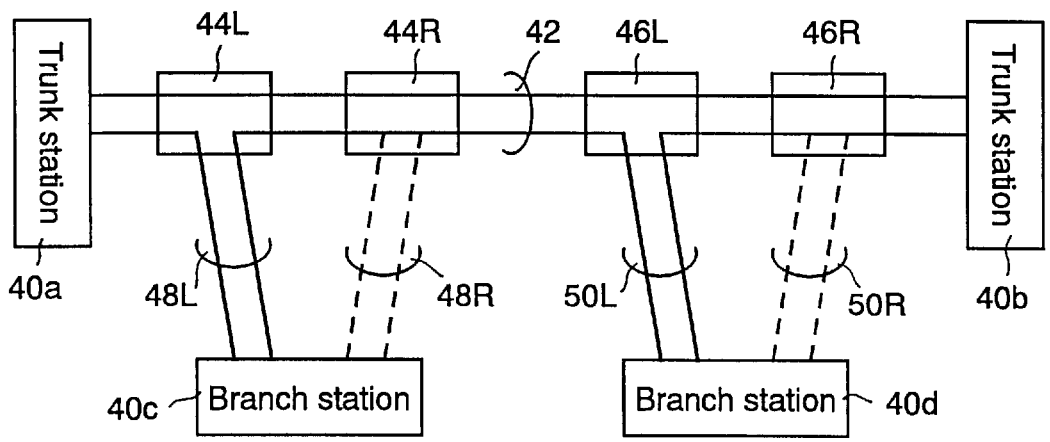
Fig. 3 (b) Failure state in left side branch cable 48L
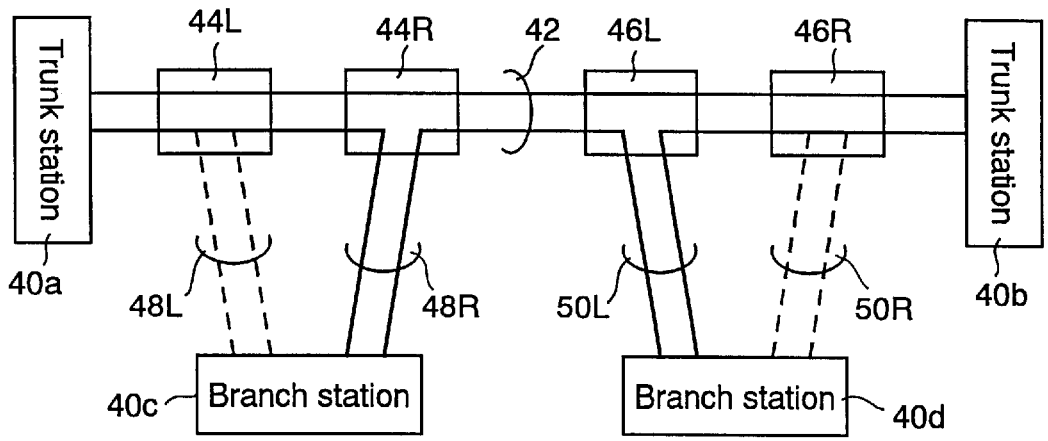

OPTICAL TRANSMISSION SYSTEM

FIELD OF THE INVENTION

This invention relates to an optical transmission system and, more particularly, to an optical transmission system in which one or more branch stations are connected to a main optical transmission line.

BACKGROUND OF THE INVENTION

There are two different optical submarine cable systems for connecting branch stations to trunk lines, namely, the simple double landing system serially connecting main stations, and branch stations and the simple underwater branching system providing one branching apparatus for each branch station in a trunk line.

FIG. 33 is a block diagram roughly sketching the general construction of the simple double landing system. Two trunk stations 10*a*, 10*b* and two branch stations 10*c*, 10*d* are provided. The trunk station 10*a* and the branch station 10*c* are connected by an optical fiber cable 12 having a pair of optical fiber lines (hereinafter called optical fibers), the branch station 10*c* and the branch station 10*d* are connected by an optical fiber cable 14 having a pair of optical fibers, and the branch station 10*d* and the trunk station 10*b* are connected by an optical fiber cable 16 having a pair of optical fibers. One of optical fibers in the optical fiber 12 is the upward line, and the other is the downward line.

FIG. 34 is a block diagram roughly sketching the general construction of the simple underwater branching system. In this system, a trunk cable 22 having two pairs of optical fibers connects two trunk stations 20*a*, 20*b*. Two branch stations 20*c*, 20*d* are connected to one of two pairs of optical fibers of the trunk cable 22 by branching units 28, 30 via branching cables 24, 26 each having two pairs of optical fibers. The other of two pairs of optical fibers of the trunk cable 22 not connected to the branching units 28, 30 is used for communication between the trunk stations 20*a*, 20*b* whereas the pair of optical fibers connected to the branching units 28, 30 (and hence to the branching cables 24, 26) is used for transmission to and from the branch stations 20*c*, 20*d*.

In the conventional simple double landing system, a trouble in any of the optical fiber cables 12, 14, 16 connecting stations, such as breakage, malfunction of an optical repeater, or the like, thoroughly disables communication between stations on both sides of the location of trouble. Moreover, in the simple double landing system, since optical signals used for communication between the trunk stations 10*a*, 10*b* travel through the branch stations 10*c*, 10*d*, a delay of communication between trunk stations is inevitable.

In the simple underwater branching system, since the trunk stations 20*a*, 20*b* are connected directly, transmission delay is small, and there is no particular reason of delay in communication between trunk stations. A problem lies in that any trouble in the branching cable 24 or 26 disables transmission to and from a corresponding branch station 20*c* or 20*d*. There is no obstacle for transmission between the trunk stations 20*a*, 20*b* unless any trouble occurs in the trunk cable 22.

If the amount and importance of communication to the branch stations 20*c*, 20*d* are less than those of communication between the trunk stations 20*a*, 20*b*, the construction of the system shown in FIG. 34 would be acceptable. However, the importance of the branch stations 20*c*, 20*d* increases, the conventional construction is insufficient.

That is, it has become more and more important to guarantee communication lines to branch stations as well, and a demand for techniques dealing with troubles in optical communication lines and supply lines.

SUMMARY OF THE INVENTION

It is therefore an object of the invention to provide an optical transmission system satisfying such requirements and having signal transmission lines to branch stations which are durable against troubles.

According to the invention, there is provided an optical transmission system having a plurality of branching units on a main transmission line, and connecting individual branching units to a branch station by individual branching cables and to each other by an inter-unit connecting cable. Each branching unit has means for transferring a signal from another station to the branch station via the branching cable or to the adjacent branching unit via the inter-unit connecting cable, and means for transferring signal from the branch station to another station or to the adjacent branching unit via the inter-unit connecting cable.

Thus, by using double communication lines to each branch station, the communication path with the branch station is made more reliable.

A power supply line may be provided for each branching cable to prevent generation and entry of noise light.

Each branching unit may be made by using optical elements having no movable portion, such as demultiplexing means, multiplexing means, coupler, optical circulator, and so forth, to construct a highly reliable branching unit with less troubles and to realize a highly reliable optical transmission system.

On the other hand, the transmission loss can be reduced by using a selective switch.

When each optical transmission line of each inter-unit connecting cable is used in a unidirectional mode, branching units can be disposed more distant, and the probability of simultaneous damages to a plurality of branching cables can be decreased.

Light detector/switch controller may be provided in each branching unit to control the switching action of an optical switch inside. Thus, the flow of optical signals in each branching unit is switched autonomously without the aid from a branch station or a trunk station.

BRIEF DESCRIPTION OF THE DRAWINGS

FIGS. 2(*a*), 2(*b*) and 2(*c*) are diagrams illustrating a first combination of in-use and spare lines in the same embodiment;

FIGS. 3(*a*) and 3(*b*) are diagrams illustrating a second combination of in-use and spare lines in the same embodiment of the invention;

DESCRIPTION OF THE PREFERRED EMBODIMENTS

Embodiments of the invention are explained below in detail with reference to the drawings.

Figure 1:
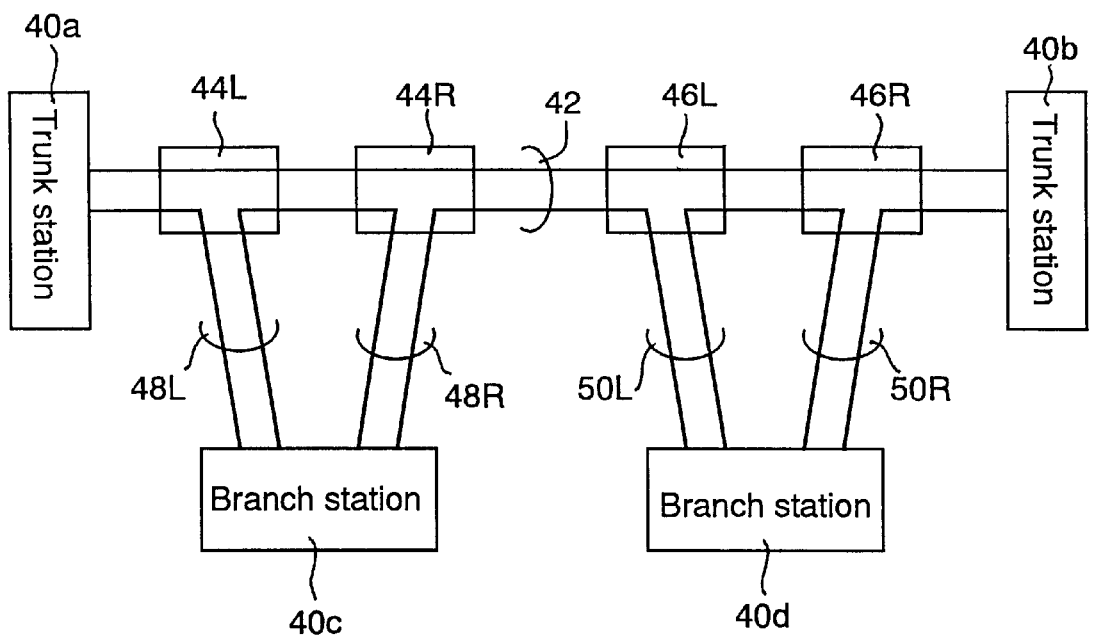
FIG. 1 is a block diagram schematically showing a first embodiment of the invention.

FIG. 1 schematically shows the first embodiment of the invention. A trunk cable 42 having two pairs of optical fibers is provided between trunk stations 40a, 40b. One of two pairs of the optical fibers is used for communication between the trunk stations 40a, 40b. The other of two pairs of the optical fibers is used for communication among the trunk stations 40a, 40b and branch stations 40c, 40d. Two branching units 44L, 44R; 46L, 46R are provided on the other pair for each branch station 40c, 40d, and are connected to the associated branch stations 40c, 40d by branching cables 48L, 48R, 50L, 50R.

That is, the branch station 40c is connected to the branching unit 44L by the branching cable 48L having two optical fiber pairs and to the branching unit 44R by the branching cable 48R having two optical fiber pairs. Depending on cases, two optical fiber pairs are used to connect the branching units 44L and 44R, or three (or more) optical fiber pairs are required. That will be explained later in greater detail.

The branch station 40d, branching units 46L, 46R, and branching cables 50L, 50R are related essentially in the same manner as the branch station 40c, branching units 44L, 44R, and branching cables 48L, 48R.

One optical fiber of optical fiber pair is used for upward transmission, and the other is used for downward transmission. For the branch station 40c, it is sufficient to have one optical fiber pair for communication with the trunk station 40a, one optical fiber pair for communication with the branch station 40d (or trunk station 40b). Since four optical fiber pairs of the branching cables 48L, 48R are connected to the branch station 40c, two pairs may be used currently, and the other two may be kept in spare. Depending on combinations of in-use and spare fibers, two different types can be settled. One of them is shown in FIG. 2(a), and the other is shown in FIG. 3(a). In both figures, in-use optical fiber pairs are shown by solid lines, and reserved optical fiber pairs are shown by broken lines.

In FIG. 2(a), one optical fiber pair of the branching cable 48L and one optical fiber pair of the branching cable 48R are in-use lines, and the others are spare lines. Also the optical fiber lines connecting the branching units 44L, 44R are spare lines. This system has the advantage that the reserved optical fiber pairs can be used to always monitor breakage of both branching cables 48L, 48R by C-OTDR (Coherent Optical Time Domain Reflectometry).

FIG. 2(b) shows lines which are used when any trouble occurs in the left branching cable 48L. In this case, two optical fiber pairs of the branching cable 48R and the optical fiber lines between the branching units 44L, 44R are in-use lines, among them, one of two optical fiber pairs of the branching cable 48R being for communication with the trunk station 40a, and the other pair being for communication with the branch station 40d (or trunk station 40b).

FIG. 2(c) shows lines which are used upon any trouble in the right branching cable 48R. In this case, two optical fiber pairs of the branching cable 48L and the optical fiber lines between the branching units 44L, 44R are in-use lines, among them, one of two optical fiber pairs of the branching cable 48L being for communication with the trunk station 40a, and the other pair being for communication with the branch station 40d (or trunk station 40b).

In FIG. 3(a), the branching cable 48L (two pairs of optical fibers thereof) is for current use, and the branching cable 48R (two pairs of optical fibers thereof) is reserved. The optical fiber lines connecting between the branching units 44L, 44R are used any time.

When any trouble occurs in the branching cable 48L, the branching cable 48R is used as in-use lines as shown in FIG. 3(b).

Next explained are details of the branching units 44L, 44R and branching units 46L, 46R and their connection.

Figure 4:
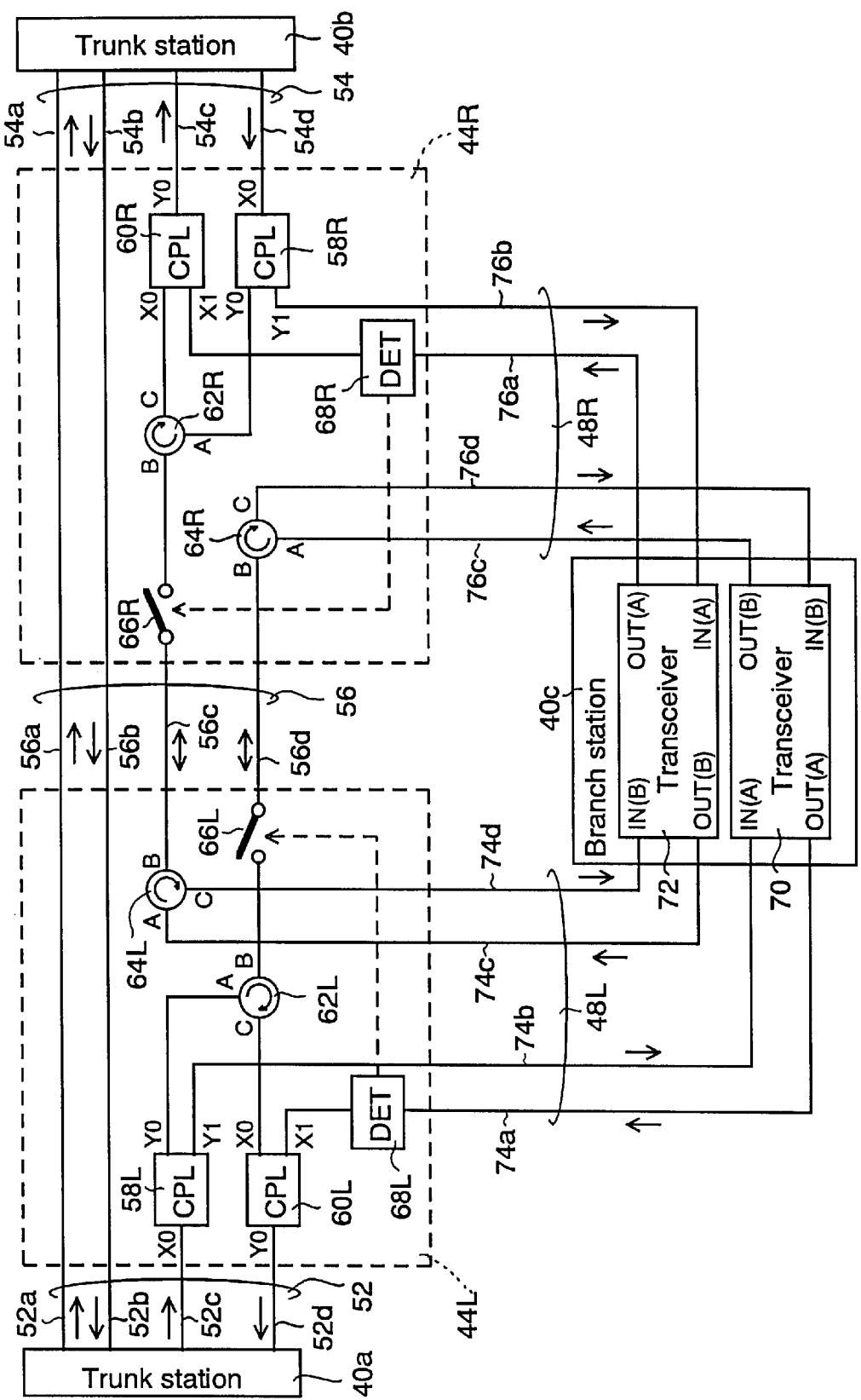
FIG. 4 is a block diagram schematically showing a construction of branching units 44L, 44R corresponding to FIG. 2(*a*)

FIG. 4 is a block diagram schematically showing the branching units 44L, 44R in an arrangement corresponding to FIG. 2(a). For simplicity, branching units 46L, 46R and the branch station 40d are omitted from illustration. In the explanation made below, the direction from the trunk 40a toward the trunk station 40b is referred to as upward, and the opposite direction as downward. Arrows show traveling directions of main optical signals.

An optical fiber cable 52 connecting the trunk station 40a to the branching unit 44L includes four optical fibers 52a, 52b, 52c, 52d in which the optical fibers 52a, 52b make a pair and the optical fibers 52c, 52d make another pair. Also an optical fiber cable 54 connecting the trunk station 40b to the branching unit 44R and another optical fiber cable (inter-unit connecting cable) 56 connecting between the branching unit 44L and 44R respectively include four optical fibers 54a, 54b, 54c, 54d, and four optical fibers 56a, 56b, 56c, 56d. The branching unit 44L connects the optical fibers 52a, 52b directly to the optical fibers 56a, 56b, respectively, and the branching unit 44R connects the optical fibers 54a, 54b directly to the optical fibers 56a, 56b, respectively. That is, the optical fibers 52a, 54a and 56a are used for transmission of optical signals from the trunk station 40a to the trunk station 40b, the optical fibers 52b, 54b and 56b are used for transmission of optical signals from the trunk station 40b to the trunk station 40a.

In each of the optical fibers 52a, 52b, 52c, 52d; 54a, 54b, 54c, 54d of the optical fiber cables 52, 54, an optical amplifying repeater is inserted in an appropriate position. In the optical fiber cable 56, however, particularly in the optical fibers 56c, 56d for bidirectional transmission of optical signals, such a repeater having a directivity is not inserted. Only a bi-directional repeater can be inserted.

The branching units 44L, 44R have inner structures which are rotationally symmetric substantially, and each includes an optical coupler (or optical divider) 58L, 58R having one input port X0 and two output ports Y0, Y1, an optical coupler (or multiplexer) 60L, 60R having two input ports X0, X1 and one output port Y0, two optical circulators 62L, 64L; 62R, 64R having three ports A, B and C, an optical switch 66L, 66R, and a light detector/switch controller 68L, 68R for splitting and detecting optical carriers to thereby open or close the optical switch 66L, 66R. The optical couplers 58L, 58R are optical elements for dividing the input light from the input port X0 into two parts and for outputting them from the output ports Y0, Y1. The optical couplers 60L, 6OR are optical elements for multiplexing the input light from the input ports X0, X1 and for outputting the light from the output port Y0. The optical circulators 62L, 64L; 62R, 64R are optical elements for letting the input light from the port A be output from the port B and for letting the input light from the port B be output through the port C.

The branch station 40c has optical transceivers 70 and 72 each having two optical inputs IN(A), IN(B) and two optical outputs OUT(A), OUT(B). That is, each of the optical transceivers 70, 72 has two routes A and B of optical inputs and optical outputs.

The branching cable 48L has four optical fibers 74a, 74b, 74c, 74d, and the branching cable 48R also has four optical fibers 76a, 76b, 76c, 76d. The optical fibers 74a and 74b make a pair, and the optical fibers 74c and 74d make another pair. Similarly, the optical fibers 76a and 76b of the branching cable 48R make a pair and the optical fibers 76c and 76d make another pair. Typically, an optical amplifying repeater is inserted in an appropriate portion of each of the optical fibers 74a through 74d and 76a through 76d of the branching cables 48R and 48L.

Explained below are connections of respective elements in the branching unit 44L. The upward optical fiber 52c of the optical fiber cable 52 is connected to the input port X0 of the optical coupler 58L. The output port Y0 of the optical coupler 58L is connected to the port A of the optical circulator 62L. The output port Y1 of the optical coupler 58L is connected to the optical input IN(A) of the optical transceiver 70 in the branch station 40c via the optical fiber 74b of the branching cable 48L. The port B of the optical circulator 62L is connected to one end of the optical fiber 56d of the optical fiber cable 56 via the optical switch 66L. The port C of the optical circulator 62L is connected to the input port X0 of the optical coupler 60L.

The optical output OUT(A) of the optical transceiver 70 in the branch station 40c inputs into the light detector/switch controller 68L via the optical fiber 74a of the branching cable 48L. output light from the light detector/switch controller 68L enters into the input port X1 of the optical coupler 60L. The light detector/switch controller 68L extracts part of the input light to detect the presence or absence of an optical signal and to responsively open or close the optical switch 66L, and outputs the other part of the input light directly. The output port Y0 of the optical coupler 60L connects to the trunk station 40a via the downward optical fiber 52d of the optical fiber cable 52.

The optical output OUT(B) of the optical transceiver 72 in the branch station 40c connects to the port A of the optical circulator 64L via the optical fiber 74c of the branching cable 48L. The port B of the optical circulator 64L connects to one end of the optical fiber 56c of the optical fiber cable 56, and the port C of the optical circulator 64L connects to the optical input IN(B) of the optical transceiver 72 in the branch station 40c via the optical fiber 74d of the branching cable 48L.

Next explained connections of respective elements in the branching unit 44R. The downward optical fiber 54d of the optical fiber cable 54 connects to the input port X0 of the optical coupler 58R. The output port Y0 of the optical coupler 58R connects to the port A of the optical circulator 62R. The output port Y1 of the optical coupler 58R connects to the optical input IN(A) of the optical transceiver 72 in the branch station 40c via the optical fiber 76b of the branching cable 48R. The port B of the optical circulator 62R connects to the other end of the optical fiber 56c of the optical fiber cable 56 via the optical switch 66R. The port C of the optical circulator 62R connects to the input port X0 of the optical coupler 60R.

The optical output OUT(A) of the optical transceiver 72 in the branch station 40c inputs into the light detector/switch controller 68R via the optical fiber 76a of the branching cable 48R. output light of the light detector/switch controller 68R connects to the input port X1 of the optical coupler 60R. Similarly to the light detector/switch controller 68L, the light detector/switch controller 68R extracts part of the input light to detect the presence or absence of an optical signal and to responsively open or close the optical switch 66L, and outputs the other part of the input light directly. The output port Y0 of the optical coupler 60R connects to the trunk station 40b via the upward optical fiber 54c of the optical fiber cable 54.

The optical output OUT(B) of the optical transceiver 70 in the branch station 40c connects to the port A of the optical circulator 64R through the optical fiber 76c of the branching cable 48R. The port B of the optical circulator 64R connects to one end of the optical fiber 56d of the optical fiber cable 56, and the port C of the optical circulator 64R connects to the optical input IN(B) of the optical transceiver 70 in the branch station 40c via the optical fiber 76d of the branching cable 48R.

Figure 5:
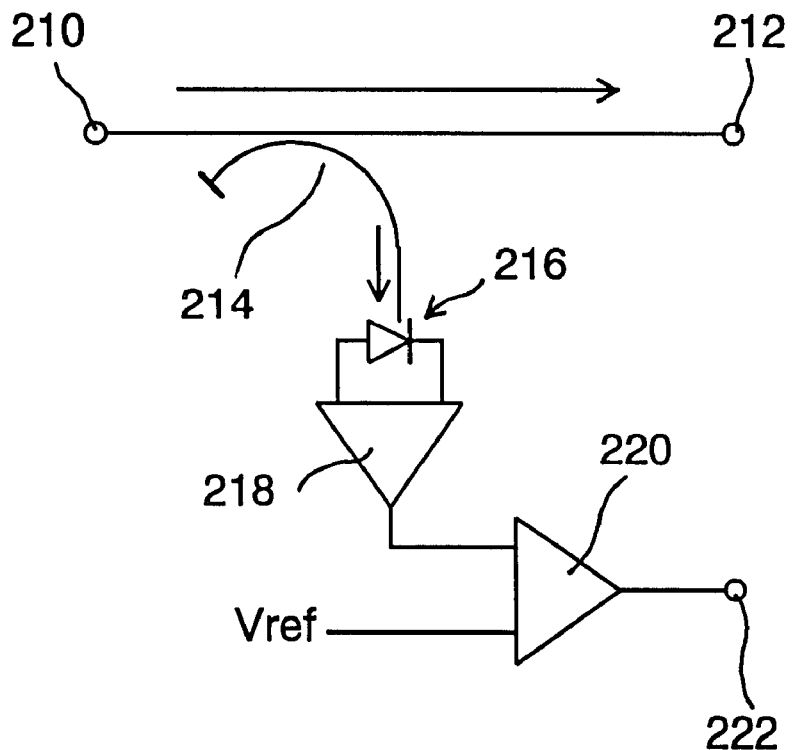
FIG. 5 is a block diagram schematically showing a construction of light detector/switch controllers 68L and 68R.

FIG. 5 is a block diagram schematically showing the construction of the light detector/switch controllers 68L and 68R. Light enters into an optical input terminal 210, and almost all of it is output from an optical output terminal 212. Part of it, however, divided by a coupler 214 enters into a photodetector 216, and the photodetector 216 outputs an electric signal indicating the intensity of the input light. An amplifier 218 amplifies the output of the photodetector 216, or converts it from current to voltage, and applies it to one of input terminals of the comparator 220. Applied to the other input terminal of the comparator 220 is a constant reference voltage Vref, and the comparator 220 compares both inputs. Output of the comparator 220 becomes high (H) when the output voltage from the amplifier 218 is Vref or higher, and becomes low (L) when the output voltage of the amplifier. 218 is lower than Vref. Output of the comparator 220 is applied to a switching control terminal of the optical switch 66L or 66R through the output terminal 222. That is, when the output of the comparator 220 is high (H), the optical switch 66L or 66R is opened. When the output of the comparator 220 is low (L), the optical switch 66L or 66R is closed.

Figure 6:
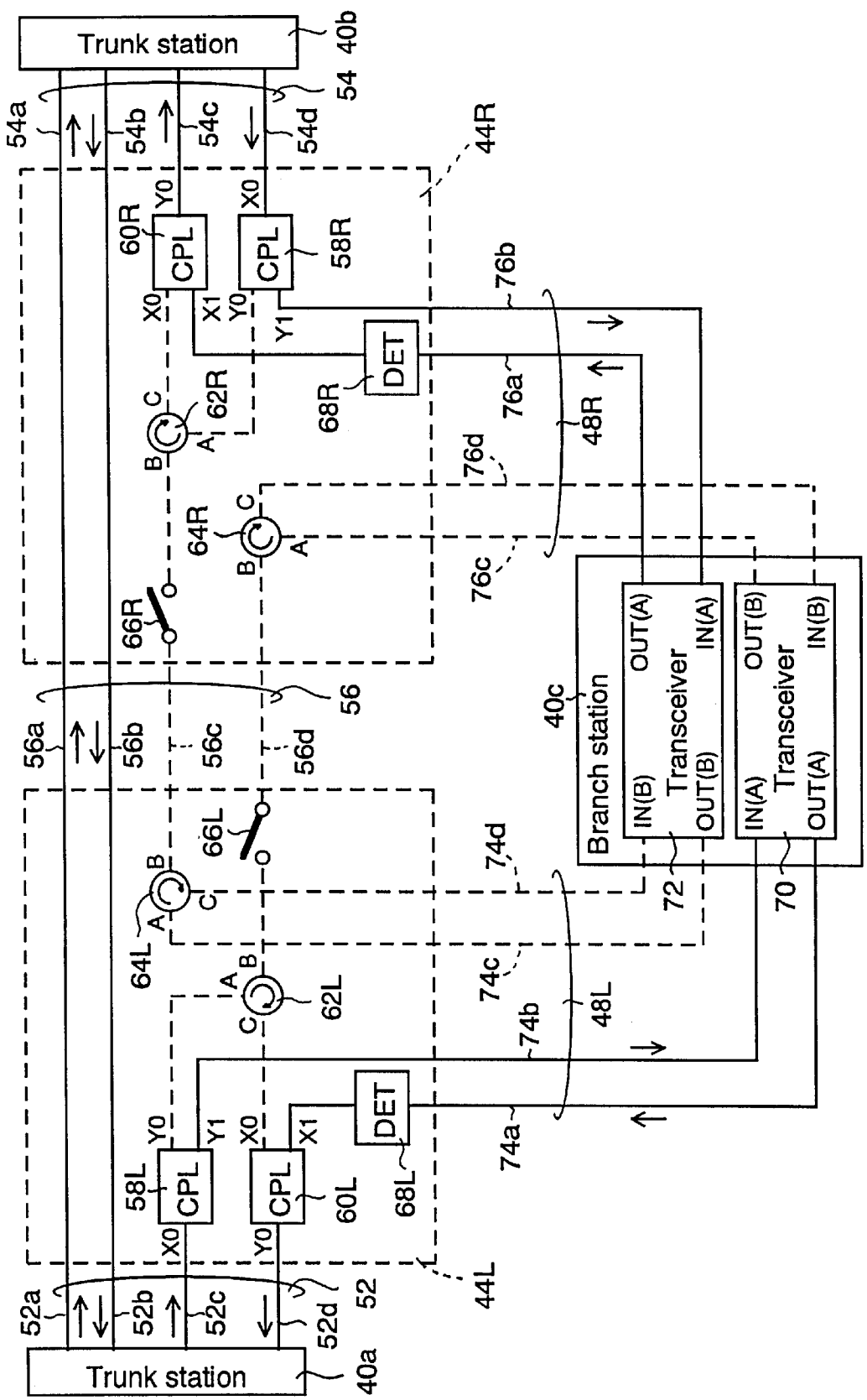
FIG. 6 is a diagram showing lines normally used in the embodiment shown in FIG. 4.

FIG. 6 shows lines normally used in the embodiment shown in FIG. 4. Here are used the optical fibers 74a, 74b of the branching cable 48L and the optical fibers 76a, 76b of the branching cable 48R. In this case, the branch station 40c uses the optical input IN(A) and optical output OUT(A) of the optical transceiver 70 for communication with the trunk station 40a and the optical input IN(A) and optical output OUT(A) of the optical transceiver 72 for communication with the trunk station 40b. Lines through which optical signals travel are shown by solid lines whereas other lines, including those currently being spare lines, which do not contribute to propagation of optical signals, are shown by broken lines. For the purpose of avoiding any confusion and for easier understanding, switching control signal lines from the light detector/switch controllers 68L, 68R to the optical switches 66L, 66R are omitted from illustration.

An optical signal output from the trunk station 40a to the optical fiber 52c enters into the input port X0 of the optical coupler 58L, and it is divided into two and output from the output ports Y0 and Y1. The light from the output port Y1 of the optical coupler 58L enters into the optical input IN(A) of the optical transceiver 70 in the branch station 40c through the optical fiber 74b of the branching cable 48L. An optical signal output from the optical output OUT(A) of the optical transceiver 70 in the branch station 40c travels along the optical fiber 74a, then enters into the light detector/ switch controller 68L, and substantially all of it enters into the input port X1 of the optical coupler 60L. The optical coupler 60L outputs the input light through the port X1 from the output port Y0 toward the trunk station 40a. In this manner, the optical signals can be exchanged bidirectionally between the trunk station 40a and the branch station 40c (optical transceiver 70 thereof).

The light detector/switch controller 68L is configured to detect the presence of an optical signal from the optical fiber 74a, and maintains the optical switch 66L open. In this manner, it is prevented that noise light enters into the port B of the optical circulator 62L and hence into the input port X0 of the optical coupler 60L.

The light output from the output port Y0 of the optical coupler 58L enters into the port A of the optical circulator 62L, goes out from the port B, and enters into the optical switch 66L. However, since the optical switch 66L is held open by the light detector/switch controller 68L as explained above, the incident light from the port B of the optical circulator 62L is absorbed.

An optical signal output from the trunk station 40b onto the optical fiber 54d enters into the input port X0 of the optical coupler 58R, and it is divided into two and output from the output ports Y0 and Y1. The light from the output port Y1 of the optical coupler 58R enters into the optical input IN(A) of the optical transceiver 72 in the branch station 40c through the optical fiber 76b of the branching cable 48R. An optical signal output from the optical output OUT(A) of the optical transceiver 72 in the branch station 40c enters into the light detector/switch controller 68R through the optical fiber 76a of the branching cable 48R, and substantially all of it passes through and enters into the input port X1 of the optical coupler 60R. The optical coupler 60R sends out the input light through the input port X1 from the output port Y0 toward the trunk station 40b. In this manner, the optical signals can be exchanged bidirectionally between the trunk station 40b and the branch station 40c (optical transceiver 72 thereof). The light detector/switch controller 68R detects the presence of an optical signal from the optical fiber 76a, and maintains the optical switch 66R open.

The light from the output port Y0 of the optical coupler 58R enters into the port A of the optical circulator 62R, goes out from the port B, and enters into the optical switch 66R. However, since the optical switch 66R is held open by the light detector/switch controller 68R as explained above, the incident light from the port B of the optical circulator 62R is absorbed.

Figure 7:
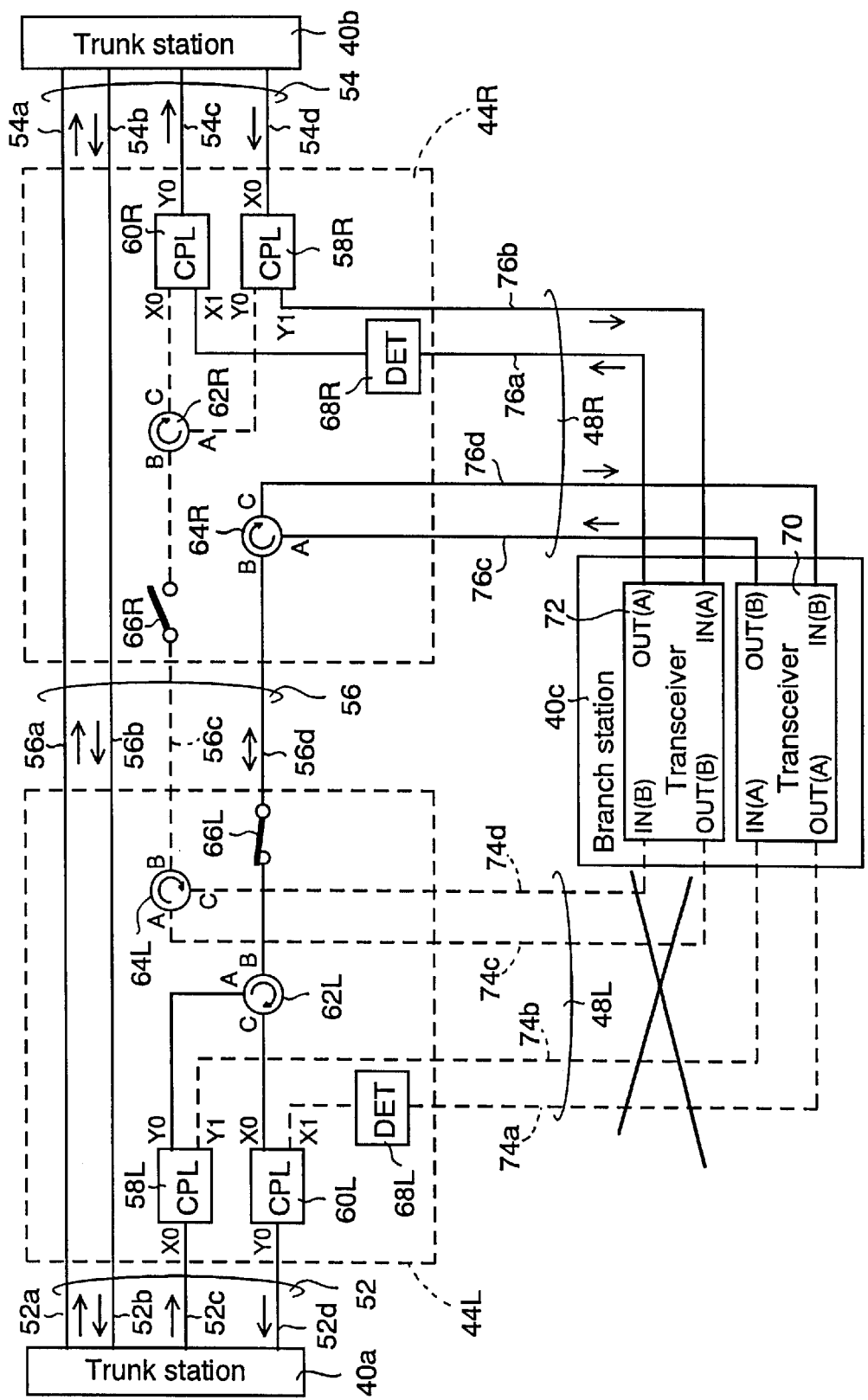
FIG. 7 is a diagram of lines used in the embodiment shown in FIG. 4 when any trouble occurs in a branching cable 48L.

FIG. 7 shows lines used when the optical fibers 74a through 74d become unusable due to any trouble, such as breakage, in the branching cable 48L. In place of the optical fibers 74a, 74b, the optical fibers 76c and 76d of the branching cable 48R are used. The branch station 40c uses the optical input IN(B) and optical output OUT(B) of the optical transceiver 70 for communication with the trunk station 40a. For communication with the trunk station 40b, however, it uses the optical input IN(A) and optical output OUT(A) of the transceiver 72 as in the normal condition (FIG. 6). Lines where optical signals propagate are shown by solid lines, and other lines, including those currently being spare lines, where optical signals do not propagate, are shown by broken lines. In the same manner as FIG. 6, for the purpose of avoiding any confusion and for easier understanding, switching control signal lines from the light detector/switch controllers 68L, 68R to the optical switches 66L, 66R are omitted from illustration.

Communication between the trunk station 40b and the branch station 40c is the same as that of FIG. 6, and here is explained in detail only the route of optical signals between the trunk station 40a and the branch station 40c.

An optical signal output from the trunk station 40a onto the optical fiber 52c enters into the input port X0 of the optical coupler 58L, and it is divided into two and output from the output ports Y0 and Y1. The light from the output port Y0 of the optical coupler 58L enters into the port A of the optical circulator 62L, goes out from the port B, and enters into the optical switch 66L. Since no optical signal exists on the optical fiber 74a, the light detector/switch controller 68L holds the optical switch 66L closed. Therefore, the light from the port B of the optical circulator 62L enters into the port B of the optical circulator 64R through the optical switch 66L and the optical fiber 56d. The light input to the port B of the optical circulator 64R is output from the port C, and enters into the optical input IN(B) of the optical transceiver 70 through the optical fiber 76d of the branching cable 48R. In this manner, the optical signals output from the trunk station 40a onto the optical fiber 52c can reach the optical input IN(B) of the optical transceiver 70 in the branch station 40c.

The branch station 40c outputs an optical signal for the trunk station 40a through the optical output OUT(B) of the optical transceiver 70. The light from the optical output OUT(B) of the optical transceiver 70 enters into the port A of the optical circulator 64R through the optical fiber 76c of the branching cable 48R, and output from the port B thereof. The output light from the port B of the optical circulator 64R enters into the port B of the optical circulator 62L through the optical fiber 56d and the optical switch 66L, and output from the port C thereof. The output light through the port C of the optical circulator 62L enters into the input port X0 of the optical coupler 60L, goes out from the output port Y0 thereof, and enters into the trunk station 40a through the optical fiber 52d. In this manner, the light output from the branch station 40c (from optical output OUT(B) of the optical transceiver 70) can reach the trunk station 40a.

In case of FIG. 7, optical signals propagate bidirectionally through the optical switch 66L and the optical fiber 56d. Therefore, no optical element having a directivity, such as amplifying repeater, can be connected between the port B of the optical circulator 62L and the port B of the optical circulator 64R. By using an optical amplifying bidirectional repeater, the optical branching units 44L and 44R can be located distant.

In contrast, when any trouble occurs in the branching cable 48R, the branch station 40c communicates with the trunk stations 40a, 40b, using the branching cable 48L. At that time, the optical switch 66R is closed, and the optical switch 66L is opened.

In the embodiment shown in FIG. 4, the couplers 58L and 60L may be replaced with selective optical switches responsive to results of detection by the light detector/switch controller 68L to connect to the ports Y1 and X1, respectively, when an optical signal exists on the optical fiber 74a of the branching cable 48L (FIG. 6) and to connect to the ports Y0 and X0, respectively, when no signal exists on the optical fiber 74a of the branching cable 48L (FIG. 7). The same applies to the couplers 58R and 60R. The optical switches are disadvantageous in having a more complicated structure than that of the couplers 58L, 60L, 58R, 60R; however, their transmission loss is smaller, and noise can be suppressed.

In the status shown in FIG. 6, the optical switches 66L and 66R prevent entry of noise light from the reserved optical fibers 74c, 76c into the ports X0 of the optical couplers 60L, 60R. When noise light is negligible, or when the optical couplers 60L and 60R are replaced with the selective optical switches as mentioned above, the optical switches 66L and 66R can be omitted.

In the embodiments shown in FIGS. 4 to 7, the optical couplers 58L, 58R, 60L, 60R can be replaced with the optical switches controlled in switching motion by the light detector/switch controllers 68L and 68R. In this case, their structure would be more complicated, but the transmission loss is reduced.

Figure 8:
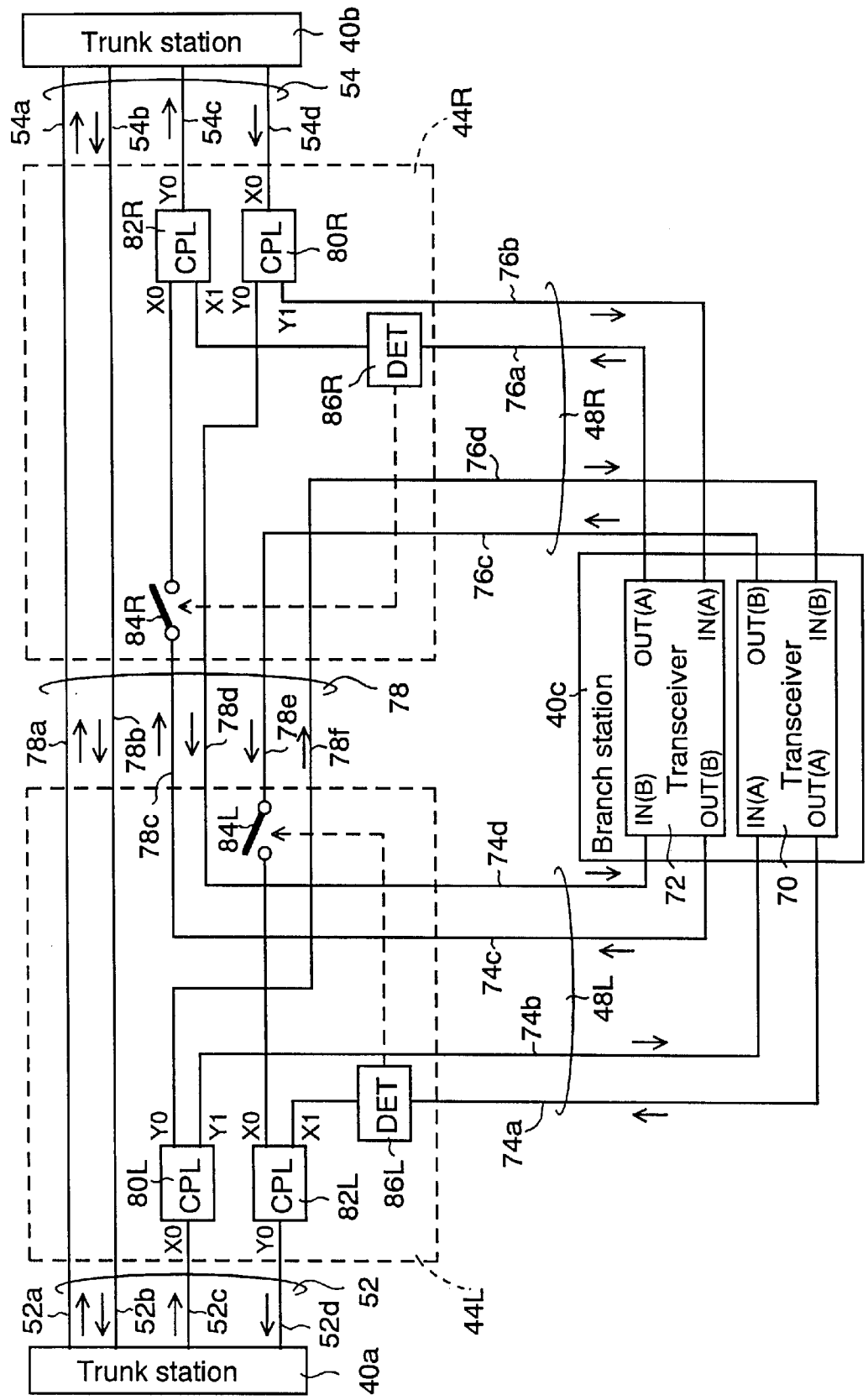
FIG. 8 is a block diagram schematically showing another construction of the branching units 44L, 44R corresponding to FIG. 2(a)

FIG. 8 is a block diagram schematically showing another construction of the branching units 44L and 44R corresponding to FIG. 2(a). The same elements as those of FIG. 4 are labeled with common numerals. Although the embodiment shown in FIG. 4 uses the optical fibers 56c and 56d connecting the branching units 44L and 44R bidirectionally when any trouble occurs, the embodiment shown in FIG. 8 uses them in only one determined direction. That is, an optical fiber cable (inter-unit connecting cable) 78 connecting the branching units 44L and 44R includes six optical fibers 78a, 78b, 78c, 78d, 78e and 78f two of which, 78a and 78b, are used for communication between the trunk stations 40a and 40b and the other four of which, 78c through 78f, are used for communication which the branch station 40c concerns with. In this manner, optical amplifiers can be inserted in individual optical fibers 78a through 78f of the inter-unit connecting cable 78, and the distance between the branching units 44L and 44R can be increased as long as requiring an optical amplifying repeater. The longer the distance between the branching units 44L and 44R, the lower the probability of simultaneous damages to the branching cables 48L and 48R, and the lower the risk of cutting off the communication with the branch station 40c.

Explained below the construction of the branching units 44L and 44R shown in FIG. 8. Also in the embodiment of FIG. 8, the branching units 44L and 44R have inner structures which are rotationally symmetric substantially, and each includes an optical coupler (or optical divider) 80L, 80R having one input port X0 and two output ports Y0, Y1, an optical coupler (or multiplexer) 82L, 82R having two input ports X0, X1 and one output port Y0, an optical switch 84L, 84R, and a light detector/switch controller 86L, 86R, similar to the light detector/switch controller 68L, 68R, for splitting and detecting optical carriers to thereby open or close the optical switch 84L, 84R. Like the optical couplers 58L, 58R, the optical couplers 80L, 80R are optical dividers for dividing the input light from the input port X0 into two parts and for outputting them from the output ports Y0 and Y1. Like the optical couplers 60L, 60R, the optical couplers 82L, 82R are multiplexers for multiplexing the input light from the input ports X0 and X1 and for outputting the light from the output port Y0.

Next explained are connections of respective elements in the branching units 44L, 44R in FIG. 8. The upward optical fiber 52c of the optical fiber cable 52 connects to the input port X0 of the optical coupler 80L. The output port Y0 of the optical coupler 80L connects to the optical input IN(B) of the optical transceiver 70 in the branch station 40c via the optical fiber 78f of the inter-unit connecting cable 78 and the optical fiber 76d of the branching cable 48R. The output port Y1 of the optical coupler 80L connects to the optical input IN(A) of the optical transceiver 70 in the branch station 40c through the optical fiber 74b of the branching cable 48L.

The optical output OUT(A) of the optical transceiver 70 in the branch circuit 40c enters into the light detector/switch controller 86L having the same function as the light detector/ switch controller 68L through the optical fiber 74a of the branching cable 48L. Output light from the light detector/ switch controller 86L connects to the input port X1 of the optical coupler 82L. The light detector/switch controller 86L extracts part of the input light to detect the presence or absence of an optical signal to thereby open or close the optical switch 84L, and outputs the remainder of the input light directly. The output port Y0 of the optical coupler 82L connects to the trunk station 40a through the downward optical fiber 52d of the optical fiber cable 52.

The optical output OUT(B) of the optical transceiver 72 in the branch station 40c connects to the input port X0 of the optical coupler 82R through the optical fiber 74c of the branching cable 48L, optical fiber 78c of the inter-unit connecting cable 78 and optical switch 84L.

The downward optical fiber 54d of the optical fiber cable 54 connects to the input port X0 of the optical coupler 80R. The output port Y0 of the optical coupler 80R connects to the optical input IN(B) of the optical transceiver 72 in the branch station 40c through the optical fiber 78d of the inter-unit connecting cable 78 and the optical fiber 74d of the branching cable 48L. The output port Y1 of the optical coupler 80R connects to the optical input IN(A) of the optical transceiver 72 in the branch station 40c through the optical fiber 76b of the branching cable 48R.

The optical output OUT(A) of the optical transceiver 72 in the branch station 40c enters into the light detector/switch controller 86R having the same function as the light detector/switch controller 68R through the optical fiber 76a of the branching cable 48R. The output light from the light detector/switch controller 86R connects to the input port X1 of the optical coupler 82R. The light detector/switch controller 86R extracts part of the input light to detect the presence or absence of an optical signal to thereby open or close the optical switch 84L, and output the remainder of the input light directly. The output port Y0 of the optical coupler 82R connects to the trunk station 40b through the upward optical fiber 54c of the optical fiber cable 54.

The optical output OUT(B) of the optical transceiver 70 in the branch circuit 40c connects to the input port X0 of the optical coupler 82L through the optical fiber 76c of the branching cable 48R, optical fiber 78e of the inter-unit connecting cable 78 and optical switch 84L.

Figure 9:
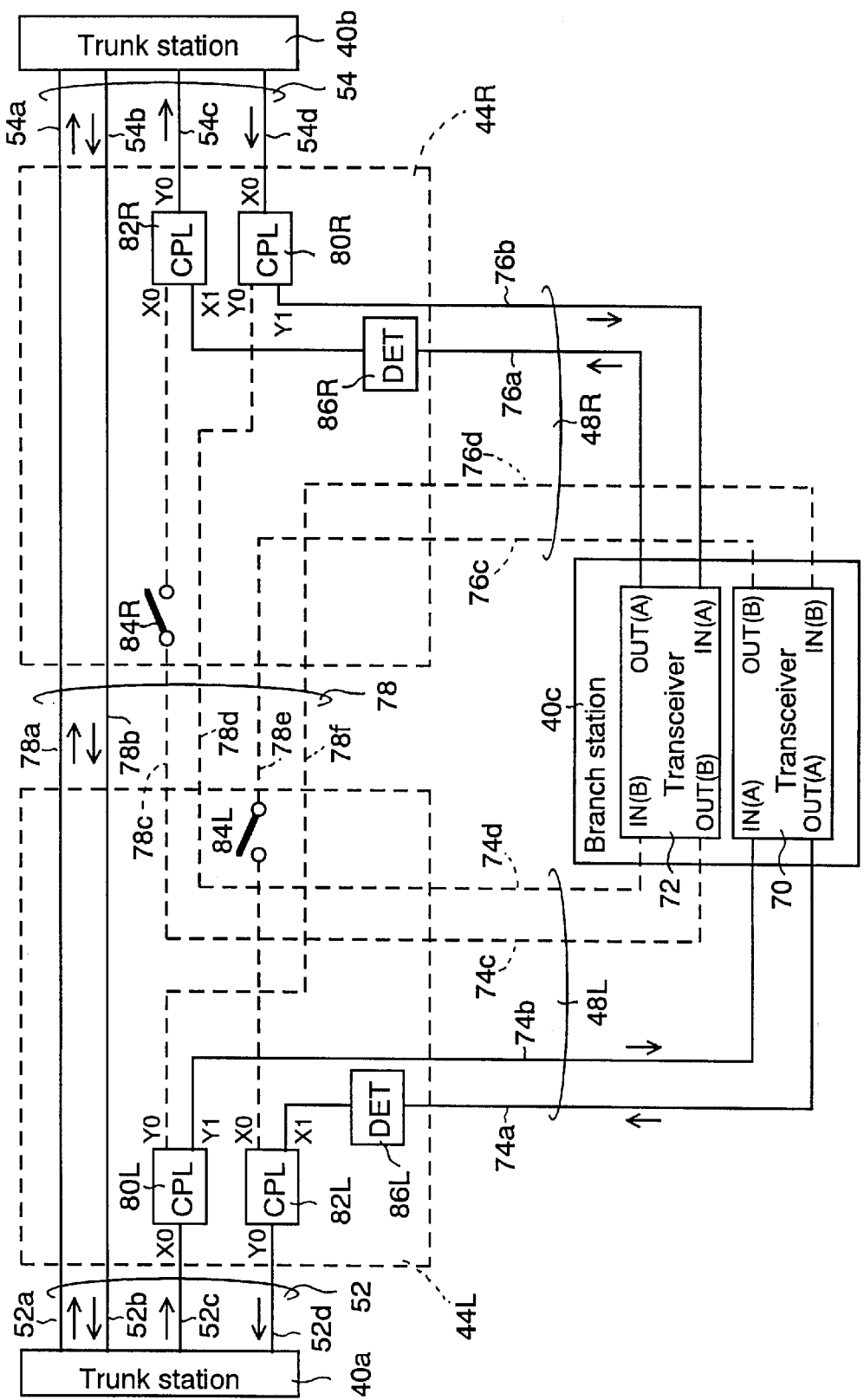
FIG. 9 is a diagram showing lines normally used in the embodiment shown in FIG. 8.

FIG. 9 shows lines normally used in the embodiment shown in FIG. 8. Here are used the optical fibers 74a, 74b of the branching cable 48L and the optical fibers 76a, 76b of the branching cable 48R. In this case, the branch station 40c uses the optical input IN(A) and optical output OUT(A) of the optical transceiver 70 for communication with the trunk station 40a, and uses the optical input IN(A) and optical output OUT(A) of the optical transceiver 72 for communication with the trunk station 40b. Lines where optical signals propagate are shown by solid lines, and other lines, including those currently being spare lines, which do not contribute to propagation of optical signals, are shown by broken lines. For avoiding any confusion and for easier understanding, switching control signal lines from the light detector/switch controllers 86L, 86R to the optical switches 84L, 84R are omitted from illustration.

An optical signal output from the trunk station 40a onto the optical fiber 52c enters into the input port X0 of the optical coupler 80L, and it is divided into two and output from the output ports Y0, Y1. The light from the output port Y1 of the optical coupler 80L enters into the optical input IN(A) of the optical transceiver 70 in the branch station 40c through the optical fiber 74b of the branching cable 48L. Optical signals from the optical output OUT(A) of the optical transceiver 70 in the branch station 40c enters into the light detector/switch controller 86L through the optical fiber 74a, and almost all of it passes therethrough and enters into the input port X1 of the optical coupler 82L. The optical coupler 82L outputs the input light at the input port X1 from its output port Y0 toward the trunk station 40a. In this manner, the optical signals can be exchanged bidirectionally between the trunk station 40a and the branch station 40c (optical transceiver 70 thereof).

The light detector/switch controller 86L detects the presence of an optical signal from the optical fiber 74a, and maintains the optical switch 84L open to thereby prevent entry of noise light into the input port X0 of the optical coupler 82L.

The light output from the output port Y0 of the optical coupler 80L enters into the input IN(B) of the optical transceiver 70 in the branch station 40c through the optical fiber 78f of the inter-unit connecting cable 78 and the optical fiber 76d of the branching cable 48R. This results in identical optical signals entering into both the optical inputs IN(A) and IN(B) of the optical transceiver 70. However, the optical transceiver 70 gives priority to the optical input IN(A) in the normal condition. The input light to input IN(B) of the optical transceiver 70, however, can be used to watch and detect troubles in the spare lines because the presence or absence thereof indicates whether any trouble has occurred or not in the branching cable 48R.

An optical signal output from the trunk station 40b onto the optical fiber 54d enters into the input port X0 of the optical coupler 80R, and it is divided into two and output from the output ports Y0, Y1. The light from the output port Y1 of the optical coupler 80R enters into the optical input IN(A) of the optical transceiver 72 in the branch station 40c through the optical fiber 76b of the branching cable 48R. An optical signal output from the optical output OUT(A) of the optical transceiver 72 in the branch station 40c enters into the light detector/switch controller 86R through the optical fiber 76a of the branching cable 48R, and almost all of it passes therethrough and enters into the input port X1 of the optical coupler 82R. The optical coupler 82R output the input light at the input port X1 from the output port Y0 toward the trunk station 40b. In this manner, the optical signals can be exchanged bidirectionally between the trunk station 40b and the branch station 40c (optical transceiver 72 thereof).

The light detector/switch controller 86R detects the presence of an optical signal from the optical fiber 76a, and maintains the optical switch 84R open to thereby prevent entry of noise light into the input port X0 of the optical coupler 82R.

The light output from the output port Y0 of the optical coupler 80R enters into the input IN(B) of the optical transceiver 72 in the branch station 40c through the optical fiber 78d of the inter-unit connecting cable 78 and the optical fiber 74d of the branching cable 48L. It results in identical optical signals entering into both the optical inputs IN(A), IN(B) of the optical transceiver 72. However, the optical transceiver 72 may give priority to the input light from the optical input IN(A) in the normal condition. The input light through the input IN(B) of the optical transceiver 72 can be used to watch and detect troubles in spare lines because the presence or absence thereof indicates whether any troubles has occurred or not in the branching cable 48R.

Figure 10:
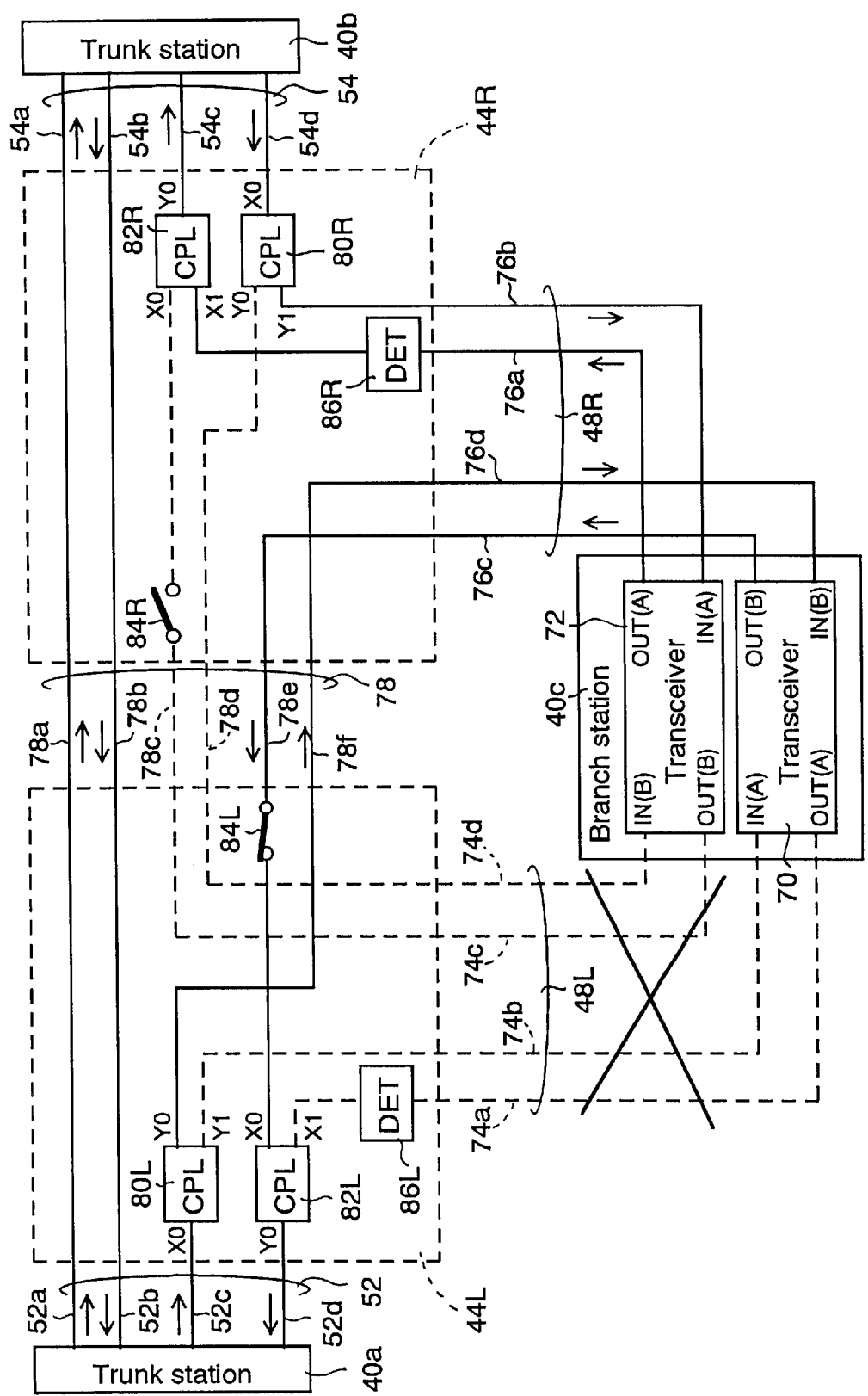
FIG. 10 is a diagram of lines used in the embodiment shown in FIG. 8 when any trouble occurs in a branching cable 48L.

FIG. 10 shows lines used when the optical fibers 74a through 74d become unusable due to any trouble, such as breakage, in the branching cable 48L. Here are used the optical fibers 76c, 76d of the branching cable 48R in place of the optical fibers 74a, 74b. This is the same as the embodiment of FIG. 4 (i.e. FIG. 7). The branch station 40c uses the optical input IN(B) and optical output OUT(B) of the optical transceiver 70 for communication with the trunk station 40a, and uses the optical input IN(A) and optical output OUT(A) for communication with the trunk station 40b, here again, as in the normal condition (FIG. 9). Lines where optical signals propagate are shown by solid lines, and other lines, including those currently being spare lines, which do not contribute to propagation of optical signals, are shown by broken lines. Similarly to FIG. 9, for avoiding any confusion and for easier understanding, switching control signal lines from the light detector/switch controllers 86L, 86R to the optical switches 84L and 84R are omitted from illustration.

Since communication between the trunk station 40b and the branch station 40c is the same as that of FIG. 9, only the route of optical signals between the trunk station 40a and the branch station 40c is explained in detail.

An optical signal output from the trunk station 40a onto the optical fiber 52c enters into the input port X0 of the optical coupler 80L, and it is divided into two and output from the output ports Y0, Y1. The light from the output port Y0 of the optical coupler 80L enters into the optical input IN(B) of the optical transceiver 70 in the branch station 40c through the optical fiber 78f of the inter-unit connecting cable 78 and the optical fiber 76d of the branching cable 48R.

The branch station 40c outputs an optical signal for the trunk station 40a from the optical output OUT(B) of the optical transceiver 70. The light from the optical output OUT(B) of the optical transceiver 70 enters into the optical switch 84L through the optical fiber 76c of the branching cable 48R and the optical fiber 78e of the inter-unit connecting cable 78. Since no signal exists on the optical fiber 74a, the light detector/switch controller 86L holds the optical switch 84L closed. Therefore, the light from the optical output OUT(B) of the optical transceiver 70 passes through the optical switch 84L and enters into the input port X0 of the optical coupler 82L. No optical signal enters into the input port X1 of the optical coupler 82L. Therefore, the optical coupler 82L outputs the input light at the input port X0 alone from the output port Y0. The output from the output port Y0 of the optical coupler 82L enters into the trunk station 40a through the optical fiber 52d of the optical fiber cable 52.

In contrast, when any trouble occurs in the branching cable 48R, the branch station 40c uses the branching cable 48L for communication with the trunk stations 40a, 40b. In this case, the optical switch 84R is closed, and the optical switch 84L is opened.

Figure 11:
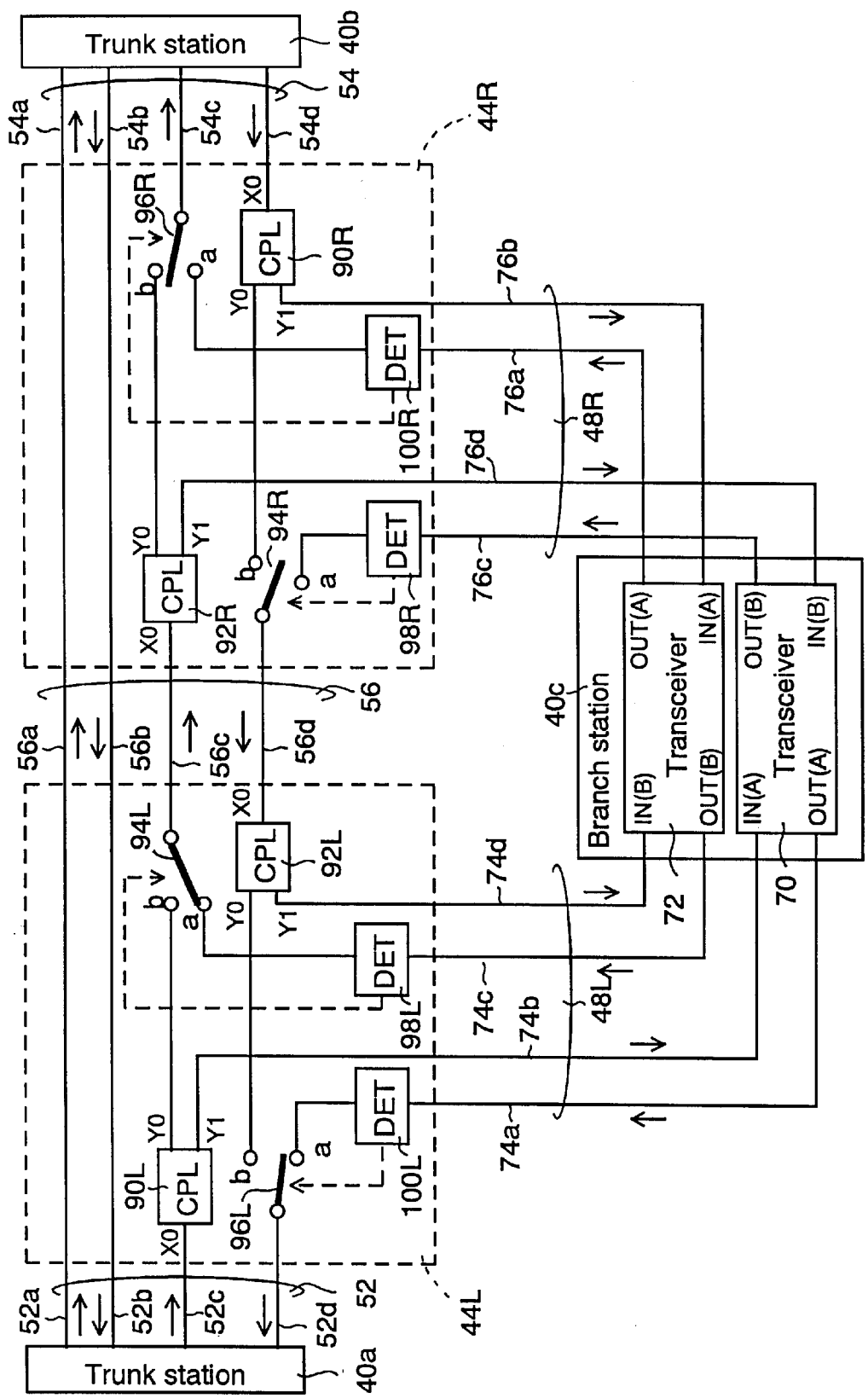
FIG. 11 is a block diagram schematically showing first construction of the branching units 44L, 44R corresponding to FIG. 3(a)

Next explained is an embodiment of the branching units 44L and 44R corresponding to FIG. 3(a). FIG. 11 is a block diagram schematically showing its construction. Similarly to FIG. 4 and following figures, for easier understanding, branching units 46L, 46R and branch station 40d are omitted, and common reference numerals are used for the same elements as those of FIG. 4. Since optical signals propagate through optical fibers 56c, 56d of the inter-unit connecting cables 56 in the same direction, both in the normal condition (when normal lines are used) and upon occurrence of a trouble (when spare lines are used), optical amplifying repeaters can be interposed therein.

Each of the branching units 44L and 44R has an optical coupler (or optical divider) 90L, 90R having one input port xo and two output ports Y0, Y1 to divide input light through the input port X0 into two and to output them from the output ports Y0, Y1, an optical coupler (or divider/multiplexer) 92L or 92R having three ports X0, Y0 and Y1 to divide input light through the port X0 and output them from the ports Y0 and Y1 and to multiplex input light through the ports Y0, Y1 and output it from the port X0, optical switches 94L, 96L; 94R, 96R each having two selectable contacts A and B, and light detector/switch controllers 98L, 100L; 98R, 100R to pick up and detect an optical carrier and to responsively control switching motions of the optical switches 94L, 96L; 94R, 96R, respectively. The optical switches 94L, 96L; 94R, 96R are held to connect the contact B in the normal condition, namely, when no external switching control signal is applied.

Connections of respective elements in the branching units 44L and 44R are explained below. The upward optical fiber 52c of the optical fiber cable 52 connects to the input port X0 of the optical coupler 90L. The output port Y0 of the optical coupler 90L connects to the contact B of the optical switch 94L. The output port Y1 of the optical coupler 90L connects to the optical input IN(A) of the optical transceiver 70 in the branch station 40c through the optical fiber 74b of the branching cable 48L. The common terminal of the optical switch 94L connects to the port X0 of the optical coupler 92R of the branching unit 44R through the optical fiber 56c of the inter-unit connecting cable 56.

The optical output OUT(B) of the optical transceiver 72 in the branch station 40c enters into the light detector/switch controller 98L via the optical fiber 74c of the branching cable 48L. Output light from the light detector/switch controller 98L connects to the contact A of the optical switch 94L. The light detector/switch controller 98L extracts part of the input light to detect the presence or absence of an optical signal, and changes connection of the optical switch 94L to the contact A when any optical signal exists.

The optical output OUT(A) of the optical transceiver 70 in the branch station 40c enters into the light detector/switch controller 100L through the optical fiber 74a of the branching cable 48L. Output light of the light detector/switch controller 100L connects to the contact A of the optical switch 96L. The light detector/switch controller 100L extracts part of the input light to detect the presence or absence of an optical signal, and changes connection of the optical switch 96L to the contact A when any optical signal exists. The common terminal of the optical switch 96L connects to the trunk station 40a via the downward optical fiber 52d of the optical fiber cable 52.

The port Y0 of the optical coupler 92L connects to the contact B of the optical switch 96L. The port Y1 connects to the optical input IN(B) of the optical transceiver 72 in the branch station 40c through the optical fiber 74d.

The downward optical fiber 54d of the optical fiber cable 54 connects to the input port X0 of the optical coupler 90R. The output port Y0 of the optical coupler 90R connects to the contact B of the optical switch 94R. The output port Y1 of the optical coupler 90R connects to the optical input IN(A) of the optical transceiver 72 in the branch station 40c through the optical fiber 76b of the branching cable 48R. The common terminal of the optical switch 94R connects to the port X0 of the optical coupler 92L of the branching unit 44L via the optical fiber 56d of the inter-unit connecting cable 56.

The optical output OUT(B) of the optical transceiver 70 in the branch station 40c enters into the light detector/switch controller 98R through the optical fiber 76c of the branching cable 48R. Output light from the light detector/switch controller 98R connects to the contact A of the optical switch 94R. The light detector/switch controller 98R extracts part of the input light to detect the presence or absence of an optical signal, and changes connection of the optical switch 94R to the contact A when any optical signal exists.

The optical output OUT(A) of the optical transceiver 72 in the branch station 40c enters into the light detector/switch controller 100R through the optical fiber 76a of the branching cable 48R. Output light from the light detector/switch controller 100R connects to the contact A of the optical switch 96R. The light detector/switch controller 100R extracts part of the input light to detect the presence or absence of an optical signal, and changes connection of the optical switch 96R to the contact A when any optical signal exists. The common terminal of the optical switch 96L connects to the trunk station 40b via the upward optical fiber 54c of the optical fiber cable 54.

The port Y0 of the optical coupler 92R connects to the contact B of the optical switch 96R. The port Y1 connects to the optical input IN(B) of the optical transceiver 70 in the branch station 40c via the optical fiber 76d of the branching cable 48R.

Like the optical switches 96L, 96R, also the optical couplers 90L, 90R may be replaced with optical switches controlled in switching motion by the light detector/switch controllers 100L, 100R. The optical switches 94L, 94R may be replaced with bidirectional optical couplers.

Figure 12:
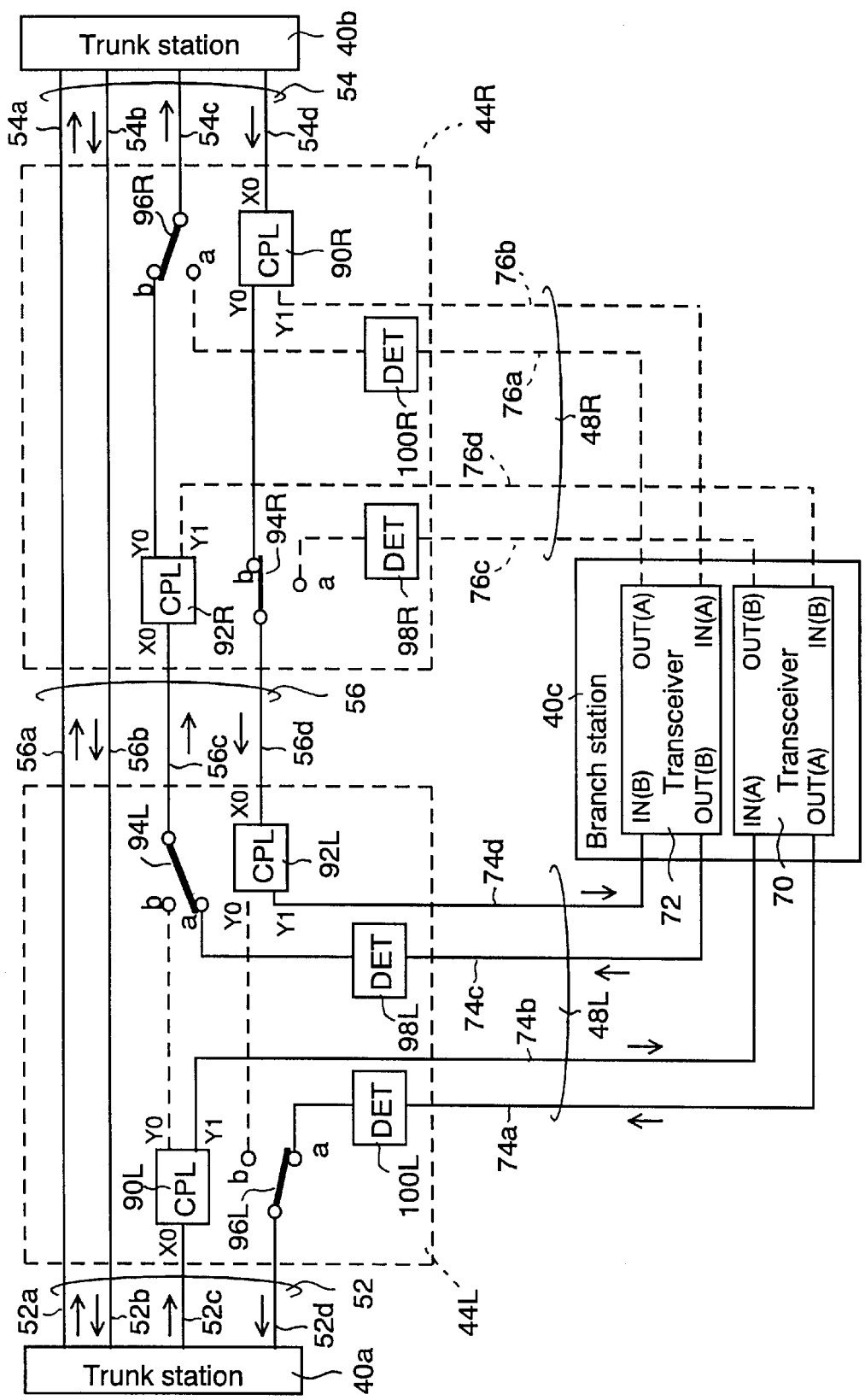
FIG. 12 is a diagram showing lines normally used in the embodiment shown in FIG. 11.

FIG. 12 shows lines normally used in the embodiment shown in FIG. 11. Here are used the optical fibers 74a, 74b of the branching cable 48L for communication with the trunk station 40a, and the optical fibers 74c, 74d of the branching cable 48L for communication with the trunk station 40b. That is, the branch station 40c uses the optical input IN(A) and optical output OUT(A) of the optical transceiver 70 for communication with the trunk station 40a, and uses the optical input IN(B) and optical output OUT(B) of the optical transceiver 72 for communication with the trunk station 40b. Lines where optical signals propagate are shown by solid lines, and other lines, including those currently being spare lines, which do not contribute to propagation of optical signals, are shown by broken lines. For avoiding any confusion and for easier understanding, switching control signal lines from the light detector/switch controllers 98L, 100L; 98R, 100R to the corresponding optical switches 94L, 96L; 94R, 96R are omitted from illustration.

In the status shown in FIG. 12, the light detector/switch controllers 98L, 100L respectively change connections of the optical switches 94L and 96L to the contact A because optical signal exists on the optical fibers 74a, 74c, but the light detector/switch controllers 98R, 100R respectively maintain the optical switches 94R, 96R at the contacts B because no optical signal exists on the optical fibers 76a, 76c.

The communicating operation or flow of optical signals between the trunk station 40a and the branch station 40c is explained below. An optical signal output from the trunk station 40a onto the optical fiber 52c enters into the input port X0 of the optical coupler 90L, and it is divided into two and output from the output ports Y0, Y1. The light from the output port Y1 of the optical coupler 90L enters into the optical input IN(A) of the optical transceiver 70 through the optical fiber 74b of the branching cable 48L. An optical signal output from the optical output OUT(A) of the optical transceiver 70 in the branch station 40c enters into the light detector/switch controller 100L via the optical fiber 74a of the branching cable 48L, and almost all of it passes therethrough and enters into the contact A of the optical switch 96L. As the light detector/switch controller 100L detects the optical signal on the optical fiber 74a and changes connection of the optical switch 96L to the contact A, the output light from the light detector/switch controller 100L enters into the trunk station 40a via the optical switch 96L and the optical fiber of the optical fiber cable 52. In this manner, the optical signals can be exchanged bidirectionally between the trunk station 40a and the branch station 40c (optical transceiver 70 thereof).

The light from the output port Y0 of the optical coupler 90L is applied to the contact B of the optical switch 94L, but it disappears because the optical switch 94L is in connection to the contact A as explained above.

Next explained is the communicating operation or the flow of optical signals between the trunk station 40b and the ranch station 40c. An optical signal output from the trunk station 40b onto the optical fiber 54d enters into the input port X0 of the optical coupler 90R, and it is divided into two and output from the output ports Y0, Y1. The light from the port Y0 of the optical coupler 90R enters into the contact B of the optical switch 94R. The optical transceiver 70 in the branch station 40c outputs no optical signal from its optical output OUT(B), and no optical signal enters into the light detector/switch controller 98R. Therefore, the optical switch 94R remains connected to the contact B. As a result, output light from the port Y0 of the optical coupler 90R enters into the port X0 of the optical coupler 92L via the optical switch 94R and the optical fiber 56d of the inter-unit connecting cable 56. The optical coupler 92L divides the input light through its port X0 into two, and outputs one from the port Y0 and the other from the port Y1. The output light from the port Y1 of the optical coupler 92L enters into the optical input IN(B) of the optical transceiver 72 in the branch station 40c via the optical fiber 74d of the branching cable 48L. In this manner, the optical signal output from the trunk station 40b reaches the branch station 40c (optical transceiver 72 thereof).

The light from output port Y1 of the optical coupler 90R enters into the optical input IN(A) of the optical transceiver 72 in the branch station 40c via the optical fiber 76b of the branching cable 48R. It results in equivalent optical signal entering into both optical inputs IN(A), IN(B) of the optical transceiver 72. However, in the normal condition, the optical transceiver 72 may give priority to the input light through the optical input IN(B). The input light through the input IN(A) of the optical transceiver 72 can be used to watch and detect troubles in spare lines because its presence or absence indicates whether any trouble exists in the branching cable 48R.

An optical signal output from the optical output OUT(B) of the optical transceiver 72 in the branch station 40c enters into the light detector/switch controller 98L through the optical fiber 74c of the branching cable 48L, and almost all of it passes therethrough and enters into the contact A of the optical switch 94L. The light detector/switch controller 98L detects the optical signal on the optical fiber 74c and changes connection of the optical switch 94L to the contact A. Therefore, the output light from the light detector/switch controller 98L enters into the port X0 of the optical coupler 92R of the branching unit 44R through the optical switch 94L and the optical fiber 56c of the inter-unit connecting cable 56. The optical coupler 92R divides the input light through the port X0 into two, and outputs one from the port Y0 and the other from the port Y1. The output light from the port Y0 of the optical coupler 92R enters into the contact B of the optical switch 96R. Since the branching cable 48R is not used, no optical signal exists on the optical fiber 76a, and the light detector/switch controller 100R maintains the optical switch 96R at the contact B. As a result, output light from the port Y0 of the optical coupler 92R enters into the trunk station 40b through the optical switch 96R and the optical fiber 54c of the optical fiber cable 54. In this manner, the optical signal from the branch station 40c reaches the trunk station 40b.

"The output light from the port Y1 of the optical coupler 92R enters into the optical input IN(B) of the optical transceiver 70 in the branch station 40c through the optical fiber 76d of the branching cable 48R. That is, it results in the optical signal from the branch station 40c (the optical output OUT(B) of the optical transceiver 70 thereof) having returned to the branch station 40c (the optical input IN(B) of the optical transceiver 70 thereof) via the branching cable 48L, branching unit 44, inter-unit connecting cable 56, branching unit 44R and branching cable 48R. Thus, it is possible not only to monitor any trouble in the branching cable 48R but also to continuously estimate and monitor the conditions of these optical signal lines such as, in particular, transmission error rate".

Figure 13:
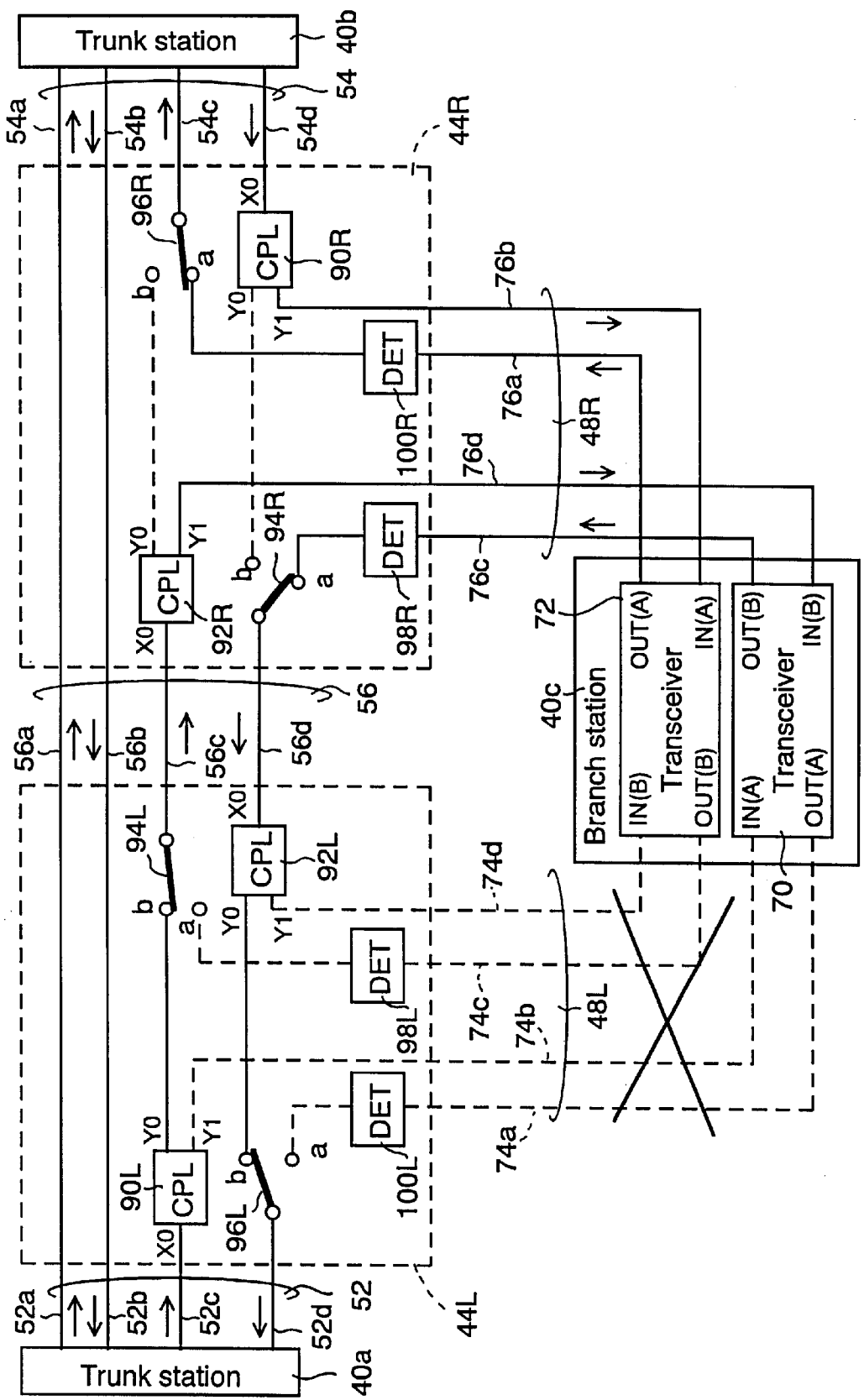
FIG. 13 is a diagram showing lines used in the embodiment shown in FIG. 11 when any trouble occurs in the branching cable 48L.

FIG. 13 shows lines used in the embodiment shown in FIG. 11 when the optical fibers 74a through 74d become unusable due to any trouble in the branching cable 48L, such as breakage. In this case, the light detector/switch controllers 98L, 100L maintain the optical switches 94L, 96L at the contacts B, respectively, and the light detector/switch controllers 98R, 100R change connections of the optical switches 94R, 96R to the contacts A, respectively. The branch station 40c uses the optical input IN(A) and optical output OUT(A) of the optical transceiver 72 for communication with the trunk station 40a, and uses the optical input IN(B) and optical output OUT(B) of the optical transceiver 70 for communication with the trunk station 40b. Lines where optical signals propagate are shown by solid lines, and other lines, including those currently being spare lines, where no optical signal propagate, are shown by broken lines. Here again, like FIG. 12, for avoiding any confusion and for easier understanding, switching control signal lines from the light detector/switch controllers 98L, 100L; 98R, 100R to the corresponding optical switches 94L, 96L; 94R, 96R are omitted from illustration.

The communicating operation or the flow of optical signals between the trunk station 40a and the branch station 40c is explained below. An optical signal output from the trunk station 40a onto the optical fiber 52b enters into the input port X0 of the optical coupler 90L, and it is divided into two and output from the output ports Y0 and Y1. The light from the port Y0 of the optical coupler 90L enters into the contact B of the optical switch 94L. The optical transceiver 72 of the branch station 40c outputs no optical signal from its optical output OUT(B), and no optical signal enters into the light detector/switch controller 98L. Therefore, the optical switch 94L remains connected to the contact B. As a result, the output light from port Y0 of the optical coupler 90L enters into the port X0 of the optical coupler 92R through the optical switch 94L and the optical fiber 56c of the inter-unit connecting cable 56. The optical coupler 92R divides the input light through the port X0 into two, and outputs one from the port Y0 and the other from the port Y1. The output light from the port Y1 of the optical coupler 92R enters into the optical input IN(B) of the optical transceiver 70 in the branch station 40c through the optical fiber 76d of the branching cable 48R. In this manner, the optical signal output from the trunk station 40a reaches the branch station 40c (the optical transceiver 70 thereof).

Although the light from output port Y1 of the optical coupler 90R enters into the optical fiber 76b of the branching cable 48R, if the branching cable 48L is entirely cut off, the light does not reach the branch station 40c. If at least the optical fiber 74b is usable, it reaches the branch station 40c. It can be known from it whether the branching cable 48L is broken entirely or not.

The optical signal output from the optical output OUT(B) of the optical transceiver 70 in the branch station 40c enters into the light detector/switch controller 98R through the optical fiber 76c of the branching cable 48R, and almost all of it passes therethrough and enters into the contact A of the optical switch 94R. The light detector/switch controller 98R detects the optical signal on the optical fiber 76c and changes connection of the optical switch 94R to the contact A. As a result, output light from the light detector/switch controller 98R enters into the port X0 of the optical coupler 92L of the branching unit 44L through the optical switch 94R and the optical fiber 56d of the inter-unit connecting cable 56. The optical coupler 92L divides the input light through its port X0 into two, and output one from the port Y0 and the other from the port Y1. The output light from the port Y0 of the optical coupler 92L enters into the contact B of the optical switch 96L. Since the branching cable 48L is not used, no optical signal exists on the optical fiber 74a. Therefore, the light detector/switch controller 100L maintains the optical switch 96L at the contact B. As a result, the output light from the port Y0 of the optical coupler 92L enters into the trunk station 40a through the optical switch 96L and the optical fiber 52d of the optical fiber cable 52. In this manner, the optical signal from the branch station 40c reaches the trunk station 40a.

Although the output light from the port Y1 of the optical coupler 92L enters into the optical fiber 76d of the branching cable 48R, if the branching cable 48L is entirely broken, the light does not reach the branch station 40c. If at least the optical fiber 74d is usable, it reaches the branch station 40c. It is known from it whether the branching cable 48L is entirely broken or not, without using a particular monitor device. In addition to the presence or absence of an optical signal from the trunk station 40a via the optical fiber 74b, the nature of a trouble in the branching cable 48L can be estimated in greater detail.

Next explained is the communicating operation or the flow of optical signals between the trunk station 40b and the branch station 40c. An optical signal output from the trunk station 40b onto the optical fiber 54d enters into the input port X0 of the optical coupler 90R, and it is divided into two and output from the output ports Y0 and Y1. The light from output port Y1 of the optical coupler 90R enters into the optical input IN(A) of the optical transceiver 72 in the branch station 40c via the optical fiber 76b of the branching cable 48R. An optical signal from the optical output OUT(A) of the optical transceiver 72 in the branch station 40c enters into the light detector/switch controller 100R via the optical fiber 76a of the branching cable 48R, and almost all of it passes therethrough and enters into the contact A of the optical switch 96R. The light detector/switch controller 100R detects the optical signal on the optical fiber 76a and changes connection of the optical switch 96R to the contact A. Therefore, the output light from the light detector/switch controller 100R enters into the trunk station 40b via the optical switch 96R and the optical fiber 54c of the optical fiber cable 54. In this manner, optical signals can be exchanged bidirectionally between the trunk station 40b and the branch station 40c (the optical transceiver 72 thereof).

Figure 14:
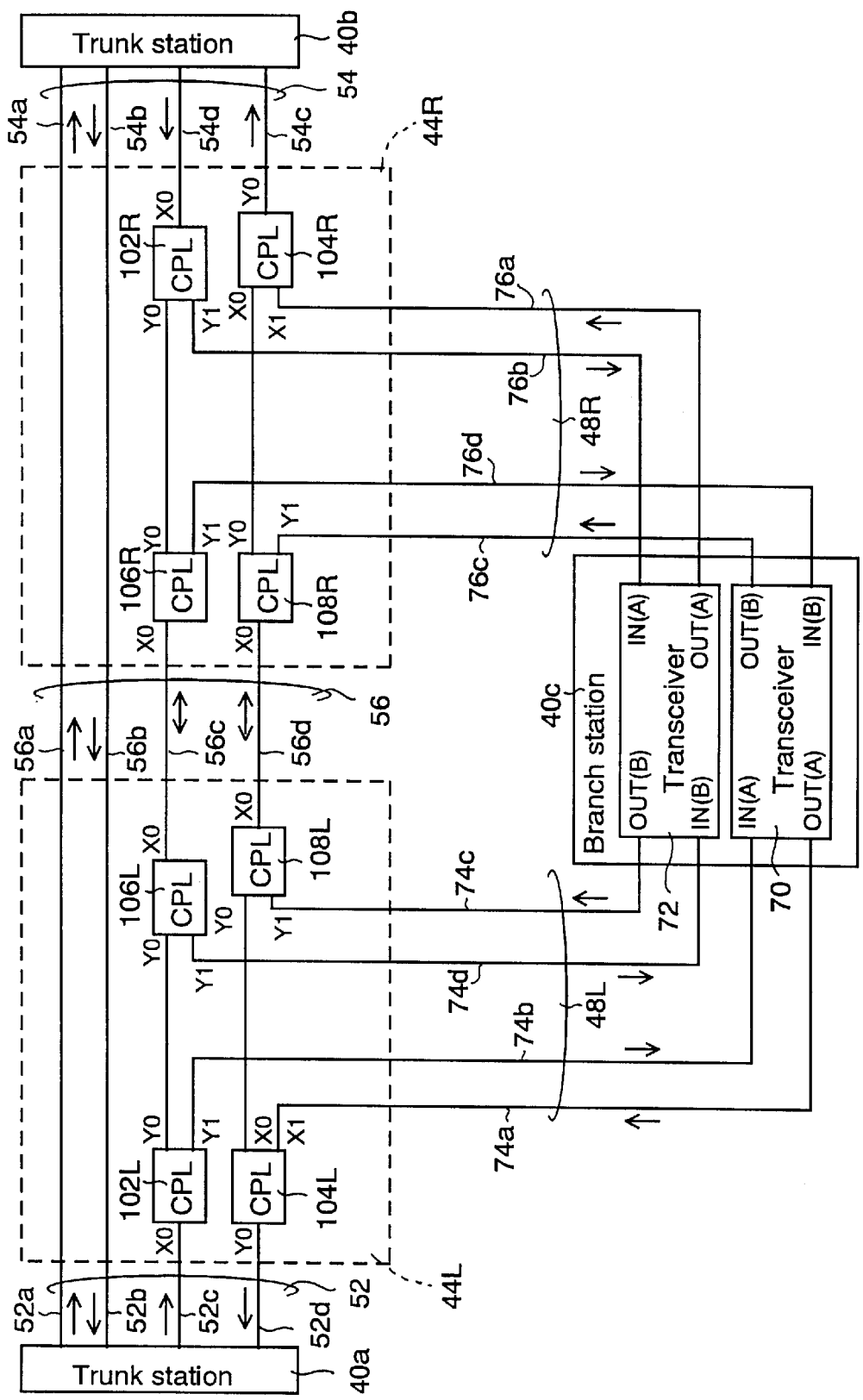
FIG. 14 is a block diagram schematically showing second construction of the branching units 44L, 44R corresponding to FIG. 3(a)

A second embodiment of the branching units 44L and 44R corresponding to FIG. 3(a) is explained below. FIG. 14 is a block diagram of its construction. Similarly to FIG. 4 et seq., the branching units 46L, 46R and the branch station 40d are omitted from illustration for easier understanding, and common elements to those of FIG. 4 are labeled with common reference numerals. Similarly to the embodiments explained with reference to FIGS. 11 to 13, optical signals may propagate in opposite directions in the normal condition (when normal lines are used) and in a troubled condition (when spare lines are used), and optical amplifying repeaters of an ordinary type cannot be inserted in the optical fibers 56c and 56d of the inter-unit connecting cable 56. However, optical amplifying repeaters of a bidirectional type can be inserted.

Each of the branching units 44L, 44R has an optical coupler (or optical divider) 102L, 102R having one input port X0 and two output ports Y0, Y1 to divide input light through the input port X0 into two and to output them from the output ports Y0, Y1, an optical coupler (or multiplexer) 104L, 104R having two input ports X0, X1 and one output port Y0 to multiplex input light from the input ports X0, X1 and to output it from the output port Y0, and two optical couplers (or divide/multiplexer) 106L, 108L; 106R, 108R having three ports X0, Y0, Y1 to divide the input lights from the port X0 into two and output them from the ports Y0, Y1 and to multiplex input lights from the ports Y0, Y1 and output them from the port X0. Since the embodiment shown here does not use optical circulators, optical switches and light detector/switch controllers, it promises inexpensive and highly reliable branching units 44L and 44R.

Connections of respective elements in the branching units 44L and 44R are explained below. The upward optical fiber 52c of the optical fiber cable 52 connects to the input port X0 of the optical coupler 102L. The output port Y0 of the optical coupler 102L connects to the port Y0 of the optical coupler 106L. The output port Y1 of the optical coupler 102L connects to the optical input IN(A) of the optical transceiver 70 in the branch station 40c via the optical fiber 74b of he branching cable 48L.

The optical output OUT(A) of the optical transceiver 70 in the branch station 40c connects to the input port X1 of the optical coupler 104L through the optical fiber 74a of the branching cable 48L. The input port X0 of the optical coupler 104L connects to the port Y0 of the optical coupler 108L. The output port Y0 of the optical coupler 104L connects to the trunk station 40a via the downward optical fiber 52d of the optical fiber cable 52.

The optical output OUT(B) of the optical transceiver 72 in the branch station 40c connects to the port Y1 of the optical coupler 108L through the optical fiber 74c of the branching cable 48L. The port Y1 of the optical coupler 106L connects to the optical input IN(B) of the optical transceiver 72.

The downward optical fiber 54d of the optical fiber cable 54 connects to the input port X0 of the optical coupler 102R. The output port Y0 of the optical coupler 102R connects to the port Y0 of the optical coupler 106R. The output port Y1 of the optical coupler 102R connects to the optical input IN(A) of the optical transceiver 72 in the branch station 40c via the optical fiber 76b of the branching cable 48R.

The optical output OUT(A) of the optical transceiver 72 in the branch station 40c connects to the input port X1 of the optical coupler 104R via the optical fiber 76a of the branching cable 48R. The input port X0 of the optical coupler 104R connects to the port Y0 of the optical coupler 108R. The output port Y0 of the optical coupler 104R connects to the trunk station 40b via the upward optical fiber 54c of the optical fiber cable 54.

The optical output OUT(B) of the optical transceiver 70 in the branch station 40c connects to the port Y1 of the optical coupler 108R through the optical fiber 76c of the branching cable 48R. The port Y1 of the optical coupler 106R connects to the optical input IN(B) of the optical transceiver 70.

The port X0 of the optical coupler 106L of the branching unit 44L connects to the port X0 of the optical coupler 106R of the branching unit 44R via the optical fiber 56c of the inter-unit connecting cable 56. The port X0 of the optical coupler 108L of the branching unit 44L connects to the port X0 of the optical coupler 108R of the branching unit 44R via the optical fiber 56d of the inter-unit connecting cable 56.

Figure 15:
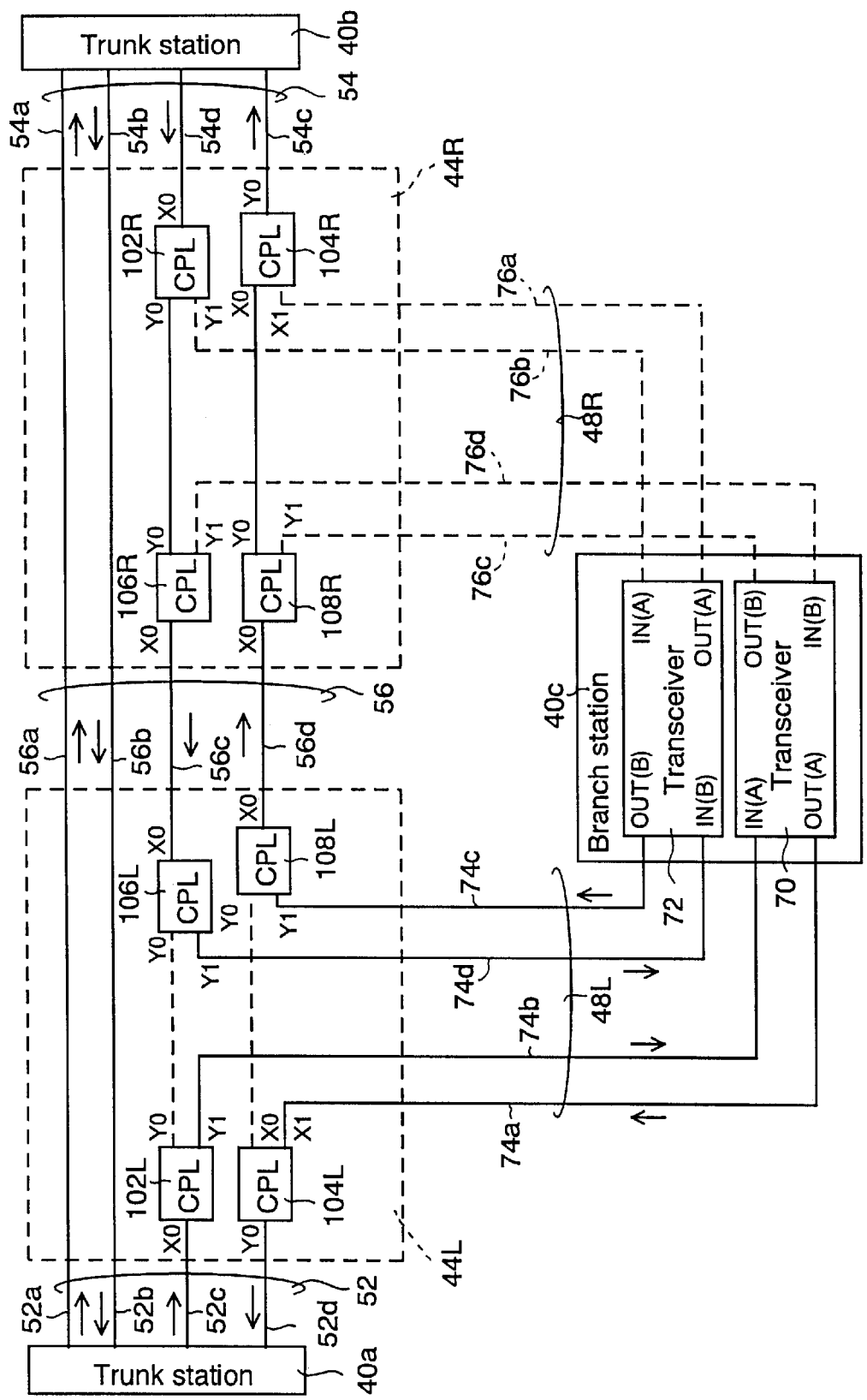
FIG. 15 is a diagram showing lines normally used in the embodiment shown in FIG. 14.

FIG. 15 shows lines normally used in the embodiment shown in FIG. 14. Here are used the optical fibers 74a, 74b of the branching cable 48L for communication with the trunk station 40a, and the optical fibers 74c, 74d of the branching cable 48L for communication with the trunk station 40b. That is, the branch station 40c uses optical input IN(A) and optical output OUT(A) of the optical transceiver 70 for communication with the trunk station 40a, and uses the optical input IN(B) and optical output OUT(B) of the optical transceiver 72 for communication with the trunk station 40b. Lines where optical signals propagate are shown by solid lines, and other lines, including those currently being spare lines, which do not contribute to propagation of optical signals, are shown by broken lines.

The communicating operation or the flow of optical signals between the trunk station 40a and the branch station 40c is explained below. An optical signal output from the trunk station 40a onto the optical fiber 52c enters into the input port X0 of the optical coupler 102L, and it is divided into two and output from the output ports Y0 and Y1. The light from output port Y1 of the optical coupler 102L enters into the optical input IN(A) of the optical transceiver 70 of the branch station 40c via the optical fiber 74b of the branching cable 48L.

The light from the output port Y0 of the optical coupler 102L enters into the optical coupler 106R through the optical coupler 106L and the optical fiber 56c of the inter-unit connecting cable 56, and it is divided into two here. One enters into the trunk station 40b through the optical coupler 102R and the optical fiber 54d of the optical fiber cable 54, and the other enters into the optical input IN(B) of the optical transceiver 70 of the branch station 40c via the optical fiber 76d of the branching cable 48R. This causes no problem in the trunk station 40b because the light enters into the optical output. Also in the optical transceiver 70 of the branch station 40c, no problems occurs because the input light through the optical input IN(B) is not used. Similarly to the embodiment explained before, disregarding propagation delays, identical optical signals enter into the optical input IN(A) and optical input IN(B) of the optical transceiver 70. Therefore, a trouble, if any, in the spare lines, more particularly, in the branching cable 48R, can be detected by monitoring the presence of absence of input light through the optical input IN(B), and transmission error rates of in-use lines and spare lines can be estimated by comparing both inputs.

An optical signal from the optical output OUT(A) of the optical transceiver 70 in the branch station 40c enters into the input port X1 of the optical coupler 104L through the optical fiber 74a of the branching cable 48L. The optical coupler 104L outputs the input light through the input port X1 from its output port Y0. The output light from the output port Y0 of the optical coupler 104L enters into the trunk station 40a through the optical fiber 52d of the optical fiber cable 52.

In this manner, the optical signals can be exchanged bidirectionally between the trunk station 40*a* and the branch station 40*c* (optical transceiver 70 thereof).

Next explained is the communicating operation or the flow of optical signals between the trunk station 40*b* and the branch station 40*c*. An optical signal output from the trunk station 40*b* onto the optical fiber 54*d* enters into the input port X0 of the optical coupler 102R, and it is divided into two and output from the output ports Y0 and Y1. The light from the port Y0 of the optical coupler 102R enters into the port Y0 of the optical coupler 106R, and goes out from the port X0. The output light from the port X0 of the optical coupler 106R enters into the port X0 of the optical coupler 106L through the optical fiber 56*c* of the inter-unit connecting cable 56. The optical coupler 106L divides the input light through the port X0 into two, and outputs one from the port Y0 and the other from the port Y1. The output light from the port Y1 of the optical coupler 106L enters into the optical input IN(B) of the optical transceiver 72 of the branch station 40*c* via the optical fiber 74*d* of the branching cable 48L. In this manner, the optical signal output from the trunk station 40*b* reaches the branch station 40*c* (the optical transceiver 72 thereof).

The light from the output port Y1 of the optical coupler 102R enters into the optical input IN(A) of the optical transceiver 72 in the branch station 40*c* through the optical fiber 76*b* of the branching cable 48R. It results in identical optical signals, although different in propagation delay, entering into both optical inputs IN(A), IN(B) of the optical transceiver 72. However, in the normal condition, the optical transceiver 72 may give priority to the input light through the optical input IN(B). The input light through the input IN(A) of the optical transceiver 72 can be used to detect a trouble, if any, in the branching cable 48R by monitoring its presence or absence, and to compare it with the input light through the optical input IN(B) to estimate the transmission error rate. That is, by utilizing input light from spare lines, in-use lines and spare lines can be watched continuously.

The output light from the port Y0 of the optical coupler 106L reaches the trunk station 40*a* through the optical coupler 102L and the upward optical fiber 52*b* of the optical fiber cable 52. However, no problem occurs because it enters into the optical output of the trunk station 40*a*.

The optical signal from the optical output OUT(B) of the optical transceiver 72 in the branch station 40*c* enters into the port Y1 of the optical coupler 108L through the optical fiber 74*c* of the branching cable 48L, and goes out from the port X0. The output light from the port X0 of the optical coupler 108L enters into the port X0 of the optical coupler 108R of the branching unit 44R via the optical fiber 56*d* of the inter-unit connecting cable 56. The optical coupler 108R divides the input light through the port X0 into two, and outputs one from the port Y0 and the other from the port Y1. The output light from the port Y0 of the optical coupler 108R enters into the port X0 of the optical coupler 104R, and goes out from the port Y0. The output light from the port Y0 of the optical coupler 104R enters into the trunk station 40*b* through the optical fiber 54*c* of the optical fiber cable 54. In this manner, the optical signal from the branch station 40*c* reaches the trunk station 40*b*.

Although the output light from the port Y1 of the optical coupler 108R reaches the optical output OUT(B) of the optical transceiver 70 in the branch station 40*c* through the optical fiber 76*c* of the branching cable 48R, since the optical transceiver 70 does not use the optical output OUT(B) and does not introduce the light as an effective optical input, no problem occurs.

Figure 16:
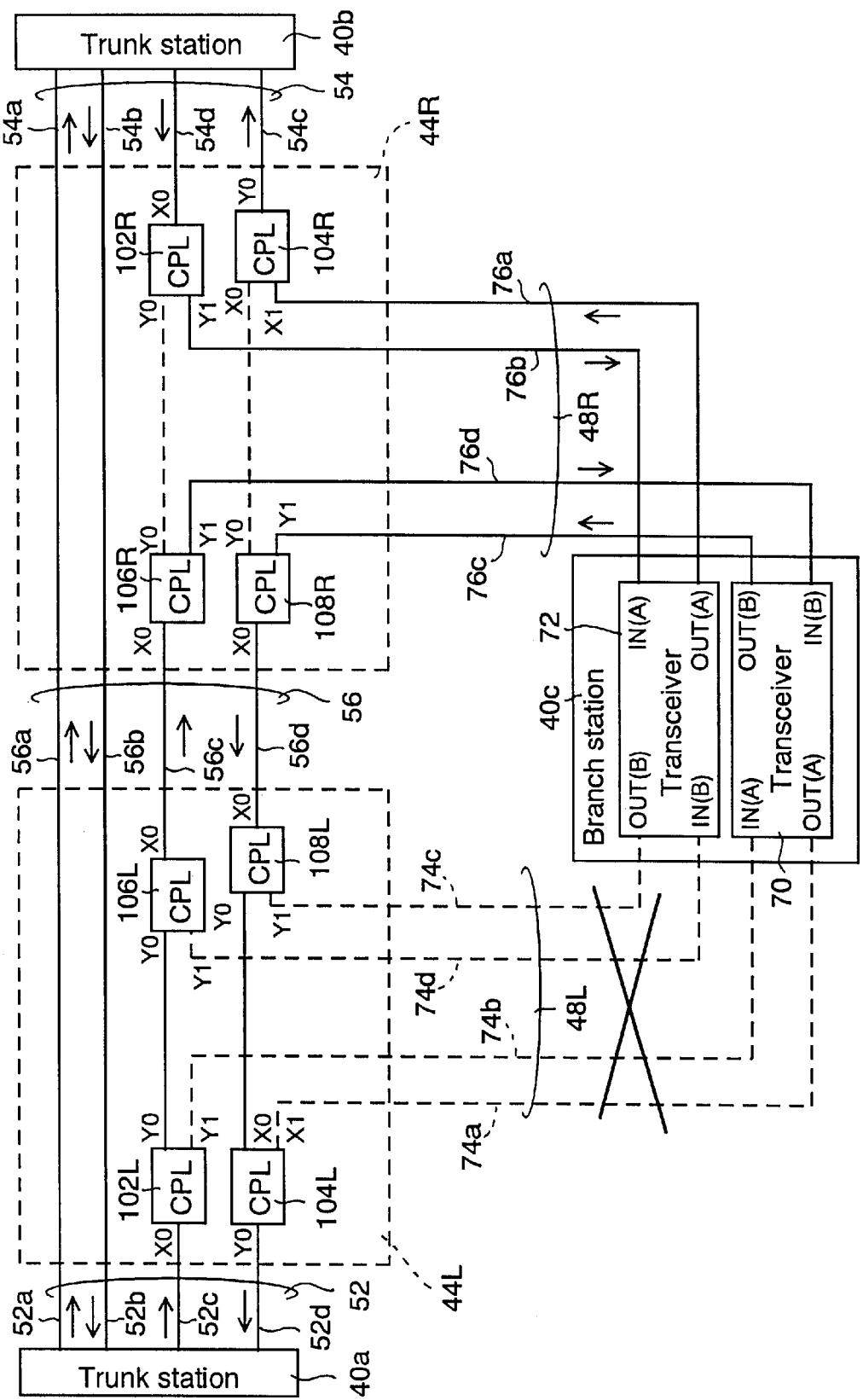
FIG. 16 is a diagram showing lines used in the embodiment shown in FIG. 14 when any trouble occurs in the branching cable 48L.

FIG. 16 shows lines used in the embodiment shown in FIG. 14 when optical fibers 74*a* through 74*d* become unusable due to any trouble, such as breakage, on the branching cable 48L. In this case, the branch station 40*c* uses the optical input IN(B) and optical output OUT(B) of the optical transceiver 70 for communication with the trunk station 40*a*, and uses the optical input IN(A) and optical output OUT(A) of the optical transceiver 72 for communication with the trunk station 40*b*. Lines where optical signal propagate are shown by solid lines, and other lines, including those currently being spare lines, where no optical signal propagates, are shown by broken lines.

The flow of the optical signal in FIG. 16 is essentially the same as that of FIG. 15 and different therefrom merely in situations of the trunk stations 40*a* and 40*b* being replaced with each other. More specifically, the signal light between the branch station 40*c* and the trunk station 40*a* passes through the optical couplers 102L, 104L, 106L, 106R, 108L, 108R, and optical fibers 56*c*, 56*d* of the inter-unit connecting cable 56 whereas the signal light between the branch station 40*c* and the trunk station 40*b* passes through the optical couplers 102R, 104R. Therefore, explanation is not made here in detail.

Figure 17:
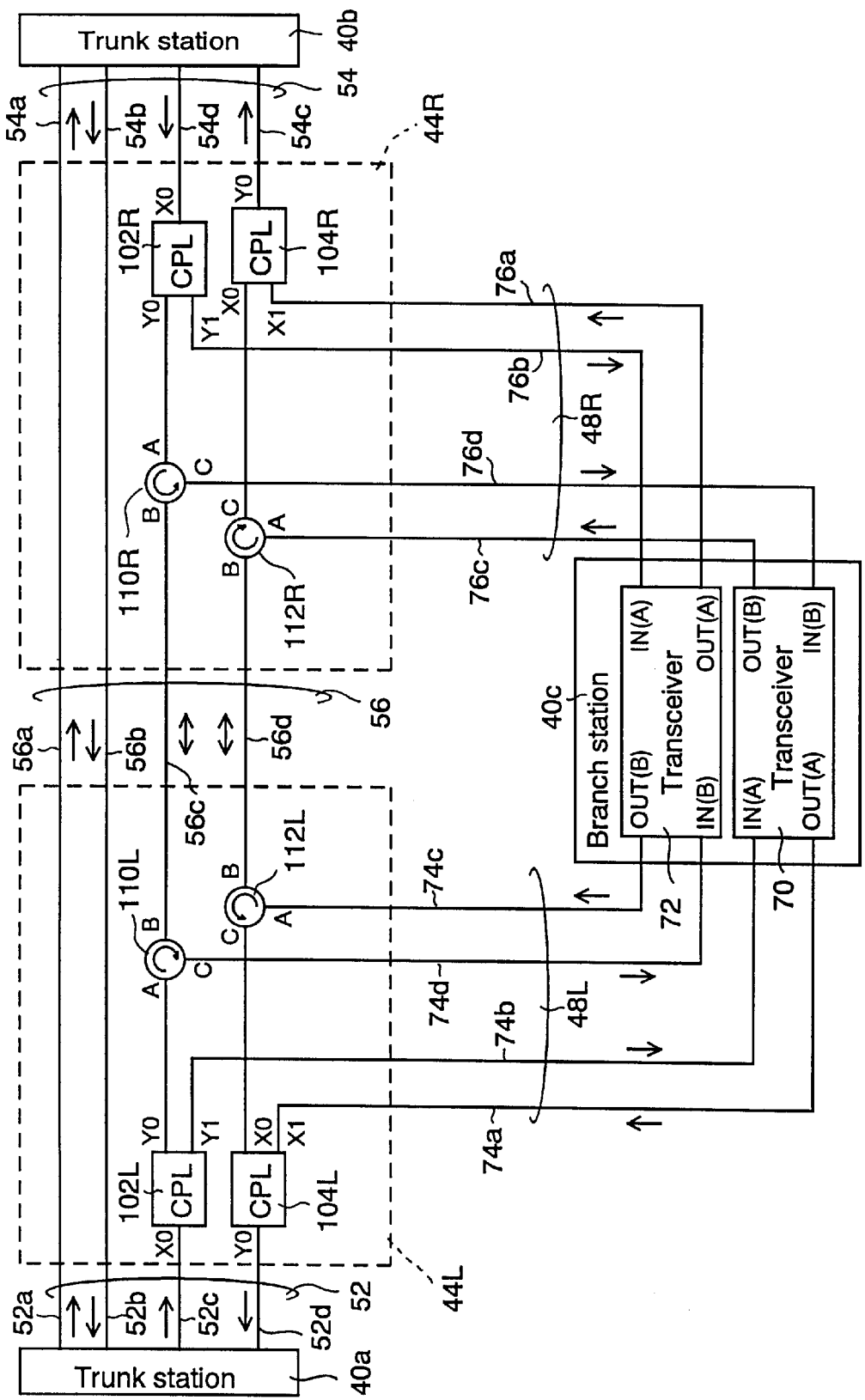
FIG. 17 is a block diagram schematically showing third construction of the branching units 44L, 44R corresponding to FIG. 3(a)

A third embodiment of the branching units 44L, 44R corresponding to FIG. 3(*a*) is explained below. FIG. 17 is a block diagram schematically showing its construction. As shown in FIG. 17, here are used optical circulators 110L, 110R, 112L, 112R each having three ports A, B, C instead of the optical couplers 106L, 106R, 108L, 108L used in the embodiment of FIG. 14. The optical circulators 110L, 110R, 112L, 112R are optical elements for outputting input light at the port A from the port B and for outputting input light at the port B from the port C.

In FIG. 17, common elements as those in the embodiment of FIG. 14 are labeled with common reference numerals. Similarly to the embodiment shown in FIG. 14, no optical amplifying repeater can be inserted in the optical fibers 56*c* and 56*d* of the inter-unit connecting cable 56 because optical signals may propagate in opposite directions in the normal condition (when normal lines are used) and in a troubled condition (when spare lines are used). The embodiment shown here does not use optical elements including movable members, such as optical switches and light detector/switch controllers including electronic elements and electronic circuits, the embodiment promises inexpensive and highly reliable branching units 44L and 44R.

Explanation is made only on portions different from the embodiment of FIG. 14, namely, the optical circulators 110L, 110R, 112L, 112R in the branching units 44L, 44R. The port A of the optical circulator 110L connects to the output port Y0 of the optical coupler 102L, the port B connects to the port B of the optical circulator 110R of the branching unit 44R through the optical fiber 56*c* of the inter-unit connecting cable 56, and the port C connects to the optical input IN(B) of the optical transceiver 72 of the branch station 40*c* through the optical fiber 74*d* of the branching cable 48L.

The port A of the optical circulator 112L connects to the optical output OUT(B) of the optical transceiver 72 in the branch station 40*c* through the optical fiber 74*c* of the branching cable 48L, the port B connects to the port B of the optical circulator 112R through the optical fiber 56*d* of the inter-unit connecting cable 56, and the port C connects to the port X0 of the optical coupler 104L.

The port A of the optical circulator 110R connects to the output port Y0 of the optical coupler 102R, and the port C connects to the optical input IN(B) of the optical transceiver 70 in the branch station 40c through the optical fiber 76d of the branching cable 48R.

The port A of the optical circulator 112R connects to the optical output OUT(B) of the optical transceiver 70 in the branch station 40c via the optical fiber 76c of the branching cable 48R, and the port C connects to the input port X0 of the optical coupler 104R.

Figure 18:
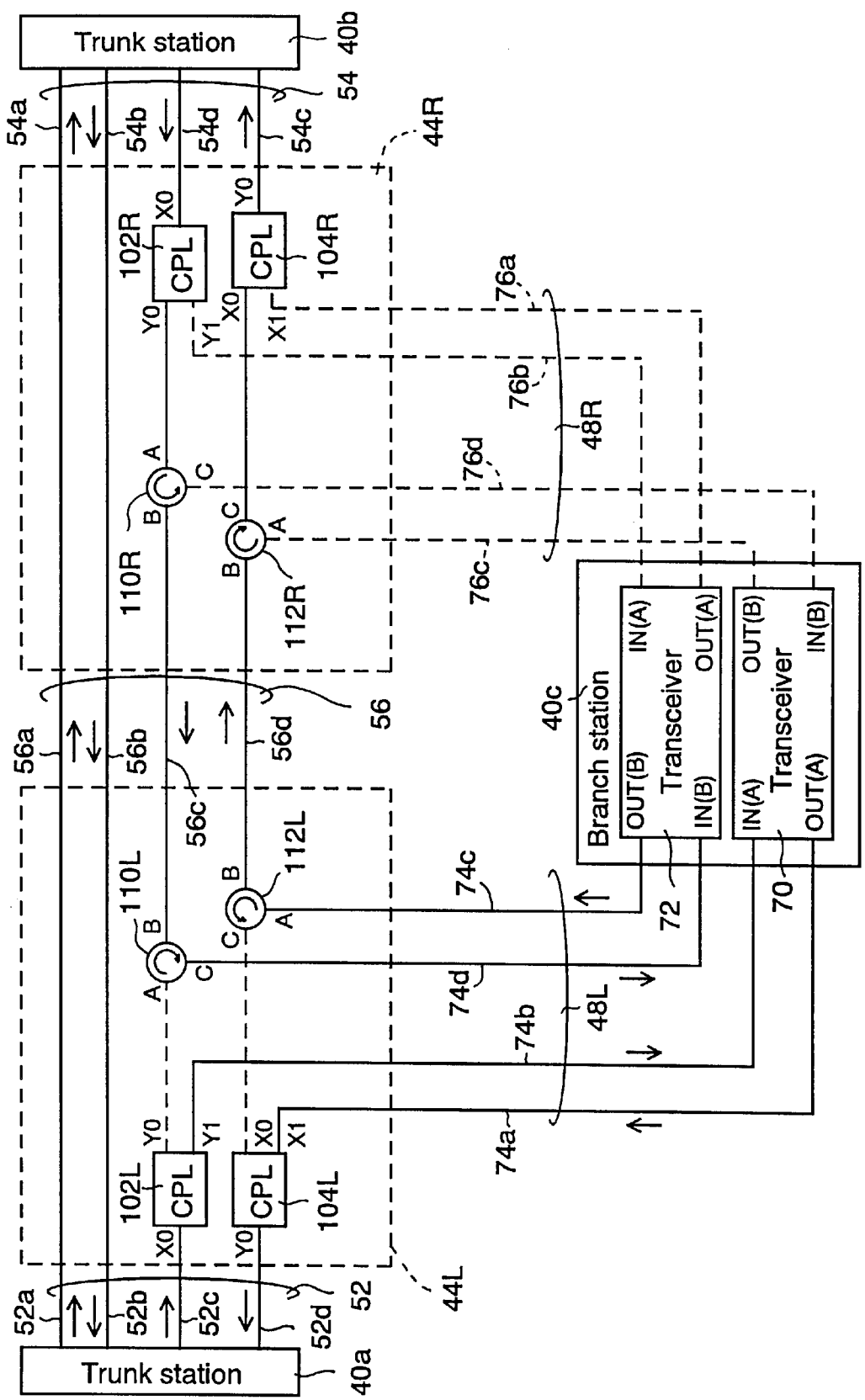
FIG. 18 is a diagram showing lines normally used in the embodiment shown in FIG. 17.

FIG. 18 shows lines normally used in the embodiment shown in FIG. 17. Here are used the optical fibers 74a and 74b of the branching cable 48L for communication with the trunk station 40a, and the optical fibers 74c and 74d of the branching cable 48L for communication with the trunk station 40b. That is, the branch station 40c uses the optical input IN(A) and optical output OUT(A) of the optical transceiver 70 for communication with the trunk station 40a, and uses the optical input IN(B) and optical output OUT(B) of the optical transceiver 72 for communication with the trunk station 40b. Lines where optical signals propagate are shown by solid lines, and other lines, including those currently being spare lines, which do not contribute to propagation of optical signals, are shown by broken lines.

The communicating operation or the flow of optical signal, between the trunk station 40a and the branch station 40c is explained below. An optical signal output from the trunk station 40a onto the optical fiber 52c enters into the input port X0 of the optical coupler 102L, and it is divided into two and output from the output ports Y0 and Y1. The light from the output port Y1 of the optical coupler 102L enters into the optical input IN(A) of the optical transceiver 70 in the branch station 40c through the optical fiber 74b of the branching cable 48L.

The light from the output port Y0 of the optical coupler 102L enters into the port A of the optical circulator 110L, goes out from the port B, then enters into the port B of the optical circulator 110R through the optical fiber 56c of the inter-unit connecting cable 56, and goes from the port C. The output light from the port C of the optical circulator 110R enters into the optical input IN(B) of the optical transceiver 70 in the branch station 40c via the optical fiber 76d of the branching cable 48R. However, no problem occurs because the optical transceiver 70 in the branch station 40c does not employ the light from the optical input IN(B) for reception of optical signals. Similarly to preceding embodiments, since, disregarding propagation delays, identical optical signals enter into both optical inputs IN(A) and IN(B) of the optical transceiver 70, it is possible to detect a trouble, if any, in the spare line, namely, in the branching cable 48R, by monitoring the presence of absence of the input light from the optical input IN(B), and to estimate transmission error rates of the in-use lines and spare lines by comparing both inputs.

The optical signal from the optical output OUT(A) of the optical transceiver 70 in the branch station 40c enters into the input port X1 of the optical coupler 104L through the optical fiber 74a of the branching cable 48L. The optical coupler 104L outputs the input light through the input port X1 from its output port Y0. The output light from the output port Y0 of the optical coupler 104L enters into the trunk station 40a via the optical fiber 52d of the optical fiber cable 52.

In this manner, the optical signals can be exchanged bidirectionally between the trunk station 40a and the branch station 40c (the optical transceiver 70 thereof).

Next explained is the communicating operation or the flow of optical signals between the trunk station 40b and the branch station 40c. An optical signal output from the trunk station 40b onto the optical fiber 54d enters into the input port X0 of the optical coupler 102R, and it is divided into two and output from the output ports Y0 and Y1. The light from the port Y0 of the optical coupler 102R enters into the port A of the optical circulator 110R, goes out from the port B, then enters into the port B of the optical circulator 110L via the optical fiber 56c of the inter-unit connecting cable 56, and goes from the port C. The output light from the port C of the optical circulator 110L enters into the optical input IN(B) of the optical transceiver 72 of the branch station 40c via the optical fiber 74d of the branching cable 48L. In this manner, the optical signal output from the trunk station 40b reaches the branch station 40c (the optical transceiver 72 thereof).

The optical signal output from the optical output OUT(B) of the optical transceiver 72 in the branch station 40c enters into the port A of the optical circulator 112L through the optical fiber 74c of the branching cable 48L, and goes out from the port B. The output light from the port B of the optical circulator 112L enters into the port B of the optical circulator 112R of the branching unit 44R via the optical fiber 56d of the inter-unit connecting cable 56, and goes out from the port C. The output light from the port C of the optical circulator 112R enters into the port X0 of the optical coupler 104R, and goes out from the port Y0. The output light from the port Y0 of the optical coupler 104R enters into the trunk station 40b via the optical fiber 54c of the optical fiber cable 54. In this manner, the optical signal from the branch station 40c reaches the trunk station 40b.

Figure 19:
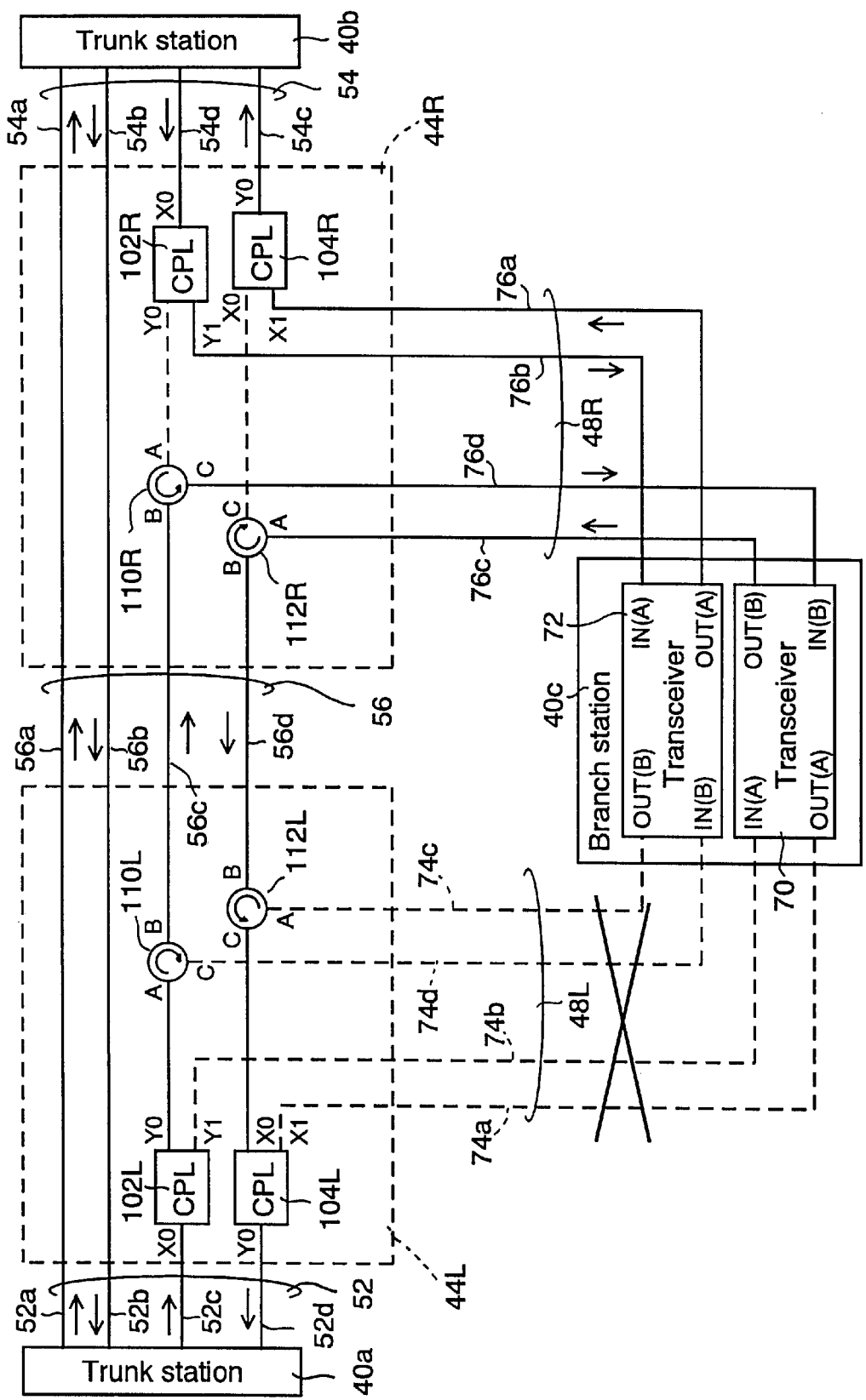
FIG. 19 is a diagram showing lines used in the embodiment shown in FIG. 17 when any trouble occurs in the branching cable 48L.

FIG. 19 shows lines used in the embodiment shown in FIG. 17 when optical fibers 74a through 74d become unusable due to any trouble, such as breakage, in the branching cable 48L. In this case, the branch station 40c uses the optical input IN(B) and optical output OUT(B) of the optical transceiver 70 for communication with the trunk station 40a, and uses the optical input IN(A) and optical output OUT(A) of the optical transceiver 72 for communication with the trunk station 40b. Lines where optical signals propagate are shown by solid lines, and other lines, including those currently being spare lines, where no optical signal propagates, are shown by broken lines.

The flow of the optical signal in FIG. 19 is essentially the same as that of FIG. 18 and different therefrom merely in situations of the trunk stations 40a and 40b being replaced with each other. That is, the signal lights between the branch station 40c and the trunk station 40a pass through the optical couplers 102L, 104L, optical circulators 110L, 110R, 112L, 112R and optical fibers 56c, 56d of the inter-unit connecting cable 56, whereas the signal lights between the branch station 40c and the trunk station 40b pass through the optical couplers 102R, 104R. Therefore, explanation is not made here in detail.

Figure 20:
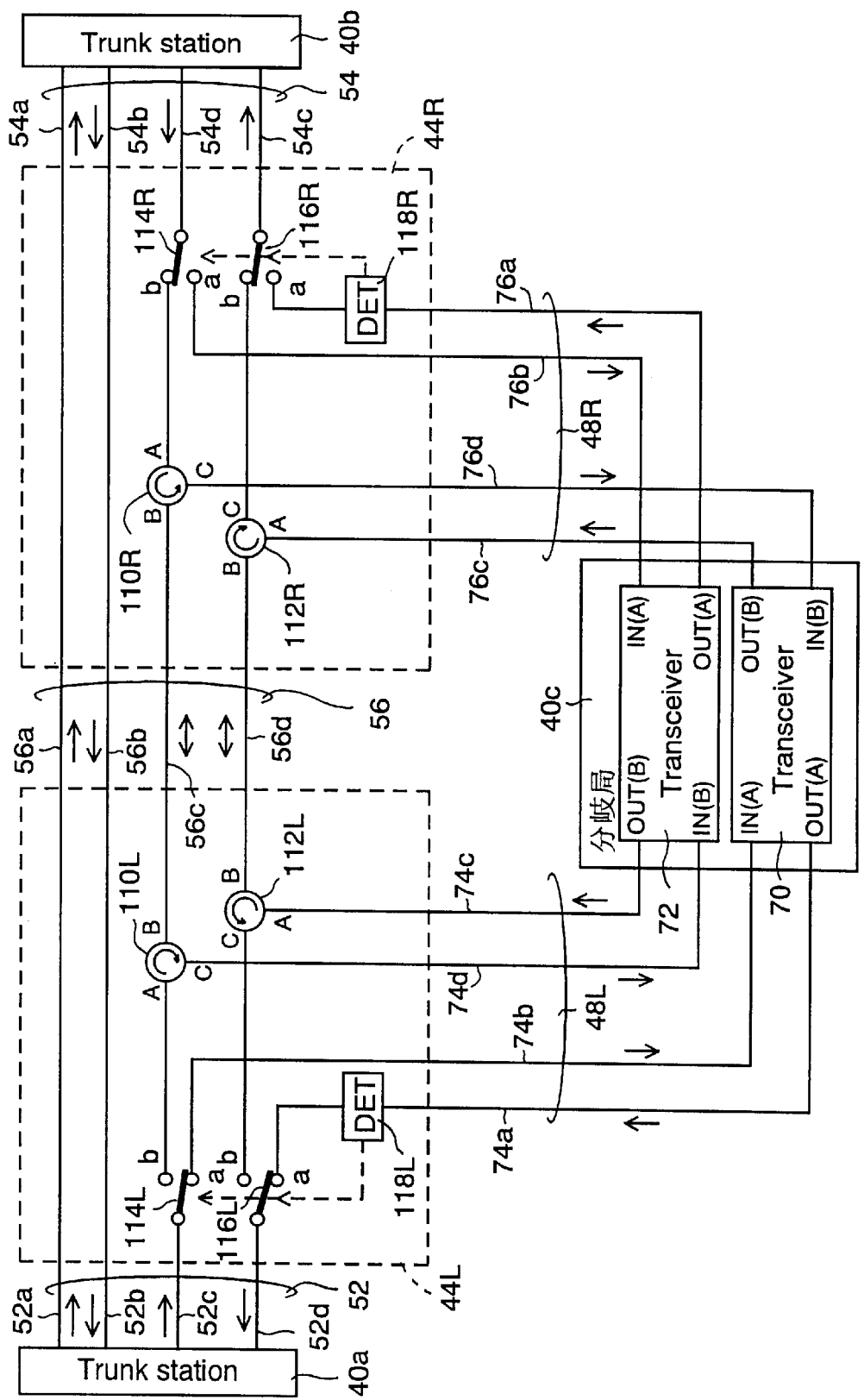
FIG. 20 is a block diagram schematically showing a modified version of the embodiment shown in FIG. 17.

FIG. 20 is a block diagram schematically showing an embodiment where the optical couplers 102L, 102R, 104L and 104R used in the embodiment of FIG. 17 are replaced with selective optical switches 114L, 114R, 116L, 116R, and light detector/switch controllers 118L, 118R are additionally provided for controlling these selective optical switches 114L, 114R, 116L, 116R. The light detector/switch controllers 118L and 118R have essentially the same functions as those of the light detector/switch controllers 68L, 68R, 86L, 86R, 98L, 98R, 100L, 100R used in preceding embodiments. That is, they make the selective optical switches 114L, 114R, 116L, 116R be connected to contacts A when detecting an optical signal, and make them be connected to contacts B when detecting no optical signal. Here are used common reference numerals for the same elements as those in FIG. 17.

Explanation is made on portions modified from FIG. 17. The upward optical fiber 52c of the optical fiber cable 52 connects to a common terminal of the optical switch 114L. A contact A of the optical switch 114L connects to the optical input IN(A) of the optical transceiver 70 in the branch station 40c through the optical fiber 74b of the branching cable 48L. A contact B of the optical switch 114L connects to the port A of the optical circulator 110L.

The optical output OUT(A) of the optical transceiver 70 in the branch station 40c connects to an optical input of the light detector/switch controller 118L through the optical fiber 74a of the branching cable 48L. An optical output of the light detector/switch controller 118L connects to a contact A of the optical switch 116L, a port C of the optical circulator 112L connects to a contact B of the optical switch 116L and the common terminal of the optical switch 116L connects to the trunk station 40a via the downward optical fiber 52d of the optical fiber cable 52.

The downward optical fiber 54d of the optical fiber cable 54 connects to the common terminal of the optical switch 114R. A contact A of the optical switch 114R connects to the optical input IN(A) of the optical transceiver 72 in the branch station 40c via the optical fiber 76b of the branching cable 48R. A contact B of the optical switch 114R connects to the port A of the optical circulator 110R.

The optical output OUT(A) of the optical transceiver 72 in the branch station 40c connects to the optical input of the light detector/switch controller 118R via the optical fiber 76a of the branching cable 48L. Optical output from the light detector/switch controller 118R connects to a contact A of the optical switch 116R. The port C of the optical circulator 112R connects to a contact B of the optical switch 116R, and a common terminal of the optical switch 116R connects to the trunk station 40b through the upward optical fiber 54c of the optical fiber cable 54.

Figure 21:
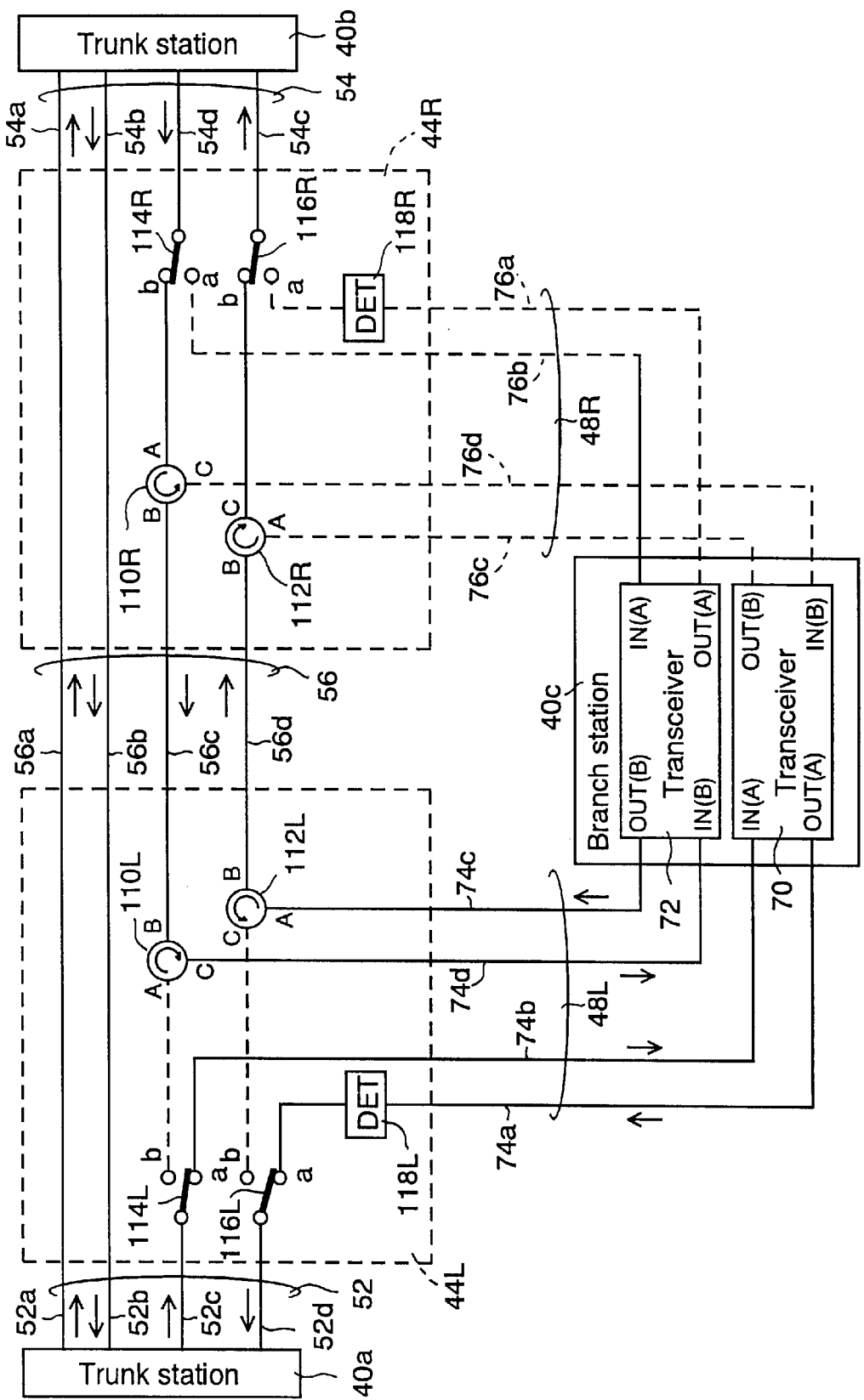
FIG. 21 is a diagram showing lines normally used in the version shown in FIG. 20.

FIG. 21 shows lines normally used in the embodiment shown in FIG. 20. Here are used the optical fibers 74a, 74b of the branching cable 48L for communication with the trunk station 40a, and optical fibers 74c, 74d of the branching cable 48L for communication with the trunk station 40b. That is, the branch station 40c uses the optical input IN(A) and optical output OUT(A) of the optical transceiver 70 for communication with the trunk station 40a, and uses the optical input IN(B) and optical output OUT(B) of the optical transceiver 72 for communication with the trunk station 40b. Lines where optical signals propagate are shown by solid lines, and other lines, including those currently being spare lines, which do not contribute to propagation of optical signals, are shown by broken lines.

Since the optical signal propagates on the optical fiber 74 of the branching cable 48L, the light detector/switch controller 118L makes optical switches 114L, 116L be connected to the contacts A. Since no optical signal propagates on the optical fiber 76a of the branching cable 48R, the light detector/switch controller 118R makes optical switches 114R, 116R be connected to the contacts B.

The communicating operation or the flow of optical signals between the trunk station 40a and the branch station 40c is explained below. An optical signal output from the trunk station 40a onto the optical fiber 52c enters into the optical switch 114L, goes out from its contact A, and enters into the optical input IN(A) of the optical transceiver 70 of the branch station 40c through the optical fiber 74b of the branching cable 48L.

The optical signal output from the optical output OUT(A) of the optical transceiver 70 in the branch station 40c enters into the light detector/switch controller 118L through the optical fiber 74a of the branching cable 48L. The light detector/switch controller 118L supplies substantially all of the input light to the contact A of the optical switch 116L, and the optical switch 116L outputs the input light through the contact A from the common terminal. The output light from the common terminal of the optical switch 116L enters into the trunk station 40a through the downward optical fiber 52d of the optical fiber cable 52.

In this manner, the optical signals can be exchanged bidirectionally between the trunk station 40a and the branch station 40c (optical transceiver 70 thereof).

Next explained is the communicating operation or the flow of optical signals between the trunk station 40b and the branch station 40c. An optical signal output from the trunk station 40b onto the optical fiber 54d enters into the common terminal of the optical switch 114R. Since the optical switch 114R connects its contact B, the optical signal from the optical fiber 54d enters into the port A of the optical circulator 110R through the optical switch 114R and goes out from the port B, then enters into the port B of the optical circulator 110L through the optical fiber 56c of the inter-unit connecting cable 56, and goes out from the port C. Output light from the port C of the optical circulator 110L enters into the optical input IN(B) of the optical transceiver 72 of the branch station 40c via the optical fiber 74d of the branching cable 48L. In this manner, the optical signal from the trunk station 40b reaches the branch station 40c (optical transceiver 72 thereof).

The optical signal from the optical output OUT(B) of the optical transceiver 72 of the branch station 40c enters into the port A of the optical circulator 112L through the optical fiber 74c of the branching cable 48L and goes out from the port B. The output light from the port B of the optical circulator 112L enters into the port B of the optical circulator 112R of the branching unit 44R via the optical fiber 56d of the inter-unit connecting cable 56, and goes out from the port C. The output light from the port C of the optical circulator 112R connects to the contact B of the optical switch 116R. Since the optical switch 116R connects its contact B, the output light from the port C of the optical circulator 112R results in entering into the trunk station 40b through the optical switch 116R and the optical fiber 54c of the optical fiber cable 54. In this manner, the optical signal from the branch station 40c reaches the trunk station 40b.

Figure 22:
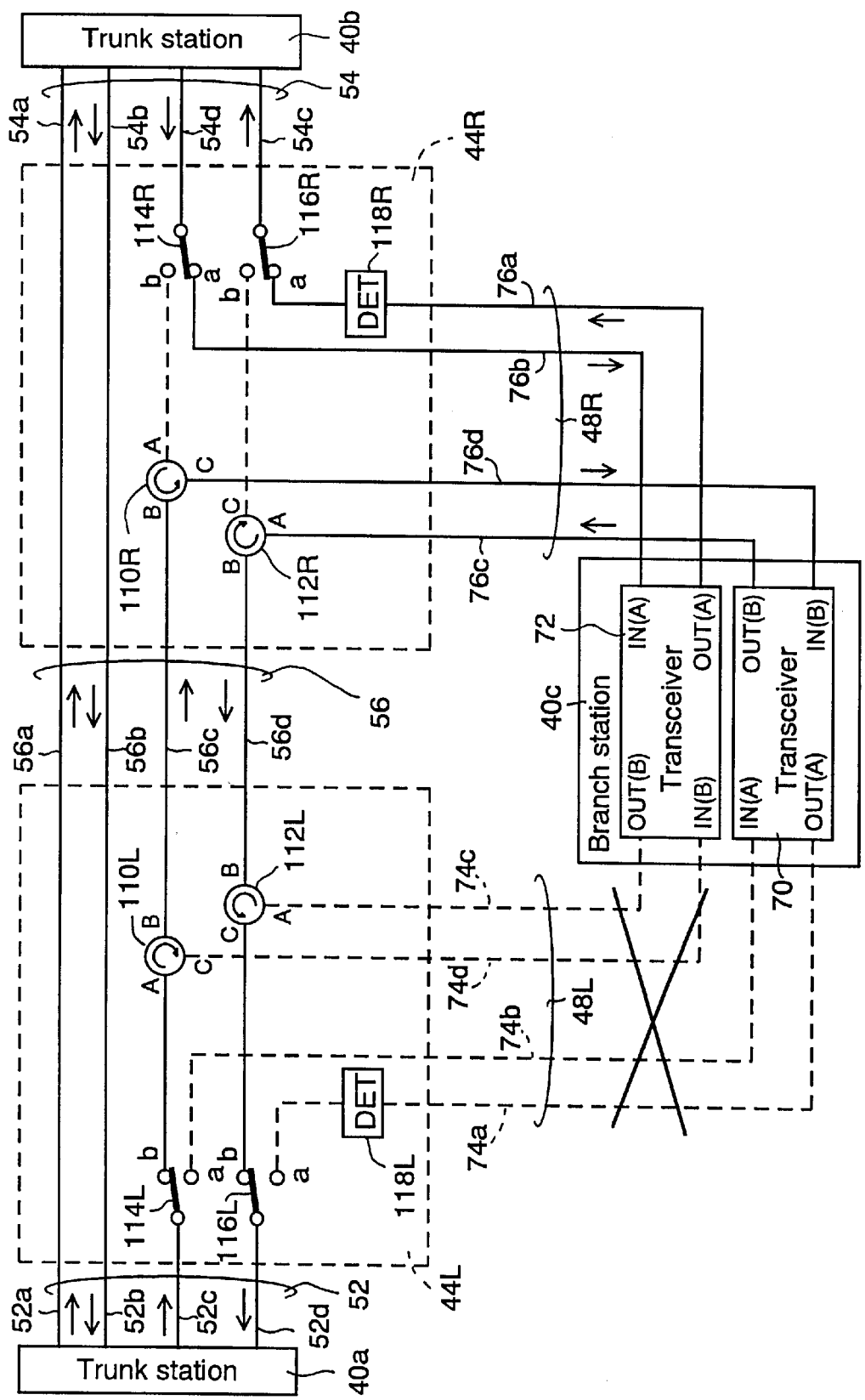
FIG. 22 is a block diagram showing lines used in the embodiment shown in FIG. 20 when any trouble occurs in the branching cable 48L.

FIG. 22 shows lines used in the embodiment shown in FIG. 20 when optical fibers 74a through 74d become unusable due to any trouble, such as breakage, in the branching cable 48L. In this case, the branch station 40c uses the optical input IN(B) and optical output OUT(B) of the optical transceiver 70 for communication with the trunk station 40a, and uses the optical input (A) and optical output OUT(A) of the optical transceiver 72 for communication with the trunk station 40b. Lines where optical signals propagate are shown by solid lines, and other lines, including those currently being spare liens, where no optical signal propagates, are shown by broken lines.

The flow of the optical signal in FIG. 22 is essentially the same as that of FIG. 21 and different therefrom merely in situations of the trunk stations 40a and 40b being replaced with each other. That is, signal light between the branch station 40c and the trunk station 40a passes through optical switches 114L, 116L, optical circulators 110L, 110R, 112L, 112R and optical fibers 56c, 56d of the inter-unit connecting cable 56, whereas signal light between the branch station 40c and the trunk station 40b passes through the optical switches 114R, 116R. Therefore, explanation is not made here in detail.

The arrangement in the embodiment of FIG. 20 for controlling connections of the optical switches of 114L, 114R, 116L, 116R by the light detector/switch controllers 118L, 118R can be apparently used in lieu of the optical couplers 58L, 58R, 60L, 60R, 80L, 80R, 82L, 82R, 90L, 90R, 102L, 102R, 104L, 104R, 106L, 106R, 108L, 108R shown in FIG. 4, et seq.

Figure 23:
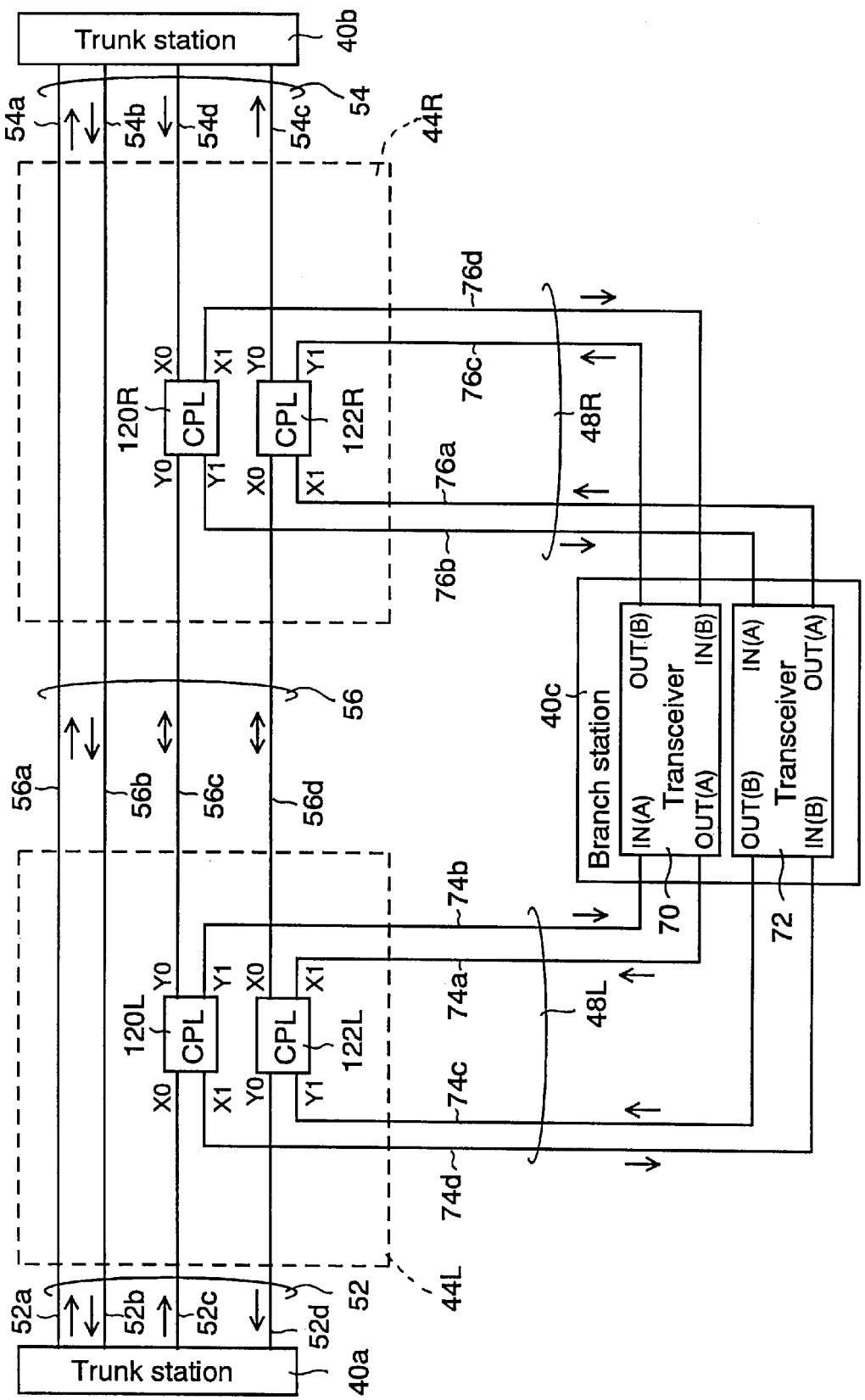
FIG. 23 is a block diagram schematically showing a construction of the branching units 44L, 44R which can appropriately cope with both FIG. 2(a) and FIG. 3(a) in a branch station 40c.

FIG. 23 is a block diagram schematically showing an embodiment of branching units 44L and 44R for the branch station 40c, which is freely adaptive to both FIG. 2(a) and FIG. 3(a). Similarly to former drawings of FIG. 4, et seq, for easier understanding, the branching units 46L, 46R and the branch station 40d are omitted from illustration, and common numerals are used for the same elements as those of FIG. 4. No optical amplifying repeater can be inserted in the optical fibers 56c, 56d of the inter-unit connecting cable 56 because optical signals propagate in opposite directions in the normal condition (when normal lines are used) and in a troubled condition (when spare lines are used).

Each of the branching units 44L, 44R includes two 2×2 directional optical couplers 120L, 122L; 120R, 122R. The optical couplers 120L, 122L; 120R, 122R are optical elements for dividing input light through a port X0 or X1 into two to output them from ports Y0 and Y1 and for dividing input light through the port Y0 or Y1 into two to output them from the ports X0 and X1.

Connections of the directional optical couplers 120L, 122L; 120R, 122R are explained below. The upward optical fiber 52c of the optical fiber cable 52 connects to the port X0 of the optical coupler 120L. The port Y0 of the optical coupler 120L connects to the port Y0 of the optical coupler 120R of the branching unit 44R through the optical fiber 56c of the inter-unit connecting cable 56. The port Y1 of the optical coupler 120L connects to the optical input IN(A) of the optical transceiver 70 in the branch station 40c through the optical fiber 74b of the branching cable 48L. The port X1 of the optical coupler 120L connects to the optical input IN(B) of the optical transceiver 72 in the branch station 40c through the optical fiber 74d of the branching cable 48L.

The optical output OUT(A) of the optical transceiver 70 in the branch station 40c connects to the port X1 of the optical coupler 122L via the optical fiber 74a of the branching cable 48L. The optical output OUT(B) of the optical transceiver 72 in the branch station 40c connects to the port Y1 of the optical coupler 122L via the optical fiber 74c of the branching cable 48L. The port Y0 of the optical coupler 122L connects to the trunk station 40a via the downward optical fiber 52d of the optical fiber cable 52.

The downward optical fiber 54d of the optical fiber cable 54 connects to the port X0 of the optical coupler 120R. The port X1 of the optical coupler 120R connects to the IN(B) of the optical transceiver 70 in the branch station 40c. The port Y1 of the optical coupler 120R connects to the optical input IN(A) of the optical transceiver 72 in the branch station 40c.

The optical output OUT(B) of the optical transceiver 70 connects to the port Y1 of the optical coupler 122R through the optical fiber 76c of the branching cable 48R. The optical output OUT(A) of the optical transceiver 72 connects to the port X1 of the optical coupler 122R via the optical fiber 76a of the branching cable 48R. The port Y0 of the optical coupler 122R connects to upward optical fiber 54c of the optical fiber cable 54. The port X0 of the optical coupler 122R connects to the port X0 of the optical coupler 122L of the branching unit 44L through the optical fiber 56d of the inter-unit connecting cable 56.

Figure 24:
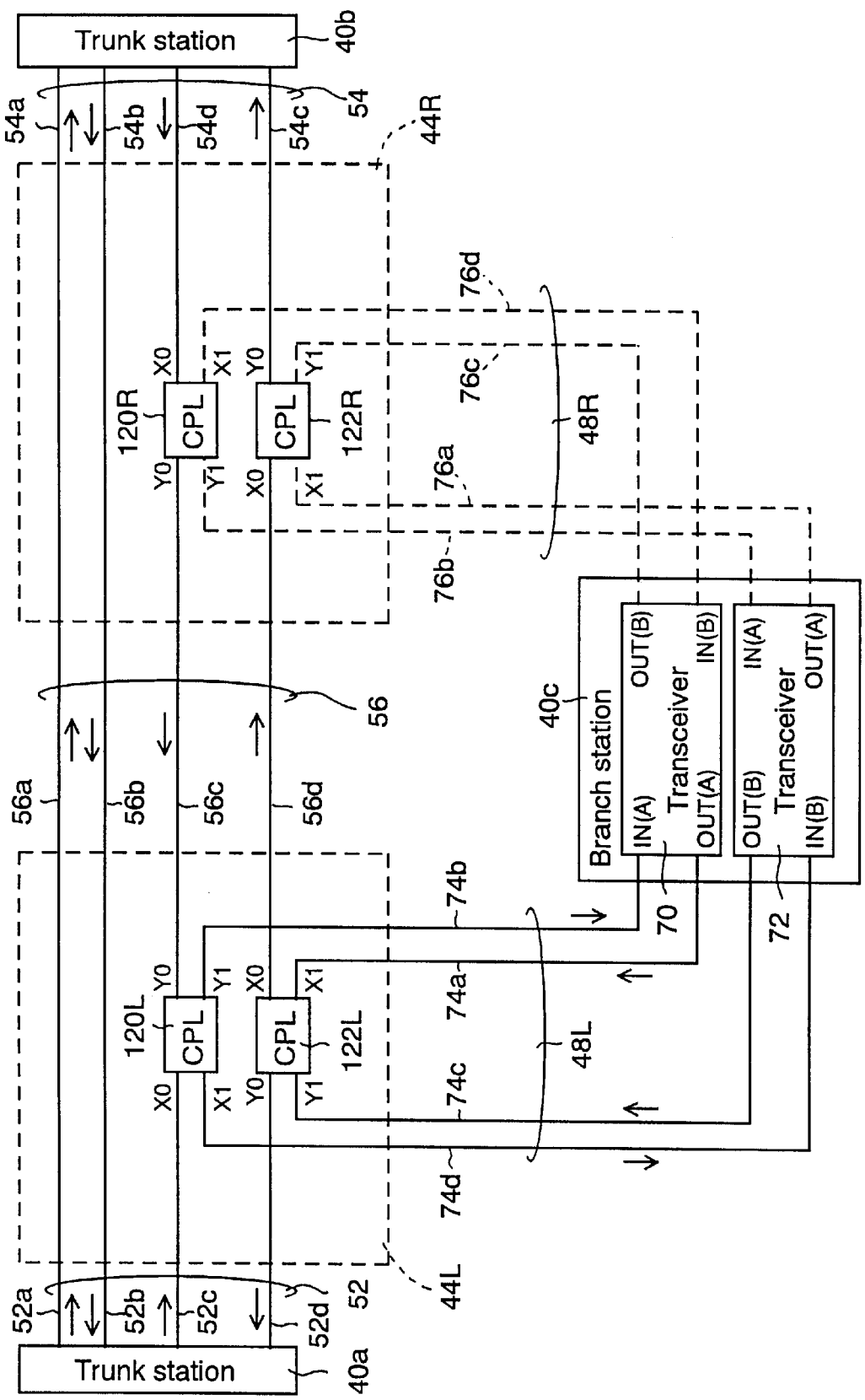
FIG. 24 is a diagram showing lines normally used in the embodiment shown in FIG. 23 in the form corresponding to FIG. 3(a)

FIG. 24 shows lines normally used in the embodiment shown in FIG. 23 in the mode corresponding to FIG. 3(a).

Here are used the optical fibers 74a, 74b of the branching cable 48L for communication with the trunk station 40a, and the optical fibers 74c, 74d of the branching cable 48L for communication with the trunk station 40b. That is, the branch station 40c uses the optical input IN(A) and optical output OUT(A) of the optical transceiver 70 for communication with the trunk station 40a, and uses the optical input IN(B) and optical output OUT(B) of the transceiver 72 for communication with the trunk station 40b. Lines where optical signals propagate are shown by solid lines, and other lines, including those currently being spare lines, which do not contribute to propagation of optical signals, are shown by broken lines.

The communicating operation or the flow of optical signals between the trunk station 40a and the branch station 40c is explained below. An optical signal output from the trunk station 40a onto the optical fiber 52c enters into the port X0 of the optical coupler 120L, and it is divided into two and output from the output ports Y0 and Y1. The light from the output port Y1 of the optical coupler 120L enters into the optical input IN(A) of the optical transceiver 70 in the branch station 40c through the optical fiber 74b of the branching cable 48L. In this manner, the optical signal from the trunk station 40a reaches the branch station 40c.

The output light from the port Y0 of the optical coupler 120L enters into the port Y0 of the optical coupler 120R of the branching unit 44R through the optical fiber 56c of the inter-unit connecting cable 56. The optical coupler 120R divides the input light through the port Y0 into two, and outputs them from the ports X0 and X1. Although the output light from the port X0 of the optical coupler 120R runs through the downward optical fiber 54d in the opposite direction, it reaches the trunk station 40b if no element preventing the opposite propagation is inserted in the downward optical fiber 54d, and it does not reach if such an element is inserted in the downward optical fiber 54d. Even in the former case, since the optical signal to the trunk station 40b enters into its output side, it is sufficient to take measures previously so that the optical transceiver in the trunk station 40b is not affected adversely. The output light from the port X1 of the optical coupler 120R enters into the optical input IN(B) of the optical transceiver 70 through the optical fiber 76d of the branching cable 48R. Although having propagation delays, identical optical signals enter into the optical inputs IN(A) and IN(B) of the optical transceiver 70. However, no problem occurs if the optical transceiver 70 is configured to give priority to the optical input IN(A). Similarly to preceding embodiments, the light introduced through the optical input IN(B) can be used to measure transmission errors in in-use lines and to monitor the spare lines.

The optical signal from the optical output OUT(A) of the optical transceiver 70 in the branch station 40c enters into the port X1 of the optical coupler 122L through the optical fiber 74a of the branching cable 48L, and it is divided into two and output from the ports Y0, Y1. The output light from the port Y0 of the optical coupler 122L enters into the trunk station 40a through the optical fiber 52d of the optical fiber cable 52. In this manner, the optical signal is transmitted from the branch station 40c to the trunk station 40a.

The output light from the port Y1 of the optical coupler 122L propagates through the optical fiber 74c of the branching cable 48L in the direction opposite from its rightful direction. If no element for preventing the opposite propagation is inserted in the optical fiber 74c, the light reaches the branch station 40c. However, if such an element is inserted in the optical fiber 74c, the light does not reach the branch station. Even in the former case, the optical signal enters into the optical output OUT(B) of the optical transceiver 72. Therefore, it is sufficient to previously take measures so that the optical transceiver 72 is not affected adversely.

Next explained is the communicating operation or the flow of optical signals between the trunk station 40*b* and the branch station 40*c*. An optical signal output from the trunk station 40*b* onto the optical fiber 54*d* enters into the port X0 of the optical coupler 120R, and it is divided into two and output from the output ports Y0, Y1. The output light from the port Y0 of the optical coupler 120R enters into the port Y0 of the optical coupler 120L through the optical fiber 56*c* of the inter-unit connecting cable 56. The optical coupler 120L divides the input light through the port Y0 into two, and outputs them from the ports X0, X1. The light from the port X1 of the optical coupler 120L enters into the optical input IN(B) of the optical transceiver 72 of the branch station 40*c* through the optical fiber 74*d* of the branching cable 48L. In this manner, the optical signal reaches the branch station 40*c* from the trunk station 40*b*.

The output light from the port Y1 of the optical coupler 120R enters into the optical input IN(A) of the optical transceiver 72 through the optical fiber 76*b* of the branching cable 48R. Although having propagation delays, identical signals enter into the optical inputs IN(A) and IN(B) of the optical transceiver 72. However, no problem occurs if the optical transceiver 72 is set to give priority to the optical input IN(B). Similarly to preceding embodiments, input light through the optical input IN(A) can be used to measure transmission errors in in-use lines and to monitor the spare lines.

The output light from the port X0 of the optical coupler 120L propagates through the upward optical fiber 52*c* of the optical fiber cable 52 in the opposite direction. If the upward optical fiber 52*c* does not include an element for preventing the opposite propagation, the light reaches the trunk station 40*a*. If the upward optical fiber 52*c* includes such an element, the light does not reach the trunk station. Even in the former case, the optical signal toward the trunk station 40*a* enters into its optical output. Therefore, it is sufficient to previously take measures so that the optical transmitter in the trunk station 40*a* is not affected adversely.

The optical signal from the optical output OUT(B) of the optical transceiver 72 in the branch station 40*c* enters into the port Y1 of the optical coupler 122L through the optical fiber 74*c* of the branching cable 48L, and it is divided into two and output from the ports X0, X1. The output light from the port X0 of the optical coupler 122L enters into the port X0 of the optical coupler 122R of the branching unit 44R through the optical fiber 56*d* of the inter-unit connecting cable 56. The optical coupler 122R divides the input light through the port X0 into two, and outputs them from the ports Y0, Y1. The light from the port Y0 of the optical coupler 122R propagates through the upward optical fiber 54*c* of the optical fiber cable 54 and enters into the trunk station 40*b*. In this manner, the optical signal reaches the trunk station 40*b* from the branch station 40*c*.

The output light from the port X1 of the optical coupler 122L propagates through the optical fiber 74*a* of the branching cable 48L in the direction opposite from its rightful direction. If the optical fiber 74*a* does not include an element for preventing the opposite propagation, the light reaches the optical output OUT(A) of the optical transceiver 70 in the branch station 40*c*. If the optical fiber 74*a* includes such an element, the light does not reach the optical transceiver 70. Even in the former case, the optical signal enters into the optical output OUT(B) of the optical transceiver 70. Therefore, it is sufficient to take measures previously so that the optical transceiver 70 is not affected adversely.

The output light from the port Y1 of the optical coupler 122R propagates through the optical fiber 76*c* of the branching cable 48R in the direction opposite from its rightful direction. If the optical fiber 74*a* does not include an element for blocking the opposite propagation, the light reaches the optical output OUT(B) of the optical transceiver 70 in the branch station 40*c*. In this case, it is sufficient to take appropriate measures previously onto the optical output OUT(B) so that the optical transceiver 70 be not affected adversely, similarly to the measure for the output light from the port X1 of the optical coupler 122L.

Figure 25:
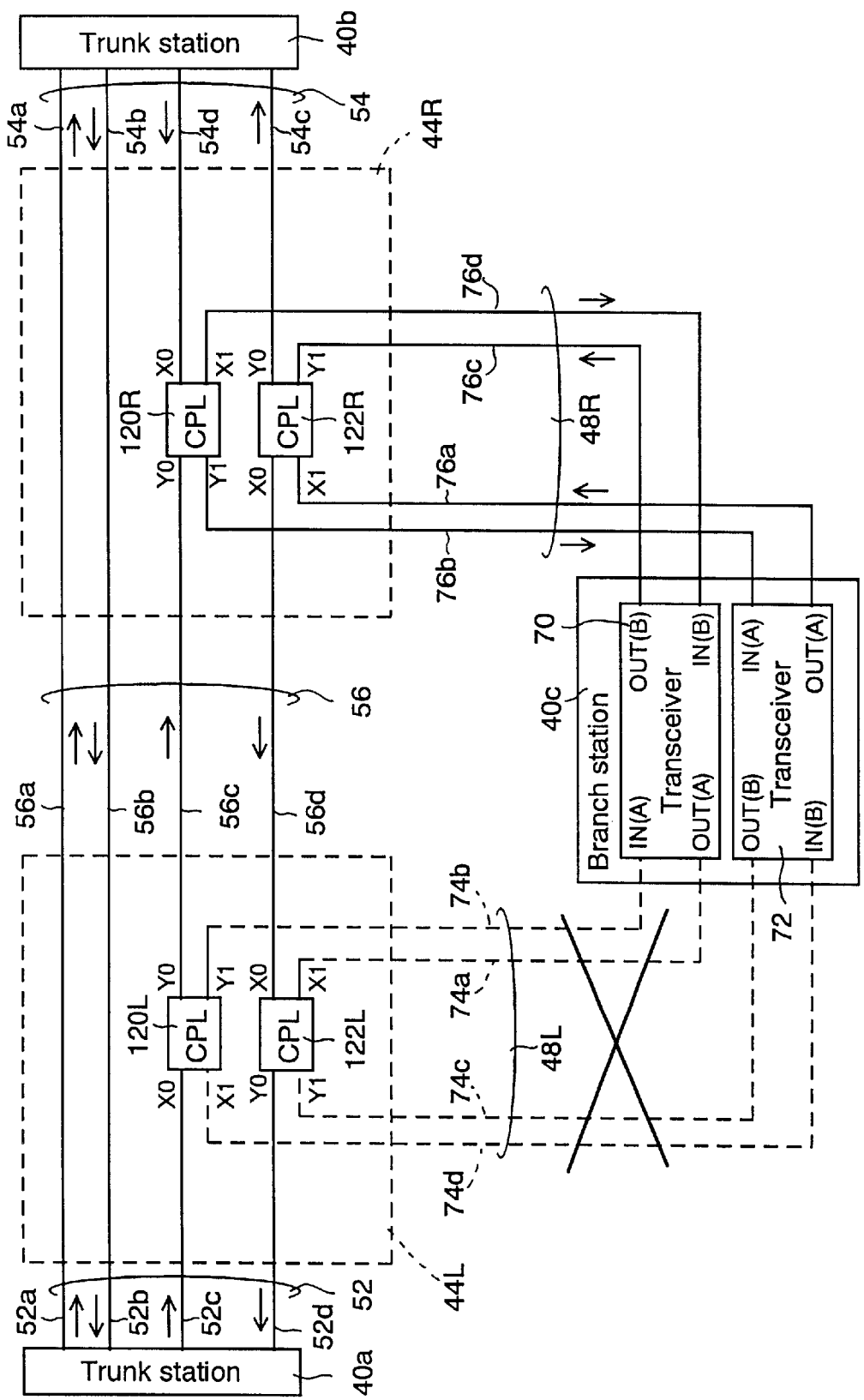
FIG. 25 is a diagram showing lines used in the embodiment shown in FIG. 23 when any trouble occurs in the branching cable 48L.

FIG. 25 shows lines used in the embodiment shown in FIG. 23 when optical fibers 74*a* through 74*d* become unusable due to any trouble, such as breakage, in the branching cable 48L. In this case, the branch station 40*c* uses the optical input IN(B) and optical output OUT(B) of the optical transceiver 70 for communication with the trunk station 40*a*, and uses the optical input IN(A) and optical output OUT(A) of the optical transceiver 72 for communication with the trunk station 40*b*. Lines where optical signals propagate are shown by solid lines, and other lines, including those currently being spare lines, where no optical signal propagates, are shown by broken lines.

The flow of optical signals in FIG. 25 is substantially the same as that of FIG. 24 and different therefrom merely in situations of the trunk stations 40*a* and 40*b* being replaced with each other. In other words, it is sufficient to invert conditions of the optical inputs and optical outputs used for inputting and outputting communication data of the optical transceivers 70, 72 from those of FIG. 24. Therefore, detailed explanation is not made here.

It will be apparently understood from explanations on routes of signals and by comparison between FIG. 24 and FIG. 25 that the embodiment shown in FIG. 23 can use the branching units 44L, 44R and branching cables 48L, 48R in the mode of use shown in FIG. 2(*a*). More specifically, in the normal condition, it is possible to use the optical fibers 74*a*, 74*b* of the branching cable 48L for communication with the trunk station 40*a*, and the optical fibers 76*a*, 76*b* of the branching cable 48R for communication with the trunk station 40*b*, reserving the optical fibers 74*c*, 74*d* as spare lines for communication with the trunk station 40*b* and optical fibers 76*c*, 76*d* as spare lines for communication with the trunk station 40*a*. In the normal condition, propagation delay can be reduced so much as the light does not pass through the inter-unit connecting fiber 56.

In the embodiment shown in FIG. 23, optical signals pass through at most two optical couplers and this may result in increasing the transmission loss. However, since each of the branching units 44L, 44R is made only of the two optical couplers 120L, 122L; 120, 122R, having no movable elements, to realize a very simple structure, a high reliability can be obtained economically.

Figure 26:
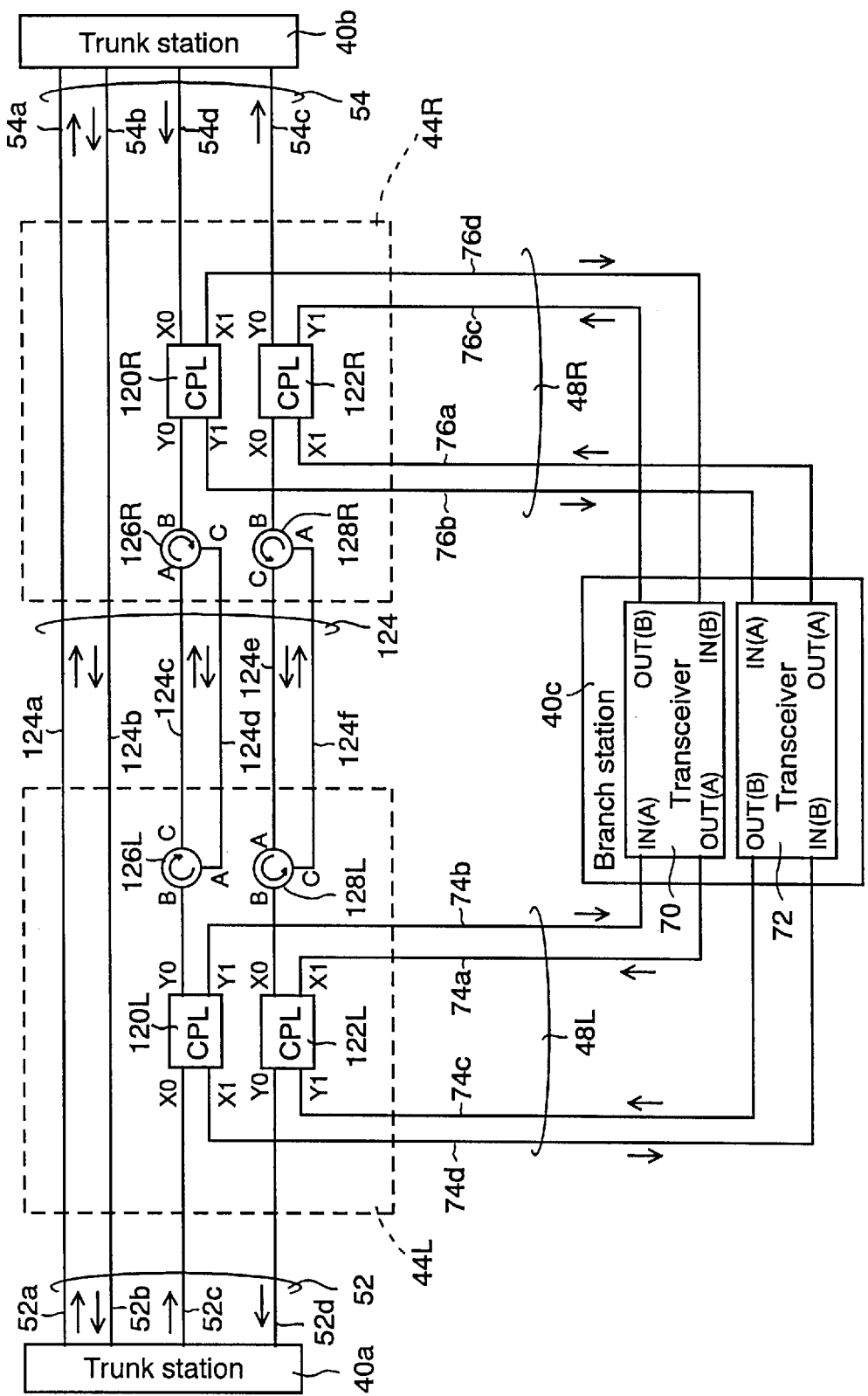
FIG. 26 is a block diagram schematically showing a modified version of the embodiment of FIG. 23.

FIG. 26 is a block diagram schematically showing an embodiment modified from FIG. 23 so that optical fibers of inter-unit connecting cable can be made unidirectional, and the branching units 44L and 44R can be located more distant. In the embodiment shown in FIG. 26, an inter-unit connecting cable 124 connecting the branching units 44L and 44R has six optical fibers 124*a*, 124*b*, 124*c*, 124*d*, 124*e*, 124*f*, and optical circulators 126L, 128L, 126R and 128R, each having three ports A, B and C, make optical signals flow in the optical fibers 124c through 124f in the unidirectional mode. Input and output characteristics of the optical circulators 126L, 128L; 126R, 128R are identical to those of the optical circulators 62L, 62R, 64L, 64R, 110L, 110R, 112L, 112R.

The optical fiber 124c of the inter-unit connecting cable 124 connects the port C of the optical circulator 126L and the port A of the optical circulator 126R. The optical fiber 124d connects the port A of the optical circulator 126L and the port A of the optical circulator 126R. The optical fiber 124e connects the port A of the optical circulator 128L and the port C of the optical circulator 128R. The optical fiber 124f connects the port C of the optical circulator 128L and the port A of the optical circulator 128R. The optical fibers 124a, 124b are used to connect the trunk stations 40a, 40b directly, and connect the optical fibers 52a and 52b to the optical fibers 54, 54b, respectively.

Optical signals flow in one direction in the optical fibers 124a through 124f of the inter-unit connecting cable 124. Therefore, optical amplifiers can be inserted to thereby elongate the distance between the branching units 44L and 44R.

The port Y0 of the optical coupler 120L connects to the port B of the optical circulator 126L, and the port X0 of the optical coupler 122L connects to the port B of the optical circulator 128L. The port Y0 of the optical coupler 120R connects to the port B of the optical circulator 126R, and the port X0 of the optical coupler 122R connects to the port B of the optical circulator 128R.

Figure 27:
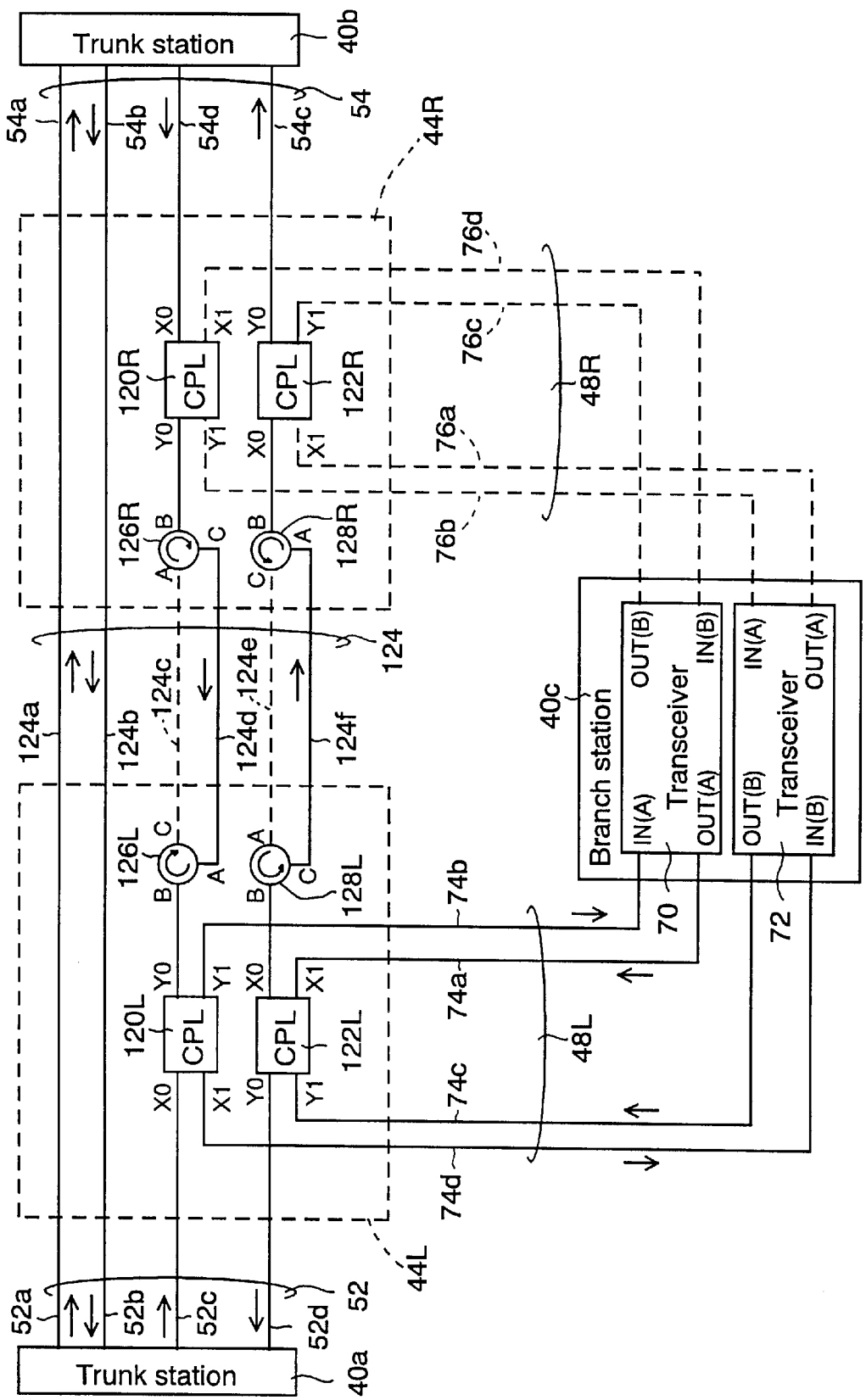
FIG. 27 is a diagram showing lines normally used in the embodiment shown in FIG. 26 in the form corresponding to FIG. 3(a)

FIG. 27 shows lines normally used in the embodiment shown in FIG. 26 in the mode corresponding to FIG. 3(a). Like the embodiment shown in FIG. 24, here are used the optical fibers 74a, 74b of the branching cable 48L for communication with the trunk station 40a, and the optical fibers 74c, 74d of the branching cable 48L for communication with the trunk station 40b. That is, the branch station 40c uses the optical input IN(A) and optical output OUT(A) of the optical transceiver 70 for communication with the trunk station 40a, and uses the optical input IN(B) and optical output OUT(B) of the optical transceiver 72 for communication with the trunk station 40b. Lines where optical signals propagate are shown by solid lines, and other lines, including those currently being spare lines, which do not contribute to propagation of optical signal, are shown by broken lines.

The communicating operation or the flow of the optical signal between the trunk station 40a and the branch station 40c, and also the communicating operation or the flow of the optical signal between the trunk station 40b and the branch station 40c, are substantially the same as those of FIG. 24, except that a route is selected among the optical circulators 126L, 128L, the inter-unit connecting cables 124 and the optical circulators 126R, 128R. Therefore, the flow of the optical signal related to the optical circulators 126L, 128L, inter-unit connecting cables 124 and optical circulators 126R, 128R is explained mainly.

An optical signal transmitted from the trunk station 40a toward the branch station 40c flows as follows. That is, an optical signal output from the trunk station 40a onto the optical fiber 52c and entering into the port X0 of the optical coupler 120L goes out from the port Y0 of the optical coupler 120L. The output light from the port Y0 of the optical coupler 120L enters into the port B of the optical circulator 126L and goes out from its port C. The output light from the port C of the optical circulator 126L propagates upwardly through the optical fiber 124c of the inter-unit connecting cable 124, enters into the port A of the optical circulator 126R, goes out from its port B, and enters into the port Y0 of the optical coupler 120R. The flow subsequent to the optical coupler 120R is the same as that explained before with reference to FIG. 24.

An optical signal transmitted from the trunk station 40b toward the branch station 40c flows as follows. That is, an optical signal output from the trunk station 40b onto the optical fiber 54d and entering into the port X0 of the optical coupler 120R goes out from the port Y0 of the optical coupler 120R and enters into the port B of the optical circulator 126R. As the optical circulator 126R outputs the input light through the port B from its port C, the optical signal output from the trunk station 40b propagates downwardly through the optical fiber 124d of the inter-unit connection cable 124, enters into the port A of the optical circulator 126L, goes out from its port B, and enters into the port Y0 of the optical coupler 120L. The flow subsequent to the optical coupler 120L is the same as that explained before with reference to FIG. 24.

The optical signal transmitted from the branch station 40c toward the trunk station 40b flows as follows. The optical signal from the optical output OUT(B) of the optical transceiver 72 in the branch station 40c enters into the port Y1 of the optical coupler 122L through the optical fiber 74c of the branching cable 48L, and it is divided into two and outputs from the ports X0 and X1. The output light from the port X0 of the optical coupler 122L enters into the port B of the optical circulator 128L, goes from its port C, then propagates upwardly through the optical fiber 124f of the inter-unit connecting cable 124, and enters into the port A of the optical circulator 128R. The optical circulator 128R outputs the input light through the port A from its port B toward the port X0 of the optical coupler 122R. The flow subsequent to the optical couplers 122R is identical to that of FIG. 24, namely, input light into the port X0 of the optical coupler 122R goes out from the port Y0, propagates through the upward optical fiber 54c of the optical fiber cable 54, and enters into the trunk station 40b.

Figure 28:
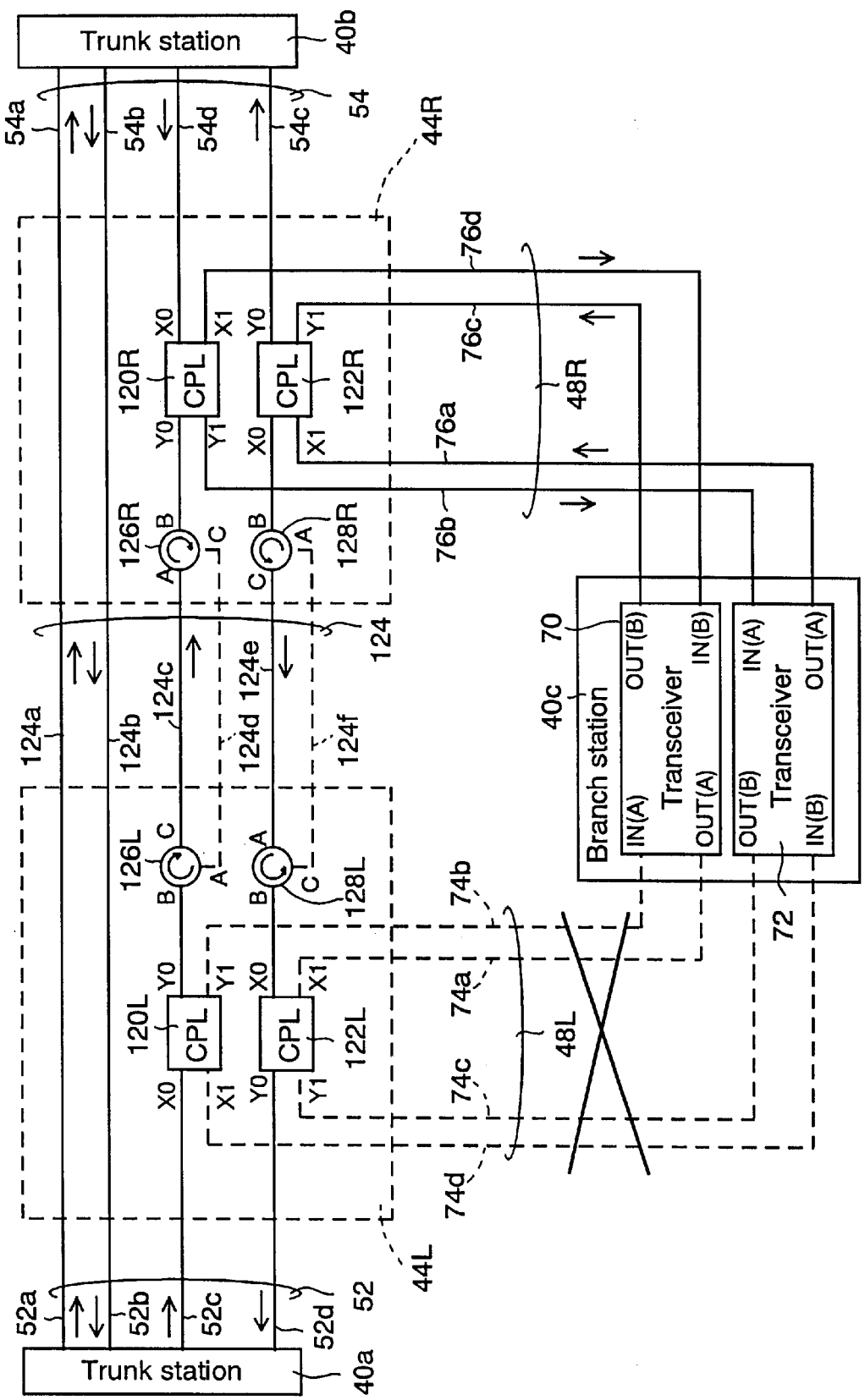
FIG. 28 is a diagram showing lines used in the embodiment shown in FIG. 26 when any trouble occurs in the branching cable 48L.

FIG. 28 shows lines used in the embodiment shown in FIG. 26 when optical fibers 74a through 74d become unusable due to any trouble, such as breakage, in the branching cable 48L. In this case, like that of FIG. 25, the branch station 40c uses the optical input IN(B) and optical output OUT(B) of the optical transceiver 70 for communication with the trunk station 40a, and uses the optical input IN(A) and optical output IN(A) of the optical transceiver 72 for communication with the trunk station 40b. Lines where optical signals propagate are shown by solid lines, and other lines, including those currently being spare lines, where no optical signal propagates, are shown by broken lines.

The flow of the optical signal in FIG. 28 is essentially the same as that of FIG. 27 and different therefrom merely in situations of the trunk stations 40a and 40b being replaced with each other. Although the embodiment of FIG. 26 uses the optical fibers 124d and 124f of the inter-unit connecting cable 124 for communication between the trunk station 40b and the branch station 40c, the embodiment of FIG. 28 is different in using the optical fibers 124c and 124e of the inter-unit connecting cable 124 for communication between the trunk station 40a and the branch station 40c. This is realized by setting optical inputs and optical outputs of the optical transceivers 70 and 72 in the branch station 40c used for exchange of communication data in the opposite mode from that of FIG. 24. Therefore, detailed explanation is not made here.

Also in the embodiment shown in FIG. 26, like the embodiment shown in FIG. 23, the branching units 44L, 44R and the branching cables 48L, 48R can be used in the mode of use as shown in FIG. 2(a). That is, in the normal condition, it is possible to use the optical fibers 74a and 74b of the branching cable 48L for communication with the trunk station 40a, and the optical fibers 76a and 76b of the branching cable 48R for communication with the trunk station 40b, while reserving the optical fibers 74c and 74d as spare lines for communication with the trunk station 40b, and the optical fibers 76c and 76d as spare lines for communication with the trunk station 40a. In the normal condition, propagation delay can be reduced so much as the light does not pass through the inter-unit connecting fiber 56.

The embodiment shown in FIG. 26 not only realizes the same effects as those by the embodiment shown in FIG. 23. Since the optical signal propagates in the unidirectional mode through the optical fibers 124a through 124f of the inter-unit connecting cable 124, it has the additional advantage that the distance between the branching units 44L and 44R can be elongated. The larger distance between the branching units 44L and 44R contributes to decreasing the probability that both of the branching cables 48L and 48R become unusable simultaneously, and hence increases the reliability.

Figure 29:
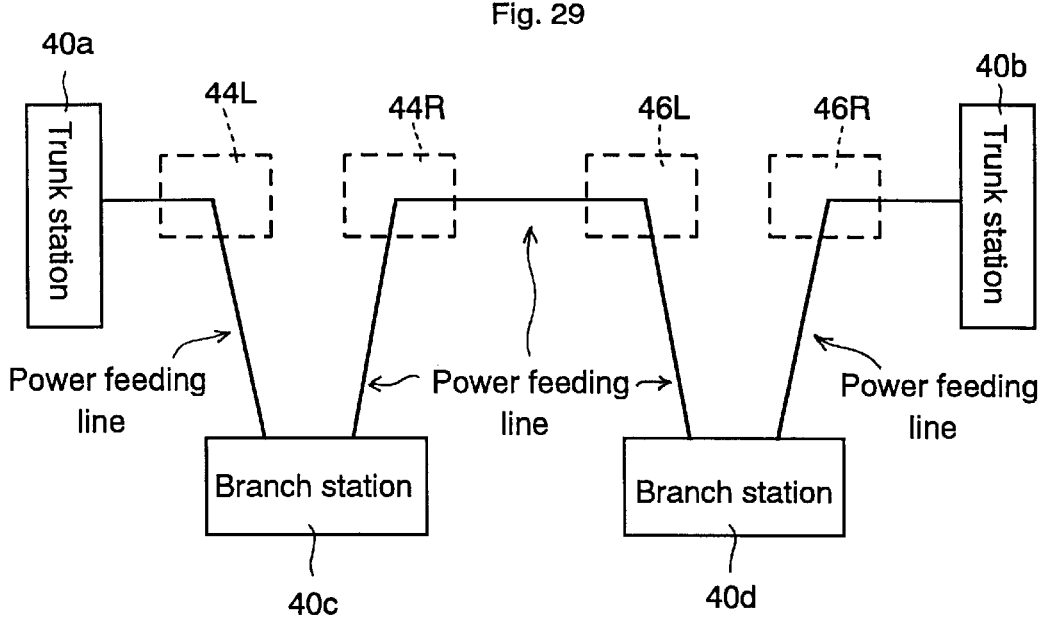
FIG. 29 is a diagram showing a general power feeding system.

As explained above, the double branching units 44L and 44R, or 46L and 46L, and the branching cables 48L and 48R, or 50L and 50R, make the communication lines of the branch stations 40c and 40d more resistive against troubles. The same consideration is required also for the power feeding system in addition to optical lines. For example, if employing a power feeding system as shown in FIG. 29 in which adjacent stations are simply connected sequentially, a breakage in any point makes one or more stations incapable of communication, irrespectively of doubling the optical lines of the branch stations.

Figure 30:
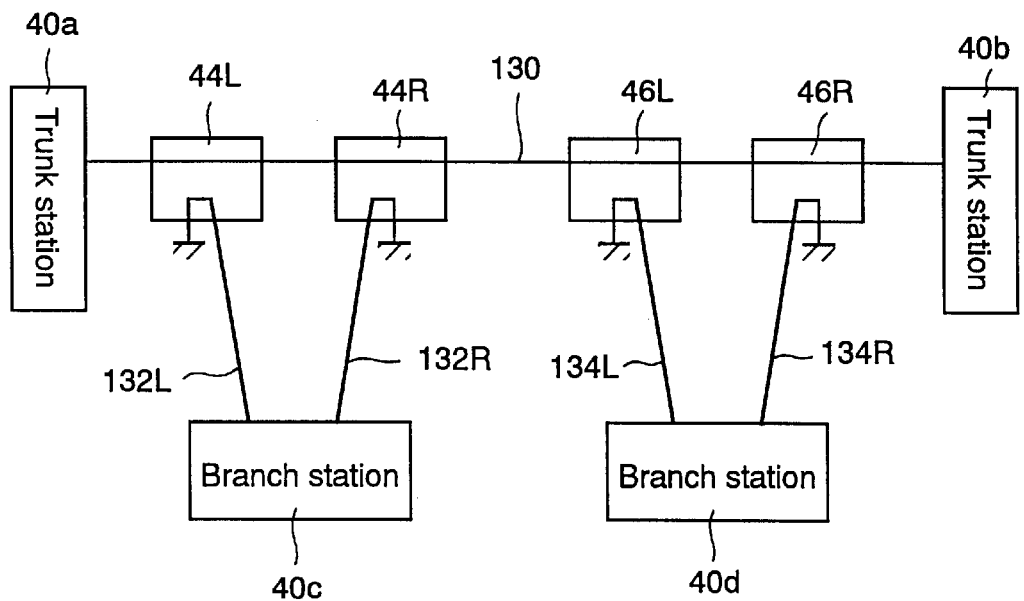
FIG. 30 is a diagram showing a construction of a power feeding system in the embodiment of the invention.

In the embodiments of the invention shown above, the construction as shown in FIG. 30 is employed as the power feeding system. In FIG. 30, the same elements as those in the foregoing embodiments are labeled with common reference numerals. Provided between the trunk stations 40a and 40b is a power feeding line 130 for feeding power to power-consuming elements in the trunk cable 42 connecting the trunk stations 40a and 40b. Also provided are power feeding lines 132L and 132R for feeding power to power-consuming elements on the branching cables 48L and 48R connecting the branch station 40c to the branching units 44L and 44R, and power feeding lines 134L and 134R for feeding power to power-consuming elements on the branching cables 50L and 50R connecting the branch station 40d to the branching units 46L and 46R. That is, the branch station 40c feeds power to the power-consuming elements on the branching cable 48L through the power feeding line 132L, and to power-consuming elements on the branching cable 48R through the power feeding line 132R. Similarly, also for the branching cables 50L and 50R, the branch station 40d feeds power through power feeding lines 134L and 134R, respectively.

As to power-consuming elements in the branching units 44L, 44R; 46L, 46R, power may be fed either from the branch stations 40c, 40d through power feeding lines 132L, 132R 134L, 134R, or from the power feeding line 130 for the trunk cable. However, considering that it may be preferable not to feed power to optical elements not used in the normal or troubled condition, it is advantageous to feed power from the branch stations 40c and 40d through the power feeding lines 132L, 132R, 134L, 134R. Although the doubling of optical lines increases the possibility that noise light enter into in-use lines, by feeding power to the branching units 44L, 44R, 46L, 46R from the branch stations 40c, 40d through the power feeding lines 132L, 132R, 134L, 134R, the branch stations 40c and 40d can control the power feeding to unused optical elements in the related branching units 44L, 44R, 46L, 46R independently from the other branching units, and can prevent avoidable noise light from being produced or mixed. If noise light unavoidably enters into in-use lines from unused lines or elements even when lines to be used are selected or changed appropriately, then optical switches may be provided at positions where noise light is reliably shut off, and may be opened in response to selection or changes of in-use lines.

Figure 31:
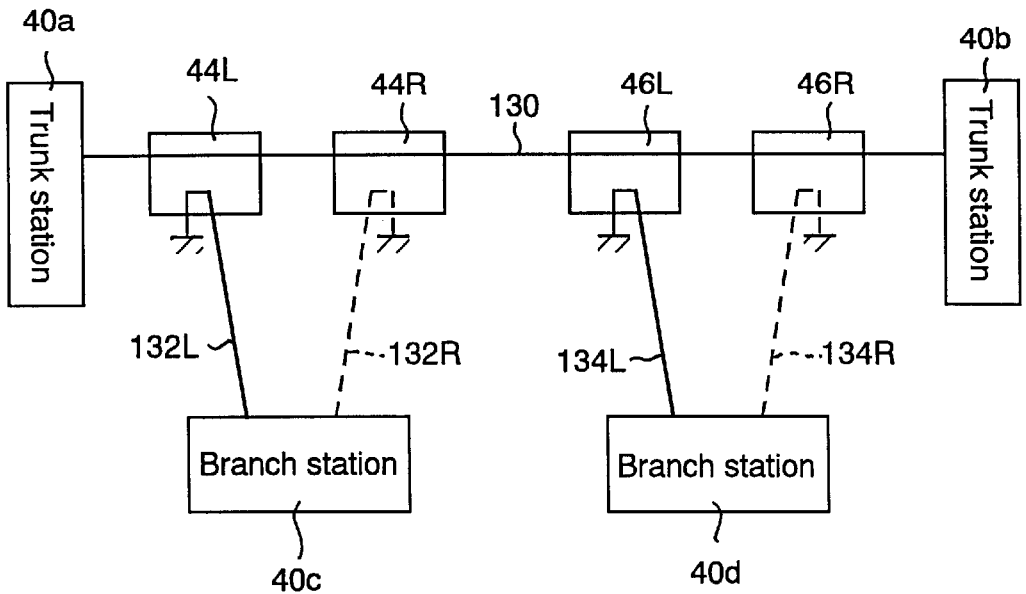
FIG. 31 is a diagram showing a power feeing mode corresponding to FIG. 3(a)
Figure 32:
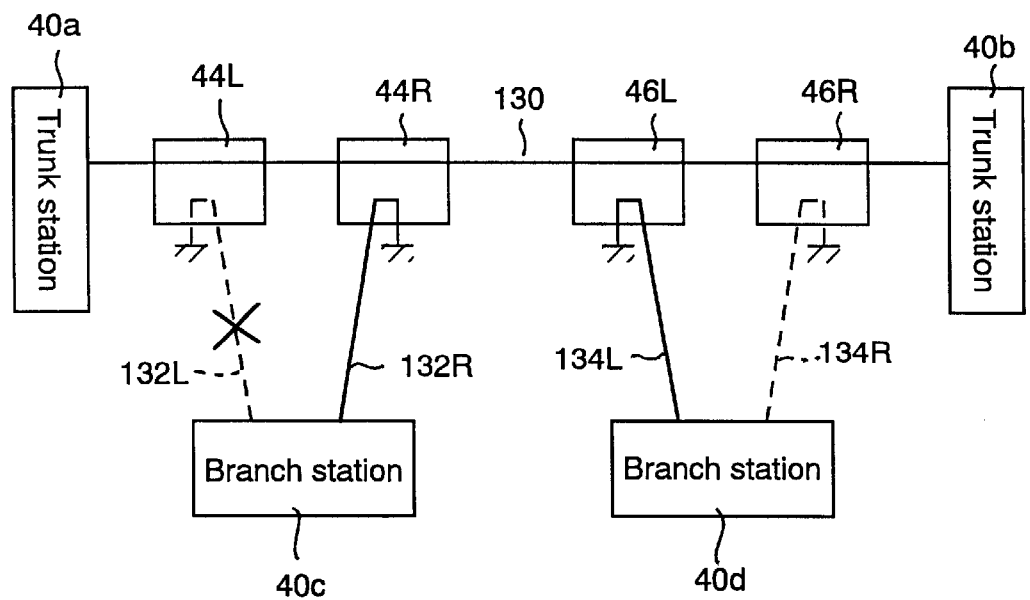
FIG. 32 is a diagram showing a power feeding mode corresponding to FIG. 3(b)
Figure 33:
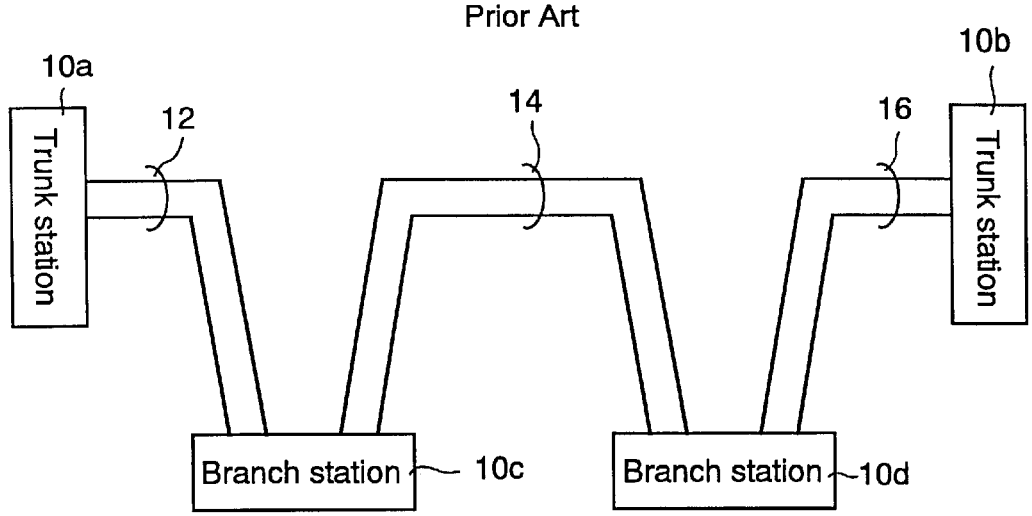
FIG. 33 is a block diagram schematically showing a conventional simple double landing system.
Figure 34:
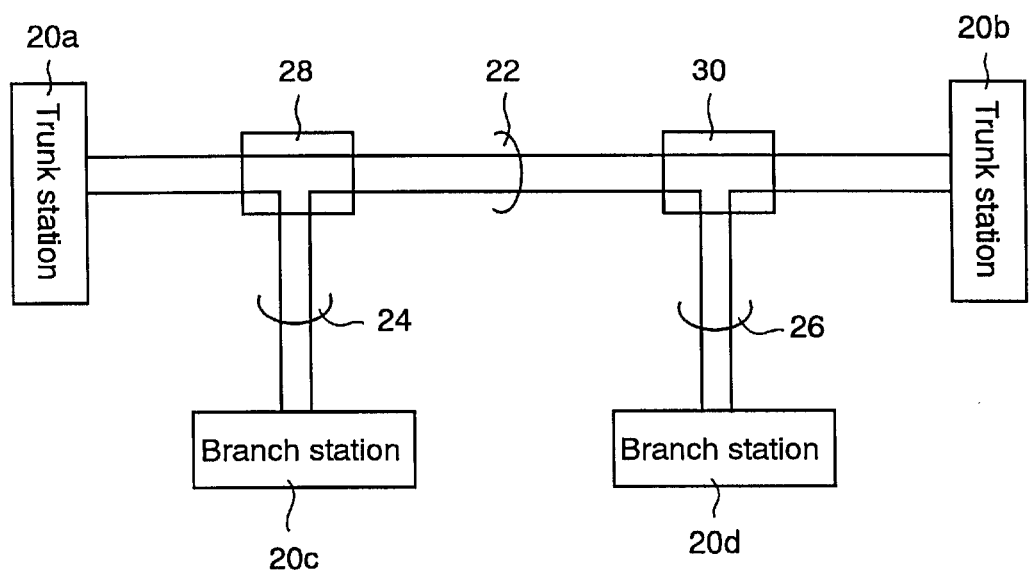
FIG. 34 is a block diagram schematically showing a conventional simple underwater branching system.

For example, when only one of double branching cables, 48L or 50L, is used as shown in FIG. 3(a), power feeding to the power feeding line 132R, 134R for the non-used branching cable 48R, 50R may be shut off as shown in FIG. 31. When, as shown in FIG. 3(b), the spare branching cable 48R is used due to a trouble on the branching cable 48L, power is fed to the power feeding line 132R as shown in FIG. 32. In FIGS. 31 and 32, lines that feeds with source power are shown by solid lines, and lines that shut off from source power are shown by broken lines.

When both of double branching cables 48L and 48R, or 50L and 50R, are used as shown in FIG. 2, power feeding to the power feeding lines 132L, 132R, 134L, 134R cannot be shut off. In this case, noise light may enter into in-use optical lines from non-used optical lines. To prevent it, optical switches, explained above, should be provided at appropriate positions capable of preventing entry of noise light.

Description has been made on embodiments where the trunk stations 40a, 40b are connected at opposite ends of the trunk line 42. However, the invention is apparently adaptive to either the case where opposite ends of the trunk line terminate at a single trunk station or the case where the trunk line is ring-shaped. In case of a ring-shaped trunk line, propagating directions of an optical signal would be expressed as right-turning (clockwise) direction and left-turning (counterclockwise) direction. However, there is no substantial difference.

Although some embodiments have been explained as using two branching units, substantially the same effects can be obtained apparently even with constructions serially connecting three or more branching units.

As any artisan will understand from the above explanation, the present invention makes it possible to immediately change from in-trouble lines to spare lines even upon any trouble in signal lines from or toward any branch station, and can therefore increase the reliability of communication lines for branch, stations by using a simple structure.

What is claimed is:

1. An optical transmission system, comprising:

first and second main optical transmission mediums;

first and second branching units connected to said first and second main optical transmission mediums, respectively;

an inter-unit connecting cable directly connecting the first and second branching units;

a branch station;

a first branching cable connecting said first branching unit to said branch station; and a second branching cable connecting said second branching unit to said branch station;

wherein said first branching cable and said second branching cable each comprises two pairs of optical transmission lines, two of the four pairs of the optical transmission lines of said first and second branching cables being used for communication with another station through said first and second main optical transmission mediums, and the other two pairs of the optical transmission lines being spare lines.

2. An optical transmission system, comprising:

first and second main optical transmission mediums;

first and second branching units connected to said first and second main optical transmission mediums, respectively;

an inter-unit connecting cable connecting said first and second branching units, wherein the inter-unit connecting cable comprises a plurality of individual optical cables, each optical cable configured for bi-directional communications between the first and second branching units;

a branch station;

a first branching cable connecting said first branching unit to said branch station; and a second branching cable connecting said second branching unit to said branch station;

wherein said first branching cable and said second branching cable each comprises two pairs of optical transmission lines, two of the four pairs of the optical transmission lines of said first and second branching cables being used for communication with another station through said first and second main optical transmission mediums, and the other two pairs of the optical transmission lines being spare lines.

3. An optical transmission system, comprising:

first and second main optical transmission mediums;

first and second branching units connected to said first and second main optical transmission mediums, respectively;

an inter-unit connecting cable connecting said first and second branching units;

a branch station;

a first branching cable connecting said first branching unit to said branch station; and a second branching cable connecting said second branching unit to said branch station;

wherein said first branching cable and said second branching cable each comprises two pairs of optical transmission lines, two of the four pairs of the optical transmission lines of said first and second branching cables being used for communication with another station through said first and second main optical transmission mediums, and the other two pairs of the optical transmission lines being spare lines;

wherein the first branching unit optically connects the first main optical transmission cable and a first one of the two pairs of the optical transmission lines of the first branching cable, and a second one of the two pairs of the optical transmission lines of the first branching cable and the inter-unit connecting cable, wherein the first branching unit selectively supplies an input signal light from the first main optical transmission medium to the inter-unit connecting cable, and an input signal light from the inter-unit connecting cable to the first main optical transmission medium, wherein the second branching unit optically connects the second main optical transmission medium and a first one of the two pairs of the optical transmission lines of the second branching cable, and a second one of the two pairs of the optical transmission lines of the second branching cable and the inter-unit connecting cable, wherein the second branching unit selectively supplies an input signal light from the second main optical transmission medium to the inter-unit connecting cable, and an input signal light from the inter-unit cable to the second main optical transmission medium.

4. An optical transmission system, comprising:

first and second main optical transmission mediums;

first and second branching units connected to said first and second main optical transmission mediums, respectively, wherein said branching units include, respectively:

a first optical coupler having an input and first and second outputs for outputting light introduced through its respective main optical transmission medium from at least one of said two outputs;

a second optical coupler having first and second inputs and an output for outputting light introduced through said first and second inputs to its respective main optical transmission medium;

a first optical transferring device for outputting output light from said first output of said first optical coupler via said inter-unit connecting cable toward the other branching unit, and for transferring an optical signal entering from the other branching unit through said inter-unit connecting cable to said first input of said second optical coupler; and a second optical transferring device for outputting an optical signal from said second optical output of one of said optical transceivers in said branch station and introduced through a first one of said optical transmission lines of its respective branching cable toward said first optical transferring device of the other branching unit through said inter-unit connecting cable, and for outputting an optical signal introduced from said first optical transferring device of the other branching unit through said inter-unit connecting cable to a second one of said optical transmission lines of its respective branching cable connected to said second optical input of its respective one of the optical transceivers in said branch station, wherein the second output of said first optical coupler is connected to the first optical input of its respective other optical transceiver through a third one of said optical transmission lines of its respective branching cable, and the first optical output of its respective other optical transceiver is connected to the second input of said second optical coupler through a fourth one of said optical transmission lines of its respective branching cable;

an inter-unit connecting cable connecting said first and second branching units;

a branch station, wherein said branch station includes first and second optical transceivers each having first and second optical inputs and first and second optical outputs;

a first branching cable connecting said first branching unit to said branch station; and a second branching cable connecting said second branching unit to said branch station, wherein said first branching cable and said second branching cable each comprises two pairs of optical transmission lines, two of the four pairs of optical transmission lines of said first and second branching cables being used for communication with another station through said first and second main optical transmission mediums, and the other two pairs of optical transmission lines being spare lines.

5. The optical transmission system according to claim 4 wherein the first optical transferring device of each of the first and second branching units comprises an optical circulator having a first port through which the output light from said first output of said first optical coupler is introduced, a second port through which the optical signal sent from the other branching unit via said inter-unit connecting cable is introduced, and a third port connected to the first input of said second optical coupler, for outputting the output light through the first port from the second port and for outputting the optical signal light from the other branching unit through the second port from the third port.

6. The optical transmission system according to claim 4 wherein said first optical transferring device of each of said first and second branching units comprises an optical switch which can prevent entry of said optical signal from the other branching unit into said first input of said second optical coupler, and a light detector/switch controller for detecting the presence or absence of the optical signal on said fourth one of said optical transmission lines of its respective branching cable, for opening said optical switch when said optical signal exists, and closing said optical switch when said optical signal does not exist.

7. The optical transmission system according to claim 4 wherein said first optical coupler comprises an optical divider.

8. The optical transmission system according to claim 4 wherein said second optical coupler comprises an optical multiplexer.

9. The optical transmission system according to claim 4 wherein said inter-unit connecting cable includes a pair of optical fiber transmission lines.

10. An optical transmission system, comprising:
first and second main optical transmission mediums;
first and second branching units connected to said first and second main optical transmission mediums, respectively,
wherein each of said first and second branching units comprises a first optical coupler having an input and first and second outputs for outputting light introduced through its respective main optical transmission medium from at least one of said first and second outputs, and a second optical coupler having first and second inputs and an output for outputting input light introduced through said first and second inputs to its respective main optical transmission medium;
an inter-unit connecting cable connecting said first and second branching units, wherein said inter-unit connecting cable comprises first, second, third and fourth optical transmission lines,
the first optical transmission line of said inter-unit connecting cable being connected in said first branching unit to a first one of said optical transmission lines of said first branching cable connected to the second optical output of one of the transceivers of said branch station, and being connected in said second branching unit to the first input of said second optical coupler,
the second optical transmission line of said inter-unit connecting cable being connected in said first branching unit to a second one of said optical transmission lines of said first branching cable connected to the second optical input of said one of the transceivers in said branch station, and being connected in said second branching unit to the first output of said first optical coupler,
the third optical transmission line of said inter-unit connecting cable being connected in said second branching unit to a first one of said optical transmission lines of said second branching cable connected to the second optical output of the other optical transceiver in said branch station, and being connected in said first branching unit to the first input of said second optical coupler, and
the fourth optical transmission line of said inter-unit connecting cable being connected in said second branching unit to a second one of said optical transmission lines of said second branching cable connected to the second optical input of the other optical transceiver in said branch station, and being connected in said first branching unit to the first output of said first optical coupler;
a branch station, wherein said branch station includes first and second optical transceivers each having first and second optical inputs and first and second optical outputs;
a first branching cable connecting said first branching unit to said branch station; and
a second branching cable connecting said second branching unit to said branch station,
wherein said first branching cable and said second branching cable each comprises two pairs of optical transmission lines, two of the four pairs of optical transmission lines of said first and second branching cables being used for communication with another station through said first and second main optical transmission mediums, and the other two pairs of optical transmission lines being spare lines.

11. The optical transmission system according to claim 10 wherein said first and second branching units each further comprises:
an optical switch capable of preventing optical coupling from the first input of said second optical coupler to said inter-unit connecting cable; and
a light detector/switch controller for detecting the presence or absence of the optical signal on a third one of said optical transmission lines of its respective branching cable, for opening its respective optical switch when said optical signal exists, and for closing its respective optical switch when said optical signal does not exist.

12. The optical transmission system according to claim 10 wherein said first optical coupler comprises an optical divider.

13. The optical transmission system according to claim 10 wherein said second optical coupler comprises an optical multiplexer.

14. An optical transmission system, comprising:
first and second main optical transmission mediums;
first and second branching units connected to said first and second main optical transmission mediums, respectively, wherein each of said first and second branching units comprises:
a first optical coupler having an input and first and second outputs for outputting light introduced from its respective main optical transmission medium from at least one of said first and second outputs;
a second optical coupler having first and second inputs and an output for outputting light introduced through said first and second inputs to its respective main optical transmission medium;

a first optical transferring device for introducing an optical signal from the other branching unit through one of said optical transmission lines of said inter-unit connecting cable and for outputting it to the first input of said second optical coupler and a first one of the optical transmission lines of its respective branching cable connected to the second optical input of one of said optical transceivers in said branch station; and a second optical transferring device having a first input for introducing an optical signal from the first output of said first optical coupler and a second input for introducing an optical signal from the second optical output of its respective one of the optical transceivers in said branch station and supplied through a second one of the optical transmission lines of its respective branching cable for transferring optical signals entering into said first and second inputs to the other branching unit through said inter-unit connecting cable;

wherein the second output of said first optical coupler is connected to the first optical input of its respective other optical transceiver in said branch station through said third one of said optical transmission lines, and said first optical output of its respective other optical transceiver is connected to the second input of said second optical coupler through a fourth one of said optical transmission lines of its respective branching cable;

an inter-unit connecting cable connecting said first and second branching units;

a branch station, wherein said branch station includes first and second optical transceivers each having first and second optical inputs and first and second optical outputs;

a first branching cable connecting said first branching unit to said branch station; and a second branching cable connecting said second branching unit to said branch station, wherein said first branching cable and said second branching cable each comprises two pairs of optical transmission lines, two of the four pairs of optical transmission lines of said first and second branching cables being used for communication with another station through said first and second main optical transmission mediums, and the other two pairs of optical transmission lines being spare lines.

15. The optical transmission system according to claim 14 wherein said second optical coupler of each of said first and second branching units comprises a selective optical switch in which one of the first and second inputs is connected to the output;

said first and second branching units each further comprising a first light detector/switch controller for detecting the presence or absence of an optical signal on said fourth one of said optical transmission lines of its respective branching cable for connecting said second optical coupler to said second input when the optical signal exists, and for connecting said second optical coupler to the first input when the optical signal does not exist.

16. The optical transmission system according to claim 14 wherein said second optical transferring device of each of said first and second branching units comprises a selective optical switch connecting one of the first and second inputs to the output;

said first and second branching units each further comprising a light detector/switch controller for detecting the presence or absence of an optical signal on said second one of the optical transmission lines of its respective branching cable for connecting the output of said second optical transferring device to the second input when the optical signal exists, and for connecting the output of said second optical transferring device to the first input when the optical signal does not exist.

17. The optical transmission system according to claim 14 wherein said first optical coupler comprises an optical divider.

18. An optical transmission system comprising:

first and second main optical transmission mediums;

first and second branching units connected to said first and second main optical transmission mediums, respectively, wherein said first and second branching units each comprises:

a first optical coupler having an input and first and second outputs for introducing light from its respective main optical transmission medium and for outputting it from at least one of said first and second outputs;

a second optical coupler having first and second inputs and an output for introducing light from the first and second inputs and for outputting them to its respective optical transmission medium;

a first optical transferring device for outputting light input through a first port from a second port and for outputting light input through said second port from a third port, said first port being connected to the first output of said first optical coupler, said second port being connected to one end of a first optical transmission line of said inter-unit connecting cable, said third port being connected to the second optical input of one of said optical transceivers in said branch station through a first one of said optical transmission lines of its respective branching cable; and a second optical transferring device for outputting light input through a first port from a second port and for outputting light input through the second port from a third port, said first port being connected to the second optical output of its respective one of said optical transceivers in said branch station through a second one of said optical transmission lines of its respective branching cable, said second port being connected to one end of a second optical transmission line of said inter-unit connecting cable, and said third port being connected to the first input of said second optical coupler;

wherein the second output of said first optical coupler is connected to the first optical input of its respective other optical transceiver in said branch station through a third one of the optical transmission lines of its respective branching cable, the first optical output of its respective other transceiver is connected to the second input of said second optical coupler through a fourth one of said optical transmission lines of its respective branching cable;

an inter-unit connecting cable connecting said first and second branching units;

a branch station, wherein said branch station includes first and second optical transceivers each having first and second optical inputs and first and second optical outputs;

a first branching cable connecting said first branching unit to said branch station; and a second branching cable connecting said second branching unit to said branch station, wherein said first branching cable and said second branching cable each comprises two pairs of optical transmission lines, two of the four pairs of optical transmission lines of said first and second branching cables being used for communication with another station through said first and second main optical transmission mediums, and the other two pairs of optical transmission lines being spare lines.

19. The optical transmission system according to claim 18 wherein said first optical transferring device and said second optical transferring device each comprises a directional optical coupler being substantially 1×2.

20. The optical transmission system according to claim 18 wherein said first optical transferring device and said second optical transferring device each comprises an optical circulator having three ports.

21. The optical transmission system according to claim 18 wherein said first optical coupler comprises an optical divider.

22. The optical transmission system according to claim 18 wherein said second optical coupler comprises an optical multiplexer.

23. The optical transmission system according to claim 18 wherein said first optical coupler comprises a selective optical switch connecting the input to one of the first and second outputs, and said second optical coupler comprises a selective optical switch connecting one of the first and second inputs to the output;

each of said first and second branching units further including a light detector/switch controller for detecting the presence or absence of an optical signal on said fourth one of the optical transmission lines of its respective branching cable, for connecting the input of said first optical coupler to the second output thereof and the output of said second optical coupler to the second input thereof when the optical signal exists, and for connecting the input of said first optical coupler to the first output thereof and the output of said second optical coupler to the first input thereof when the optical signal does not exist.

24. An optical transmission system, comprising:

first and second main optical transmission mediums;

first and second branching units connected to said first and second main optical transmission mediums, respectively, wherein said first and second branching units each comprises:

a first coupler having a first pair of ports and a second pair of ports to output light input through a first port of said first port pair from first and second ports of said second port pair and to output light input through the first port of said second port pair from at least a second port of said first port pair, said first port of said first port pair introducing light from its respective main optical transmission medium, said second port of said first port pair being connected to the second optical input of one of said optical transceivers in said branch station through a first one of the optical transmission lines of its respective branching cable, and the second port of said second port pair being connected to the first optical input of the other optical transceivers in said branch station through a second one of the optical transmission lines of its respective branching cable; and a second coupler having a first pair of ports and a second pair of ports to output light through the first port and the second port of said first port pair from at least the first port of said second port pair and to output light through the second port of said second port pair from at least the first port of said first port pair, said second port of the first port pair being connected to the first optical output of its respective other optical transceiver through a third one of the optical transmission lines of its respective branching cables, said first port of the second port pair outputting an optical signal to its respective main optical transmission medium, and said second port of the second port pair being connected to the second optical output of its respective one of the optical transceivers in said branch station through a fourth one of said optical transmission lines of its respective branching cable, said first port of the second port pair of said first coupler of said first branching unit being connected to the first port of said second port pair of said first coupler of said second branching unit through a first optical transmission line of said inter-unit connecting cable, said first port of the first port pair of said second coupler of said first branching unit being connected to the first port of said first port pair of said second coupler of said second branching unit through a second optical transmission line of said inter-unit connecting cable;

an inter-unit connecting cable connecting said first and second branching units;

a branch station, wherein said branch station includes first and second optical transceivers each having first and second optical inputs and first and second optical outputs;

a first branching cable connecting said first branching unit to said branch station; and a second branching cable connecting said second branching unit to said branch station, wherein said first branching cable and said second branching cable each comprises two pairs of optical transmission lines, two of the four pairs of optical transmission lines of said first and second branching cables being used for communication with another station through said first and second main optical transmission mediums, and the other two pairs of optical transmission lines being spare lines.

25. The optical transmission system according to claim 24 wherein said first coupler and said second coupler of each of said first and second branching units comprises a 2×2 directional coupler.

26. An optical transmission system, comprising:

first and second main optical transmission mediums;

first and second branching units connected to said first and second main optical transmission mediums, respectively, wherein said first and second branching units each comprises:

a first coupler having a first pair of ports and a second pair of ports to output light input through the first port of the first port pair from the first port and the second port of the second port pair and to output light input through the first port of the second port pair from at least the second port of the first port pair, said first port of the first port pair introducing input light from its respective main optical transmission medium, said second port of the first port pair being connected to the second optical input of one of said optical transceivers in said branch station through a first one of said optical transmission lines of its respective branching cable, said second port of the second port pair being connected to the first optical input of its respective other optical transceiver in said branch station through a second one of said optical transmission lines of its respective branching cable;

a second coupler having a first pair of ports and a second pair of ports to output light input through the first and second ports of said first port pair from at least the first port of said second port pair and to output light input through the second port of the second port pair from at least the first port of the first port pair, said second port of the first port pair being connected to the first optical output of its respective other optical transceiver in said branch station through a third one of the optical transmission lines of its respective branching cable, said first port of the second port pair outputting an optical signal to its respective main optical transmission medium, and said second port of the second port pair being connected to the second optical output of its respective one of said optical transceivers in said branch station through a fourth one of the optical fiber transmission lines of its respective branching cable;

a first optical transferring device having first, second and third ports for outputting light input through the first port from the second port and outputting light input through the second port from the third port, said second port being connected to the first port of the second port pair of said first coupler; and a second optical transferring device having first, second and third ports for outputting light input through the first port from the second port and outputting light input through the second port from the third port, said second port being connected to the first port of the first port pair of said second coupler;

wherein said third port of the first optical transferring device of said first branching unit is connected to the first port of the first optical transferring device of the second branching unit through a first optical transmission line of said inter-unit connecting cable, said first port of the first optical transferring device of the first branching unit is connected to the third port of said first optical transferring device of said second branching unit through a second optical transmission line of said inter-unit connecting cable; and wherein said first port of said second optical transferring device of said first branching unit is connected to the third port of the second optical transferring device of said second branching unit through a third optical transmission line of said inter-unit connecting cable, and said third port of the second optical transferring device of said first branching unit is connected to the first port of said second optical transferring device of the second branching unit through a fourth optical transmission line of said inter-unit connecting cable;

an inter-unit connecting cable connecting said first and second branching units;

a branch station, wherein said branch station includes first and second optical transceivers each having first and second optical inputs and first and second optical outputs;

a first branching cable connecting said first branching unit to said branch station; and a second branching cable connecting said second branching unit to said branch station, wherein said first branching cable and said second branching cable each comprises two pairs of optical transmission lines, two of the four pairs of optical transmission lines of said first and second branching cables being used for communication with another station through said first and second main optical transmission mediums, and the other two pairs of transmission lines being spare lines.

27. The optical transmission system according to claim 26 wherein said first and second couplers of said first and second branching units each comprises a 2×2 directional coupler.

28. The optical transmission system according to claim 26 wherein said first and second optical transferring devices of said first and second branching units each comprises an optical circulator.

* * * * *

UNITED STATES PATENT AND TRADEMARK OFFICE
CERTIFICATE OF CORRECTION

PATENT NO.      : 6,377,373 B1
DATED           : April 23, 2002
INVENTOR(S)     : Toshio Kawazawa and Koji Goto It is certified that error appears in the above-identified patent and that said Letters Patent is hereby corrected as shown below:

<u>Title page,</u>
Item [57], ABSTRACT,
Line 1, after "transmission" delete the comma.
Lines 7 and 10, replace "forth" with -- fourth -- (both occurrences).

<u>Column 37,</u>
Line 31, replace "claim 4" with -- claim 7 --.
Line 34, replace "claim 4" with -- claim 8 --.

Signed and Sealed this

Third Day of June, 2003

JAMES E. ROGAN
*Director of the United States Patent and Trademark Office*